(12) United States Patent
Froehlich et al.

(10) Patent No.: US 8,597,803 B2
(45) Date of Patent: *Dec. 3, 2013

(54) LIGHT EMITTING DEVICES AND COMPOSITIONS

(75) Inventors: Jesse Froehlich, Vista, CA (US); Hyun Sik Chae, San Diego, CA (US); Amane Mochizuki, Carlsbad, CA (US); Sheng Li, Vista, CA (US)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/467,943

(22) Filed: May 9, 2012

(65) Prior Publication Data

US 2012/0273765 A1    Nov. 1, 2012

Related U.S. Application Data

(63) Continuation of application No. 12/266,487, filed on Nov. 6, 2008, now abandoned.

(60) Provisional application No. 60/988,391, filed on Nov. 15, 2007, provisional application No. 61/109,872, filed on Oct. 30, 2008.

(51) Int. Cl.
| | |
|---|---|
| *H01L 51/50* | (2006.01) |
| *C07F 7/02* | (2006.01) |
| *C07F 7/18* | (2006.01) |
| *C07F 15/00* | (2006.01) |
| *C07D 413/14* | (2006.01) |

(52) U.S. Cl.
USPC ........... 428/690; 428/917; 313/504; 313/506; 445/58; 556/400; 556/9; 556/137; 548/145; 544/198; 427/66; 252/301.16

(58) Field of Classification Search
None
See application file for complete search history.

(56) References Cited

U.S. PATENT DOCUMENTS

| | | |
|---|---|---|
| 5,635,249 A | 6/1997 | Haluska et al. |
| 5,707,745 A | 1/1998 | Forrest et al. |
| 6,018,002 A | 1/2000 | Pernisz |
| 6,184,304 B1 | 2/2001 | Pernisz |
| 6,214,937 B1 | 4/2001 | Kennedy et al. |
| 6,406,804 B1 | 6/2002 | Higashi et al. |
| 6,517,958 B1 | 2/2003 | Sellinger et al. |
| 6,528,188 B1 | 3/2003 | Suzuki et al. |
| 6,558,818 B1 | 5/2003 | Samuel et al. |

(Continued)

FOREIGN PATENT DOCUMENTS

| | | |
|---|---|---|
| CN | 1 680 366 | 10/2005 |
| CN | 1 810 817 | 8/2006 |

(Continued)

OTHER PUBLICATIONS

Chen et al., Thin Solid Films, vol. 514, (2006), pp. 103-109.*

(Continued)

*Primary Examiner* — Dawn Garrett
(74) *Attorney, Agent, or Firm* — Knobbe, Martens Olson & Bear LLP

(57) ABSTRACT

A light emitting composition includes a light-emitting lumophore-functionalized nanoparticle, such as an organic-inorganic light-emitting lumophore-functionalized nanoparticle. A light emitting device includes an anode, a cathode, and a layer containing such a light-emitting composition. In an embodiment, the light emitting device can emit white light.

50 Claims, 22 Drawing Sheets

(56) References Cited

U.S. PATENT DOCUMENTS

| | | | |
|---|---|---|---|
| 6,657,224 B2 | 12/2003 | Shi et al. | |
| 6,687,266 B1 | 2/2004 | Ma et al. | |
| 6,734,621 B2 | 5/2004 | Koyama et al. | |
| 6,830,830 B2 | 12/2004 | Hsieh et al. | |
| 6,861,091 B2 | 3/2005 | Sellinger | |
| 6,864,329 B2 | 3/2005 | Xiao et al. | |
| 6,869,695 B2 | 3/2005 | Thompson et al. | |
| 6,911,271 B1 | 6/2005 | Lamansky et al. | |
| 6,916,554 B2 | 7/2005 | Ma et al. | |
| 6,936,761 B2 | 8/2005 | Pichler | |
| 6,939,624 B2 | 9/2005 | Lamansky et al. | |
| 7,001,536 B2 | 2/2006 | Thompson et al. | |
| 7,083,862 B2 | 8/2006 | Burn et al. | |
| 7,147,938 B2 | 12/2006 | Helber et al. | |
| 7,993,747 B2 | 8/2011 | Mochizuki et al. | |
| 2003/0120099 A1 | 6/2003 | Laine et al. | |
| 2003/0162299 A1 | 8/2003 | Hsieh et al. | |
| 2004/0137263 A1 | 7/2004 | Burn et al. | |
| 2005/0017629 A1 | 1/2005 | Vitukhnovsky et al. | |
| 2005/0123760 A1 | 6/2005 | Cammack et al. | |
| 2005/0260445 A1 | 11/2005 | Walters et al. | |
| 2006/0063026 A1 | 3/2006 | Holmes et al. | |
| 2006/0102890 A1 | 5/2006 | Yamahara et al. | |
| 2006/0186791 A1* | 8/2006 | Yoshitake et al. | 313/503 |
| 2007/0045619 A1 | 3/2007 | Park et al. | |
| 2007/0184301 A1 | 8/2007 | Oshiyama et al. | |
| 2007/0262302 A1 | 11/2007 | Mochizuki et al. | |
| 2009/0066234 A1 | 3/2009 | Chae et al. | |
| 2009/0179552 A1 | 7/2009 | Froehlich et al. | |
| 2011/0193075 A1* | 8/2011 | Mochizuki et al. | 257/40 |
| 2012/0305895 A1* | 12/2012 | Chae et al. | 257/40 |

FOREIGN PATENT DOCUMENTS

| | | | |
|---|---|---|---|
| EP | 1 359 630 | | 11/2003 |
| JP | 2004-506050 | | 2/2004 |
| JP | 2005-521210 | | 7/2005 |
| JP | 2006-108458 | | 4/2006 |
| JP | 2007-169593 | | 7/2007 |
| JP | 2007-184348 | | 7/2007 |
| JP | 2007-214175 | | 8/2007 |
| WO | WO 02/05971 A1 * | | 1/2002 |
| WO | WO 03/079736 | | 9/2003 |
| WO | WO 2004/060898 | | 7/2004 |
| WO | WO 2005/027583 | | 3/2005 |
| WO | WO 2005/037955 | | 4/2005 |
| WO | WO 2005/124889 A1 * | | 12/2005 |
| WO | WO 2006/093466 | | 9/2006 |
| WO | WO 2007/136588 | | 11/2007 |
| WO | WO 2008/049577 | | 5/2008 |
| WO | WO 2009/006550 | | 1/2009 |
| WO | WO 2009/064661 | | 5/2009 |
| WO | WO 2010/045263 | | 4/2010 |

OTHER PUBLICATIONS

Liu et al., Advanced Functional Materials, (2006), vol. 16, pp. 1441-1448.*

Adamovich et al., "High Efficiency Single Dopant White Electrophosphorescent Light Emitting Diodes", New Journal of Chemistry, 2002, vol. 26, pp. 1171-1178.

Anthopoulos et al., "Solution-Processable Red Phosphorescent Dendrimers for Light-Emitting Device Applications", Advanced Materials, 2004, vol. 16, No. 6, pp. 557-560.

Aston et al., "The Electromotive Force of the Dell H2, HC1 (g), AgC1(s), Ag(s), at 25°. Derives Values from 0 to 4002", Journal of the American Chemical Society, Jun. 28, 1955, vol. 77, No. 12.

Baldo et al., "High-Efficiency Phosphorescent Emission from Organic Electroluminescent Devices", Nature, Sep. 10, 1998, vol. 395, pp. 151-154.

Baney et al., "Silsesquioxanes", Chemical Reviews, Jul./Aug. 1995, vol. 95, No. 5, pp. 1409-1430.

Billmeyer, et al., "Principles of Color Technology", 2nd edition, John Wiley & Sons, Inc., New York, 1981.

Brooks et al., "Synthesis and Characterization of Phosphorescent Cyclometalated Platinum Complexes", Inorganic Chemistry, 2002, vol. 41, pp. 3055-3066.

Chao et al., White Light Emission from Exciplex in a Bilayer Device with two Blue Light-Emitting Polymers, Applied Physics Letters, Jul. 27, 1998, vol. 73, No. 4, pp. 426-428.

Chen et al., "Synthesis and Opto-Electrical Properties of Stellar Polyfluorene Derivatives Containing Polhedral Oligomeric Silsesquixanes as the Center Core", Journal of Polymer Research, Nov. 2, 2005, vol. 13, pp. 237-245.

Cheng et al., "White Organic Light-Emitting Devices with a Phosphorescent Multiple Emissive Layer", Applied Physics Letters, vol. 89, 2006, pp. 045304-1-045304-3.

Cie 1971, International Commission on Illumination, Colorimetry: Official Recommendations of the International Commission on Illumination, Publication CIE No. 15 (E-1.3.1) 1971, Bureau Central de la CIE, Paris, 1971.

Cockburn et al., "Reactivity of Co-Ordinated Ligands. Part XV. Formation of Complexes Containing Group V Donor Atoms and Metal-Carbon σ-bonds", Journal of Chemical Society, Dalton, 1973, pp. 404-410.

D'Andrade et al, "Efficient Organic Electrophosphorescent White-Light-Emitting Device With a Triple Doped Emissive Layer", Advanced Materials, Apr. 5, 2004, vol. 16, No. 7, pp. 624-628.

Davis et al., "The Reaction of Some Diketones with Sodium Acetylide", Journal of American Chemical Society, 1955, vol. 77, No. 12, pp. 3284-3287.

Ding, et al., "Highly Efficient Green-Emitting Phosphorescent Iridium Dendrimers Based on Carbazole Dendrons", Advance Functional Materials, 2006, vol. 16, pp. 575-581.

Evans et al., "Coordinationg Complexes Exhibiting Room-Temperature Phosphoresence: Evaluation of their Suitability as Triplet Emitters in Organic Light Emitting Diodes", Coordination Chemistry Reviews, Mar. 6, 2006, vol. 250, pp. 2093-2126.

Feher et al., "Silasesquioxanes as Ligands in Inorganic and Organometallic Chemistry", Polyherdron, 1995, vol. 14, No. 22, pp. 3239-3253.

Fenenko et al., "Electronic Characterization of New Bright-Blue-Light-Emitting Poly(9,9-dioctylfluorenyl-2,7-diyl)-End Capped With Polyhedral Oligomeric Silsesquioxanes", Japanese Journal of Applied Physics, 2006, vol. 45, No. 1B, pp. 550-554.

Fréechet et al., "Synthesis and Properties of Dendrimer and Hyperbranched Polymers", Comprehensive Polymer Science, 1996, pp. 71-132.

Furuta et al., "Platinum-Functionalized Random Copolymers for Use in Solution-Processible, Efficient, Near-White Organic Light-Emitting Diodes", Journal of American Chemical Society, Dec. 1, 2004, vol. 126, No. 47, 15388-15389.

Gao et al., "White Light Electroluminescence From a Hole-Transporting Layer of Mixed Organic Materials", Synthetic Metals, 2000, vol. 111-112, pp. 39-42.

Gerlach et al., "Synthese von endo-und exo-1,3-Dimethyl-2,9-dioxabicylo[3.3.1]nonan", Helvetica Chemica Acta, 1977, vol. 60, No. 2, pp. 638-642.

Gerlach et al., "Synthesen der Nonactinsäure", Helvetica Chimica Acta, 1974, vol. 57, No. 7, pp. 2306-2321.

Granström et al., "White Light Emission from a Polymer Blend Light Emitting Diode", Applied Physics Letters, Jan. 8, 1996, vol. 68, No. 2, pp. 147-149.

Gustafsson et al. "Flexible Light-Emitting Diodes Made from Soluble Conducting Polymer," Nature, Jun. 11, 1992, vol. 357, pp. 477-479.

Hamada et al., "White Light-Emitting Material for Organic Electroluminescent Devices", Japanese Journal of Applied Physics, Oct. 15, 1996, vol. 35, pp. 1339-1341, Part 2, No. 10B.

He et al., "Highly Efficient Luminescent Organic Cluster with Quantum Dot-Like Properties," Journal of American Chemical Society, 2004, vol. 126, No. 25, pp. 7792-7793.

Jiang et al., "High Efficiency, Saturated Red-Phosphorescent Polymer Light-Emitting Diodes Based on Conjugated and Non-Conjugated Polymers Doped with an Ir Complex" Advanced Materials, Mar. 18, 2004, vol. 16, No. 6, pp. 537-541.

(56) References Cited

OTHER PUBLICATIONS

Jiang et al., "High-Efficiency White-Light-Emitting Devices from a Single Polymer by Mixing Singlet and Triplet Emission", Advanced Materials, 2006, vol. 17, Issue 13, pp. 1769-1773.
Kido et al., "Multilayer White Light-Emitting Organic Electroluminescent Device", Science, Mar. 3, 1995, vol. 267, pp. 1332-1334.
Kido et al., "White Light-Emitting Organic Electroluminescent Device Using Lanthanide Complexes", Japanese Journal of Applied Physics, Mar. 15, 1996, vol. 35, pp. 394-396, Part 2, No. 3B.
Kido et al., "White Light-Emitting Organic Electroluminescent Devices Using the Poly(N-Vinylcarbazole) Emitter Layer Doped with Three Fluorescent Chromophores", Applied Physics Letters, Feb. 1994, vol. 64, Issue 815.
Lee et al., "Stabalized Blue Luminescent Polyfluorenes: Introducing Polyhedral Oligomeric Silsesquioxane", Macromolecules, 2004, vol. 37, pp. 8523-8529.
Lee et al., "Synthesis of Polyhedral Oligomeric Silsesquioxane-Functionalized Polyfluorenes: Hybrid Organic-Inorganic n-Conjugated Polymers", Synthetic Metals, 2006, vol. 156, No. 7-8, pp. 590-596.
Lee et al., "White Light Electroluminescence from Soluble Oxadiazole-Containing Phenylene Vinylene Ether-Linkage Copolymer", Applied Physics Letters, Jul. 16, 2001, vol. 79, Issue 3, pp. 308-310.
Lohse et al., "The Palladium Catalysed Suzuki Coupling of 2- and 4-Chloropyridines," Synlett, Jan. 1999, vol. 1, pp. 45-48.
Nonoyama, Matsuo, "Benzo[$h$]quinolin-10-yl-N Iridium (III) Complexes", Bulletin of the Chemical Society of Japan, 1974, vol. 47, No. 3, pp. 767-768.
Odian, "Principles of Polymerization", John Wiley, New York, 2nd Ed., 1981, pp. 177-179.
Qian et al., "Development, Scope, and Mechanism of the Palladium-Catalyzed Intramolecular Hydroalkylation of 3-Butenyl B-Diketones", Organometallics, 2005, vol. 24, No. 2, pp. 287-301.
Qian et al., "Mechanism of the Palladium-Catalyzed Intramolecular Hydroalkylation of 7-Octene-2,4-Dione", Journal of the American Chemical Society, Feb. 26, 2003, vol. 125, No. 8, pp. 2056-2057.
Sellinger et al., "Heck Coupling of Haloaromatics with Octavinylsilsesquioxane:Solution Precessable Nanocomposites for Application in Electroluminescent Devices", The Royal Society of Chemistry, 2005, pp. 3700-3702.
Sorenson et al., "Preparative Methods of Polymer Chemistry", John Wiley, New York, 3rd ed., 2001, pp. 442-444.
Sprouse et al., "Photophysical Effects of Metal-Carbon σ Bonds in Ortho-Metalated Complexes of Ir(III) and Rh(III)", Journal of American Chemical Society, 1984, vol. 106, No. 22, pp. 6647-6653.
Tasch et al., "Efficient White Light-Emitting Diodes Realized with New Processable Blends of Conjugated Polymers", Applied Physics Letters, Nov. 17, 1997, vol. 71, No. 20, pp. 2883-2885.
Vögtle et al., "Dendrimers III: Design, Dimension, Function", 212 Topics in Current Chemistry, 2001, pp. 9.
Williams et al., "Excimer-Based White Phosphorescent Organic Light Emitting Diodes with Nearly 100% Internal Quantum Efficiency", Advanced Materials, 2007, vol. 19, pp. 197-202.
Xiao et al., "Nano-Hybrid Luminescent Dot: Synthesis, Characterization and Optical Properties", Journal of Materials Chemistry, 2006, vol. 16, pp. 829-836.
Xu, et al., "Synthesis and Characterization of Phosphorescent Cyclometalated Iridium Complexes Containing 2,5-diphenylpyridine Based Ligands", Applied Organometallic Chemistry, 2005, vol. 19, pp. 1225-1231.
Xuebao, Faguang, Chinese Journal of Luminescence, Oct. 5, 2006, vol. 27, No. 5, pp. 700-704.
Yang et al., "Efficient Blue-Green and White Light-Emitting Electrochemical Cells Based on Poly[9,9-bis(3,6-dioxaheptyl)-fluorene-2,7-diyl]" Journal of Applied Physics, Apr. 1, 1997, vol. 81, No. 7, pp. 3294-3298.
You et al., "Inter-Ligand Energy Transfer and Related Emission Change in the Cyclometalated Heteroleptic Iridium Complex: Facile and Efficient Color Tuning over the Whole Visible Range by the Ancillary Ligand Structure," Journal of American Chemical Society, 2005, vol. 127, pp. 12438-12439.
Zhao et al., "On the Origin of Green Emission in Polyfluorene Polymers: The Roles of Thermal Oxidation Degradation and Crosslinking" Advanced Functional Materials, 2004, vol. 14, No. 8, pp. 783-790.
Zhao et al., "Studies of Third-Order Optical Nonlinearities of Model Compounds Containing Benzothiazole, Benzimidazole, and Benzoxazole Units", Chemistry of Materials, 1990, vol. 2, pp. 670-678.
International Search Report and Written Opinion in PCT Application No. PCT/US2008/082692 dated Mar. 13, 2009.
International Preliminary Report on Patentability in PCT Application No. PCT/US2008/082692 dated May 18, 2010.

* cited by examiner

LIGHT EMITTING DEVICES AND COMPOSITIONS

CROSS-REFERENCE TO RELATED APPLICATIONS

The present application is a continuation of U.S. patent application Ser. No. 12/266,487, filed on Nov. 6, 2008, which claims priority under 35 U.S.C. §119(e) to U.S. Provisional Application No. 60/988,391 filed on Nov. 15, 2007 and U.S. Provisional Application No. 61/109,872 filed on Oct. 30, 2008, the disclosures of which are incorporated by reference herein in their entireties.

BACKGROUND

1. Field of the Invention

This invention relates to light emitting compositions and light-emitting devices that include the light-emitting compositions. Specifically, this invention relates to light emitting compositions and light-emitting devices that include a light-emitting lumophore-functionalized nanoparticle.

2. Description of the Related Art

Organic electroluminescent devices capable of emitting white light are desirable because of their potential utility as backplane lights for displays, overhead lighting and other lightweight, low profile, low power lighting applications. White light-emitting Organic Light-Emitting Diode (OLED) devices with high color purity and brightness exceeding 2000 cd/m$^2$ have been demonstrated at least since 1994. (1, 2) However, there is considerable difficulty in preparing white emitting OLEDs because it is generally quite difficult to prepare a device with a single layer that can emit white light. Several ineffective strategies have been employed to generate white light by electroluminescence including: preparation of devices with multiple emitting layers, e.g. red, green and blue (2); use of a single emitting layer doped with multiple small molecule emitters of different colors (1, 3, 4); blends of different color emitting polymers (5, 6); excimer (7) or "electromer" (8) emission from a semiconducting polymer; excimer emission from an interface (9); and broad emission from metal chelates (10).

There are significant drawbacks to all of these approaches. Preparation of devices with multiple emitting layers is typically more difficult and time consuming than preparation of devices with fewer layers. Device failure is more likely to occur due to interfacial defects, and matching the conduction band energies of multiple layers is complicated at best. Small molecules tend to have limited solubility in polymers. Blends of small molecule emitters and polymer dispersions of emitters tend to aggregate or phase separate, which often results in decreased device performance and poor color stability. Classical polymer-based systems are typically difficult to purify and exhibit poor batch-to-batch reproducibility. It is also very difficult to control the structure of classical polymer-based systems except in a very general sense. Finally, broad spectral emission from small single molecules typically heavily consists of green wavelength components and has a much lower efficiency for the red and blue components. The human eye is most sensitive to green light; hence in an actual device, it is desirable to have the red and blue wavelength components brighter than the green components. Molecular orbital and quantum mechanical theories forbid this type of emission from a single small molecule material.

Recently, phosphorescent dyes have been used as a source of emission in OLEDs because of their potential for achieving high degrees of luminescence efficiency. In theory, phosphorescence can achieve 100% quantum efficiency by emitting from both the singlet and triplet state as compared to fluorescence which only emits from the singlet state and is thus limited to a theoretical efficiency of 25% (11).

Two of the most common techniques for achieving white light using phosphorescent organic light emitting diodes (PHOLEDs) are the co-doping of red, green, and blue phosphors into a single emission layer (12) and the building up of a multilayer device with each layer containing a different color phosphor (13). While a single emission layer can be easy and cost effective, the presence of multiple dopants in the same layer can result in problems with energy transfer. For example, energy transfer from the high energy dopants to the low energy dopants makes color balance difficult. Although segregation of the various emitters into separate layers helps to overcome the energy transfer problem, multilayered devices are much harder to fabricate and minor changes in layer thickness will result in significant changes in color balance.

The following articles are referred to above and incorporated by reference herein in their entireties:

1. Kido, J., Hongawa, K., Okuyama, K. & Nagai, K. White light-emitting organic electroluminescent devices using the poly(N-vinylcarbazole) emitter layer doped with three fluorescent chromophores. *Applied Physics Letters* 64, 815 (1994).
2. Kido, J., Kimura, M. & Nagai, K. Multilayer White light-Emitting Organic Electroluminescent Device. *Science* 267, 1332-1334 (1995).
3. Kido, J., Ikeda, W., Kimura, M. & Nagai, K. *Jpn. J. Appl. Phys.* (*part* 2) 35, L394 (1996).
4. Tasch, S. et al. *Applied Physics Letters* 71, 2883 (1997).
5. Yang, Y. & Pei, Q. *Journal of Applied Physics* 81, 3294 (1997).
6. Granstrom, M. & Inganas, O. *Applied Physics Letters* 68, 147 (1996).
7. Gao, Z. Q., Lee, C. S., Bello, I. & Lee, S. T. White light electroluminescence from a hole-transporting layer of mixed organic materials. *Synthetic Metals* 111-112, 39-42 (2000).
8. Lee, Y.-Z. et al. White light electroluminescence from soluble oxadiazole-containing phenylene vinylene ether-linkage copolymer. *Applied Physics Letters* 79, 308-310 (2001).
9. Chao, C.-I. & Chen, S.-A. White light emission from exciplex in a bilayer device with two blue light-emitting polymers. *Applied Physics Letters* 73, 426-428 (1998).
10. Hamada, Y. et al. White light-emitting material for organic electroluminescent devices. *Jpn. J. Appl. Phys.* (*part* 2) 35, L1339-L1341 (1996).
11. Baldo, M. A.; O'Brien, D. F.; You, Y.; Shoustikov, A.; Sibley, S.; Thompson, M. E.; Forrest, S. R. *Nature* 395, 151 (1998).
12. D'Andrade, B. W.; Holmes, R. J.; Forrest, R. S. *Adv. Mater.* 16, 624 (2004).
13. Cheng, G.; Zhang, Y.; Zhou, Y.; Lin, Y.; Ruan, C.; Liu, S.; Fei, T.; Ma, Y.; Cheng, Y. *Appl. Phys. Lett.* 89, 043504 (2006).

SUMMARY

An embodiment described herein relates to a lumophore-functionalized nanoparticle represented by Formula (I):

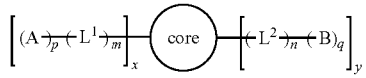

(I)

wherein core can be a nanoparticle core; A can be a phosphorescent emitting lumophore; B can be a host; $L^1$ and $L^2$ can each be a linking group; m can be 0 or 1; n can be 0 or 1; p can be an integer in the range of 1 to 50; q can be an integer in the range of 1 to 50; x can be 0 or an integer in the range of 1 to 100, wherein for x≥2 each $L^1$ can be the same or different, each A can be the same or different, and each p can be the same or different; and y can be an integer in the range of 1 to 100, wherein for y≥2 each $L^2$ can be the same or different, each B can be the same or different, and each q can be the same or different. In some embodiments, $L^1$ and $L^2$ can be topologically distinct from the core, compositionally distinct from the core, or both.

In an embodiment, the phosphorescent emitting lumophore can comprise a metal (e.g., platinum). In some embodiments, the phosphorescent emitting lumophore can be an organometallic complex such as a platinum-based organometallic complex. In an embodiment, the platinum-based organometallic complex has the structure:

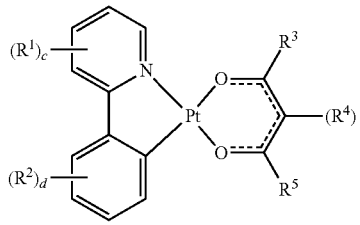

wherein each $R^1$ can be hydrogen or $C_{1-6}$ alkyl; each $R^2$ can be hydrogen or an electron-withdrawing group; each $R^3$, $R^4$ and $R^5$ can be independently selected from the group consisting of hydrogen, an optionally substituted $C_{1-20}$ alkyl, optionally substituted $C_{2-20}$ alkenyl, optionally substituted $C_{2-20}$ alkynyl, optionally substituted $C_{5-30}$ aryl, optionally substituted $C_{5-30}$ heteroaryl, and a point of attachment; c is an integer in the range of 1 to 4; d is an integer in the range of 1 to 4; and provided that when m in Formula (I) is 0, at least one of $R^1$, $R^3$, $R^4$ and $R^5$ is a point of attachment to the core; or when m in Formula (I) is 1, at least one of $R^1$, $R^3$, $R^4$ and $R^5$ is a point of attachment to $L^1$.

The linking groups can comprise various moieties. For example, in some embodiments, $L^1$ and $L^2$ in Formula (I) can each independently comprise a monovalent, a divalent, a trivalent, a tetravalent or a pentavalent moiety. In some embodiments, $L^1$ and $L^2$ can comprise a moiety selected from the group consisting of:

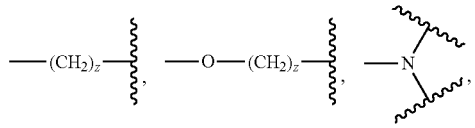

-continued

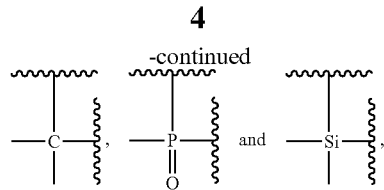

wherein z is an integer selected from 1 to 30. In an embodiment, $L^1$ and $L^2$ can comprise a trivalent moiety can be selected from the group consisting of

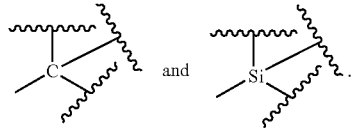

In an embodiment, $L^1$ and $L^2$ can comprise a tetravalent moiety can be

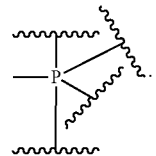 [SMILES: *P(*)(*)(*)C]

In some embodiments, $L^1$ and $L^2$ can comprise a pentavalent moiety can be

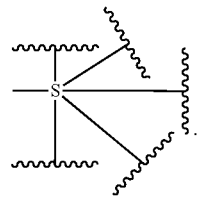

In an embodiment, $L^1$ and $L^2$ can each comprise

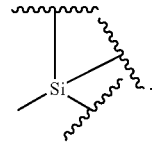 [SMILES: *[Si](*)(*)C]

In some embodiments where more than one $L^1$ or more than one $L^2$ are present, each $L^1$ and each $L^2$ may be independently selected from the moieties described above.

Another embodiment described herein relates to a light emitting device that can include: an anode layer comprising a high work function metal; a cathode layer comprising a low work function metal; and a light-emitting layer positioned between, and electrically connected to, the anode layer and the cathode layer, wherein the light-emitting layer can include a lumophore-functionalized nanoparticle or composition thereof as described herein. In an embodiment, the lumophore-functionalized nanoparticle is represented by Formula (I). In an embodiment, the lumophore-functionalized nanoparticle is an organic-inorganic lumophore-functionalized nanoparticle. In an embodiment, the organic-inorganic lumophore-functionalized nanoparticle comprises a nanoparticle core that comprises inorganic elements such as phosphorous (P), silicon (Si), and/or a metal. For example, in an embodiment, a nanoparticle core comprises a moiety selected from the group consisting of a silsesquioxane, a cyclophosphazene, a triazine, a cyclodextrin, a calixarene, a phthalocyanine, and a silica particle.

In an embodiment, the process for making the light-emitting devices described herein, include forming the light-emitting layer by a wet process.

These and other embodiments are described in greater detail below.

DETAILED DESCRIPTION

Figure 1:
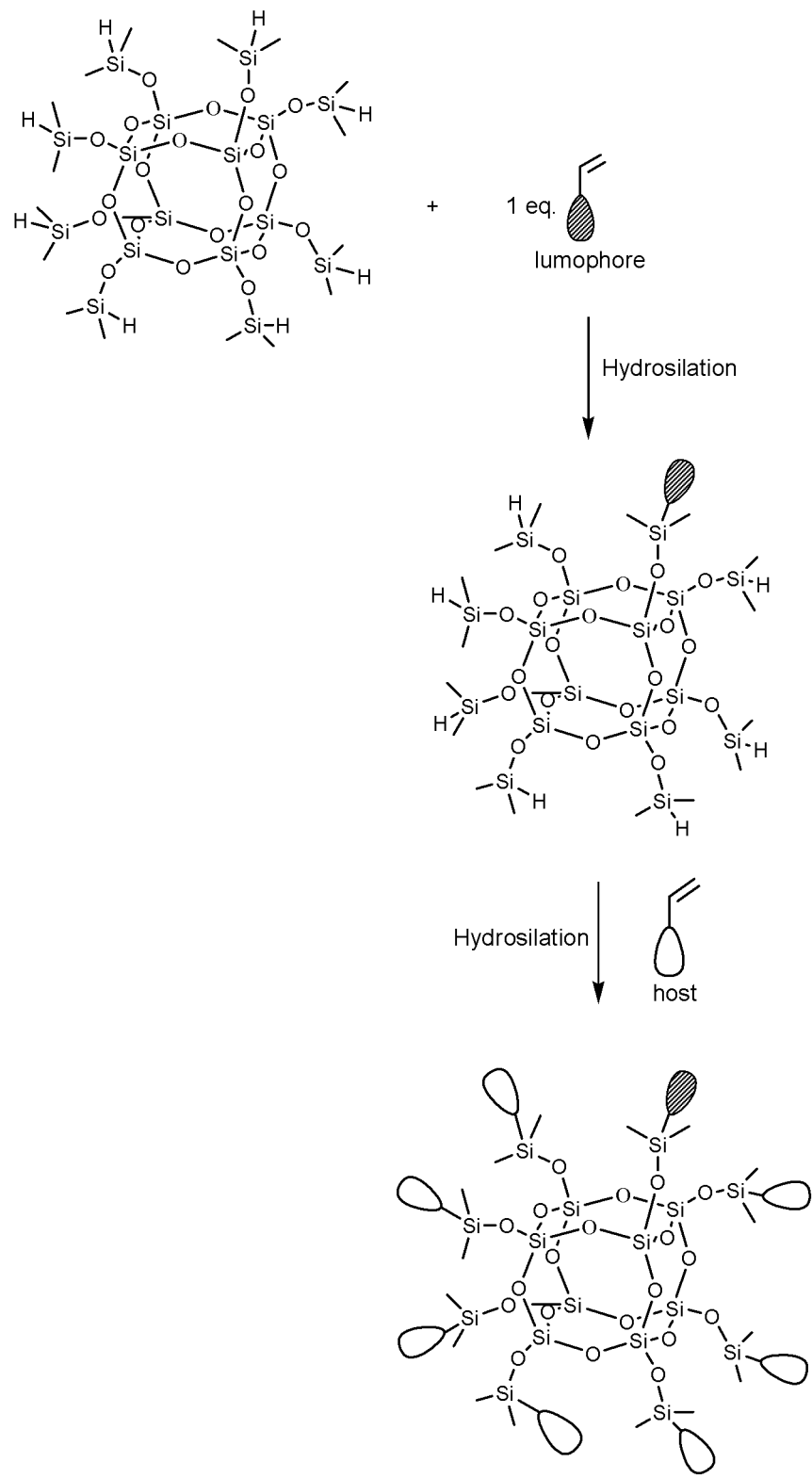
FIG. 1 illustrates a general process for preparing a lumophore-functionalized nanoparticle comprising a silsesquioxane nanoparticle core.

A nanoparticle is a particle having a cross-sectional measurement (e.g., diameter if spherical) of about 100 nm or less. Dendrimers are examples of nanoparticles. Nanoparticles may be soluble or insoluble polymers (copolymers, hyperbranched polymers, etc), having the ability to aggregate, accumulate and/or self-assemble into particles of about 100 nm or less. The silsesquioxane group of the Formula (II) is an example of a nanoparticle.

Dendrimers are branched molecular materials that exhibit useful properties of both small molecules and polymers. See e.g. Fréchet, J. M. J.; Hawker, C. J. Comprehensive Polymer Science, 2nd Supplement; Pergamon: Oxford, England, 1996; pp 140-206. A dendrimer is a substantially monodisperse synthetic macromolecule possessing a three-dimensional architecture that comprises a central core, highly branched but substantially regular iterative building units, and numerous peripheral ending groups. A more detailed description of these terms is found in G. Odian, Principles of Polymerization, John Wiley, New York, $2^{nd}$ Ed., 1981, pp. 177-179 and in W. R. Sorenson, F. Sweeney and T. W. Campbell, Preparative Methods of Polymer Chemistry, John Wiley, New York, 3rd ed., 2001, pp. 442-444, both of which are hereby incorporated by reference in their entireties. The numerous functional groups in the periphery of dendrimers are ideally suited for the incorporation of light-emitting lumophores, e.g., by covalent bonding. Modifications of peripheral functional groups in dendrimers to accommodate the attachment of lumophores can be carried out by general methods described in "Dendrimers III: Design Dimension Function", Vogtle, F., Vol. Ed. Top. Curr. Chem. 2001, 212. Similar methods may also used to functionalize polymer nanoparticles.

Unless otherwise indicated, when a substituent referred to as being "optionally substituted," or "substituted" it is meant that the substituent is a group that may be substituted with one or more group(s) individually and independently selected from alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxy, aryloxy, acyl, ester, mercapto, alkylthio, arylthio, cyano, halogen, carbonyl, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, and amino, including mono- and di-substituted amino groups, and the protected derivatives thereof An "electron-withdrawing group" is a group that through either resonance or inductive effects brings electron density towards itself and away from other parts of the moiety. Exemplary electron-withdrawing groups include, but are not limited to, halogen, aldehyde, ester, carboxylic acid, acyl, carbonyl, nitro, and cyano.

A "core" is a portion of the nanoparticle that connects two or more lumophores and/or hosts, directly or via linkers, in accordance with the teachings provided herein to thereby form a nanoparticle comprising a plurality of lumophores and/or hosts. A core typically is of sufficient size to reduce or eliminate physical interactions between lumophores and/or hosts of the same nanoparticle and to reduce or eliminate decoupling the emitting states of lumophores of the same nanoparticle. In some embodiments, the core and/or linker(s) is configured such that the extended conjugation of each the plurality of lumophores and/or hosts of the nanoparticle is separated from that of the other lumophores and/or hosts. Exemplary cores can comprise 5 to 100 atoms, and can have a cross-sectional measurement ranging from about 0.1 to about 10 nm. For example a core can be a silsesquioxane, a cyclophosphazene, a triazine, a cyclodextrin, a calixarene, a phthalocyanine, or a silica particle. In some embodiments, a core may comprise 10 to 90 atoms, 30-80 atoms or 40-60 atoms. In some embodiments, a core may have a cross-sectional measurement ranging from about 0.2 to about 9 nm, about 0.5 to about 8 nm, about 1 to about 7 nm.

The term "silsesquioxane" is the general name for a family of polycyclic compounds consisting of silicon and oxygen. Silsesquioxanes are also known as silasesquioxanes and polyhedral oligomeric silsesquioxanes (POSS).

A "lumophore" is a chromophore that emits light when exposed to electromagnetic radiation. A chromophore is a molecule or aggregate of molecules that can absorb electromagnetic radiation. Lumophores may be referred to herein as light-emitting groups and vice-versa. The "quantum yield" of a chromophore is the ratio of the number of emitted photons to the number of photons absorbed.

An "excited state" is an electronic state of a molecule in which the electrons populate an energy state that is higher than another energy state for the molecule.

The term "host" refers to a moiety or material that absorbs energy from an excited state and transfers the energy to one or more lumophores. As used herein, a "host" is not a lumophore. Furthermore, a "host" refers to a monocyclic or multicyclic aromatic ring system that has a fully delocalized pi-electron system. A non-limiting list of materials or moieties that can be a host is listed herein. A host can function as a hole-transport and/or electron transport material. The terms "hole-transport" and "electron-transport" are used herein in their ordinary sense as understood by those skilled in the art. For example, a hole-transport material is a material that has the ability to transport holes while an electron-transport material is a material that has the ability to transport electrons.

As used herein, "extended conjugation" refers to a pi-bridge or a conjugated bridge, comprising a group of atoms through which electrons can be delocalized through the orbitals of atoms in the bridge. Typically, the orbitals will be p-orbitals on double ($sp^2$) or triple (sp) bonded carbon atoms or heteroatoms such as those found in alkenes, alkynes, neutral or charged aromatic rings, and neutral or charged heteroaromatic ring systems.

As used herein, "linker" or "linking group" refers to a chemical group that connects the core to a lumophore or the core to a host. Consequently, the "linker" or "linking group" has at least one bond to the core and at least one bond to a lumophore or a host. The "linker" or "linking group" is not part of the fully delocalized pi-electron system of the host. Furthermore, the "linker" or "linking group" does not participate in the MLCT of the phosphorescent-emitting lumophore. The "linker" or "linking group" can comprise one linker moiety or several linker moieties that can be the same or different. For example, the "linker" or "linking group" may comprise a combination of linker moieties such as -$L_A$-$L_B$-$L_C$- or -$L_A$-$L_B$-, wherein $L_A$, $L_B$ and $L_C$ are independently selected form a group of linker moieties, and may represent the same or different linking moieties. Exemplary linking group include, but are not limited to, alkyl, silyl, siloxane, and heterocycle. In some embodiments, a linker can comprise regular iterative building units, such as those characteristic of a dendrimer. A linker can connect the core to a single host or lumophore, or can connect the core to a plurality of hosts or lumophores. For example, in the case where a linker comprises regular iterative building units, the linker can be bound to two or more lumophores or hosts and thereby connect those two or more lumophores or hosts to the core.

As used herein, the term "phosphorescence" refers to emission from a triplet excited state of an organic molecule. The term "fluorescence" refers to emission from a singlet excited state of an organic molecule.

An "excimer" is a dimer with an excited state wavefunction that extends over two identical molecules.

The "work function" of a metal is a measure of the minimum energy required to extract an electron from the surface of the metal.

A "high work function metal" is a metal or alloy that easily injects holes and typically has a work function greater than or equal to 4.5.

A "low work function metal" is a metal or alloy that easily loses electrons and typically has a work function less than 4.3.

A "wet process" is used herein in its ordinary sense as understood by those skilled in the art and includes a process of laying down a layer where the materials that are included in the layer are in aqueous or organic solution. Examples of wet processes include but are not limited to spraying, spin coating, drop casting, inkjet printing and screen printing.

A material is white light-emitting if it emits white light. White light is light having the approximate CIE color coordinates (x=1/3, y=1/3). The CIE color coordinates (x=1/3, y=1/3) is defined as the achromatic point. The x and y color coordinates are weights applied to the CIE primaries to match a color. A more detailed description of these terms may be found in CIE 1971, International Commission on Illumination, Colorimetry: Official Recommendations of the International Commission on Illumination, Publication CIE No. 15 (E-1.3.1) 1971, Bureau Central de la CIE, Paris, 1971 and in F. W. Billmeyer, Jr., M. Saltzman, Principles of Color Technology, 2nd edition, John Wiley & Sons, Inc., New York, 1981, both of which are hereby incorporated by reference in their entireties. The color rendering index (CRI) refers to the ability to render various colors and has values ranging from 0 to 100, with 100 being the best.

An embodiment provides a lumophore-functionalized nanoparticle that comprises a nanoparticle core with at least one lumophore and at least one host covalently attached to the nanoparticle core. In some embodiments, the lumophore can be a phosphorescent emitter lumophore. The phosphorescent emitter can be a metal-based complex such as an organometallic complex. In an embodiment, the metal could be platinum. In an embodiment, the lumophore-functionalized nanoparticle is represented by Formula (I):

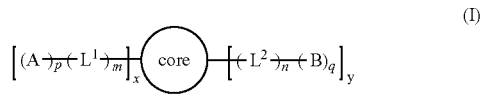

wherein core can be a nanoparticle core; A can be a phosphorescent emitting lumophore; B can be a host; $L^1$ and $L^2$ can each be a linking group; m can be 0 or 1; n can be 0 or 1; p can be an integer in the range of 1 to 50; q can be an integer in the range of 1 to 50; x can be 0 or an integer in the range of 1 to 100, wherein for $x \geq 2$ each $L^1$ can be the same or different, each A can be the same or different, and each p can be the same or different; and y can be an integer in the range of 1 to 100, wherein for $y \geq 2$ each $L^2$ can be the same or different, each B can be the same or different, and each q can be the same or different. In some embodiments, $L^1$ and $L^2$ can be topologically distinct from the core, compositionally distinct from the core, or both. In some embodiments, the sum of x and y represent the total available bonding sites on the core.

In some embodiments, the lumophore-functionalized nanoparticle is represented by Formula (Ia). Formula (Ia) is related to Formula (I) in which m and n are both 0.

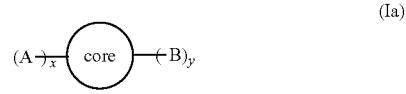

wherein core can be a nanoparticle core, A is a phosphorescent emitting lumophore, B is a host, x and y are selected from an integer from 1 to 100 so that the sum of x and y equals to the total available bonding sites on the core.

In some embodiments, the core in either Forumula (I) or (Ia) may be a silsesquioxane nanoparticle core, A is a phosphorescent emitting lumophore, B is a host, and the sum of x and y is 8. In some embodiments, x may be 1, 2, 3, 4, 5, 6 or 7 and y may be 1, 2, 3, 4, 5, 6 or 7. For example, when x is 1, 2, 3, 4, 5, 6 or 7, y is 7, 6, 5, 4, 3, 2, or 1, respectively.

Lumophore-functionalized nanoparticles can be prepared in various ways, e.g., by attaching the one or more lumophores and one or more hosts to a nanoparticle core. A preferred method for making nanoparticles that contain both lumophores and hosts is illustrated in FIG. 1. The covalent attachment of lumophores to the a silsesquioxane nanoparticle core is preferably carried out in the general manner described for the attachment of various groups to silsesquioxane in WO 02/05971, which is hereby incorporated by reference. A preferred nanoparticle core is a silsesquioxane as shown in Formula (II), more preferably a 1,3,5,7,9,11,13,15-octakis(dimethylsilyloxy)pentacyclo-[9.5.1.1$^{3,9}$.1$^{5,15}$.1$^{7,13}$] octasiloxane as shown in Formula (III):

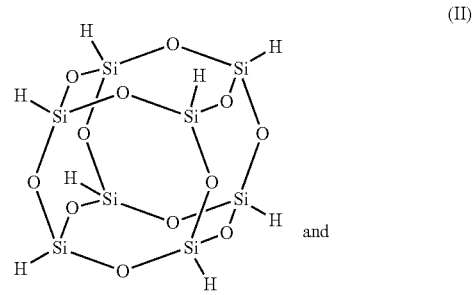

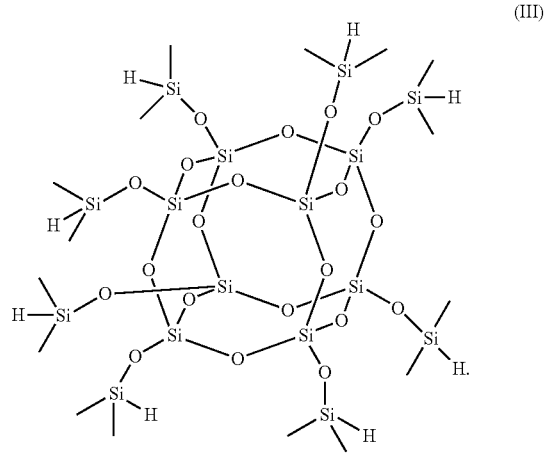

Figure 2:
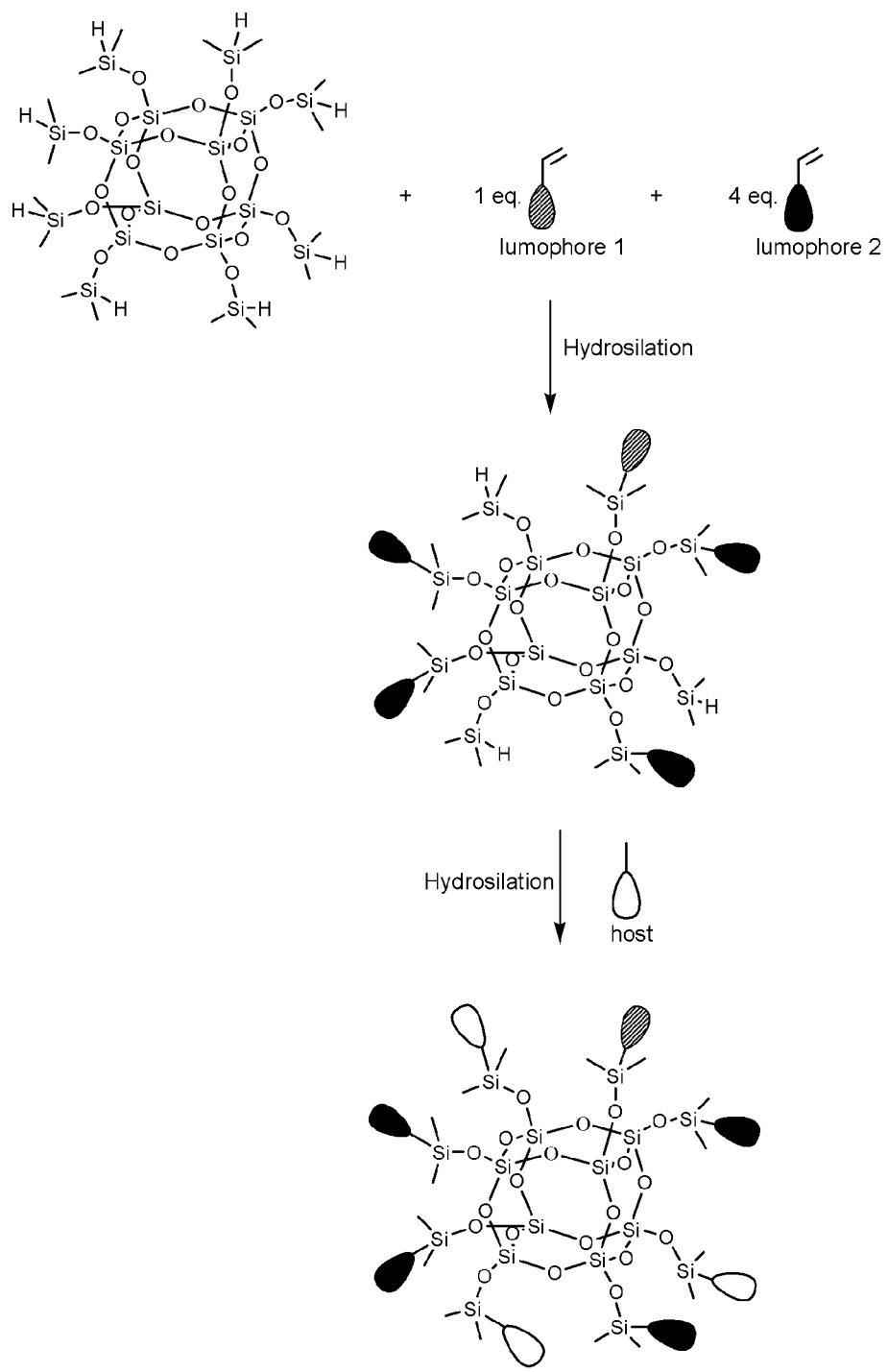
FIG. 2 illustrates another embodiment of a general process for preparing a lumophore-functionalized nanoparticle comprising a silsesquioxane nanoparticle core.

Light-emitting nanoparticles that emit various colors may be created by attaching one or more lumophores and one or more hosts to a nanoparticle core in varying ratios. There can be more than one kind of lumophore moiety attached to the same POSS core and there can also be more than one type of host moiety attached to the same POSS core. The lumophore(s) can be phosphorescent emitter lumophores. The number of hosts and lumophores attached to the nanoparticle core can vary. For example, each nanoparticle core can have one, two, three or more lumophores and one, two, three or more hosts attached to the core. One embodiment providing a method for making nanoparticles that contain more than one kind of lumophore moieties is illustrated in FIG. 2.

Several methods can be used to attach lumophores to the nanoparticle core. For example, lumophore such as a phosphorescent emitter lumophore containing a primary alkene or another functional group may be attached to the nanoparticle core. One method for attaching the lumophores is as follows: a lumophore comprising a primary alkene group is attached to a silsesquioxane via hydrosilation using a platinum catalyst, e.g. hexachloroplatinic acid or Pt(dvs) (platinum-divinyl tetramethyldisiloxane complex). In some embodiment, the silsesquioxane starting material is present in molar excess, preferably greater than 1.1 fold molar excess, more preferably greater than 1.5 fold molar excess, most preferably greater than 2.0 fold molar excess. The resulting product is a silsesquioxane having up to seven unreacted functional groups, e.g. silane (Si—H), and at least one covalently attached lumophore. The lumophore-functionalized silsesquioxane is then separated from the unreacted silsesquioxane starting material via methods known to those skilled in the art.

Similarly, various methods can be used to attach a host to the nanoparticle core. For example, a host containing a primary alkene or another functional group may be attached to the nanoparticle core randomly. In one method, the lumophore-functionalized nanoparticle core with unreacted functional groups can be reacted with an excess amount of host with a primary alkene in the presence of a platinum catalyst such as Pt(dvs). The resulting product in which the previously unreacted functional groups on the nanoparticle core are occupied with host groups is then purified using methods known to those skilled in the art. Alternatively, the hosts can be first attached to the nanoparticle core followed by the attachment of the lumophores to the unreacted functional groups on the nanoparticle core. One advantage of the lumophore-functionalized nanoparticles described herein is that they can also be easily purified and isolated by conventional methods such as flash chromatography.

Figure 3:
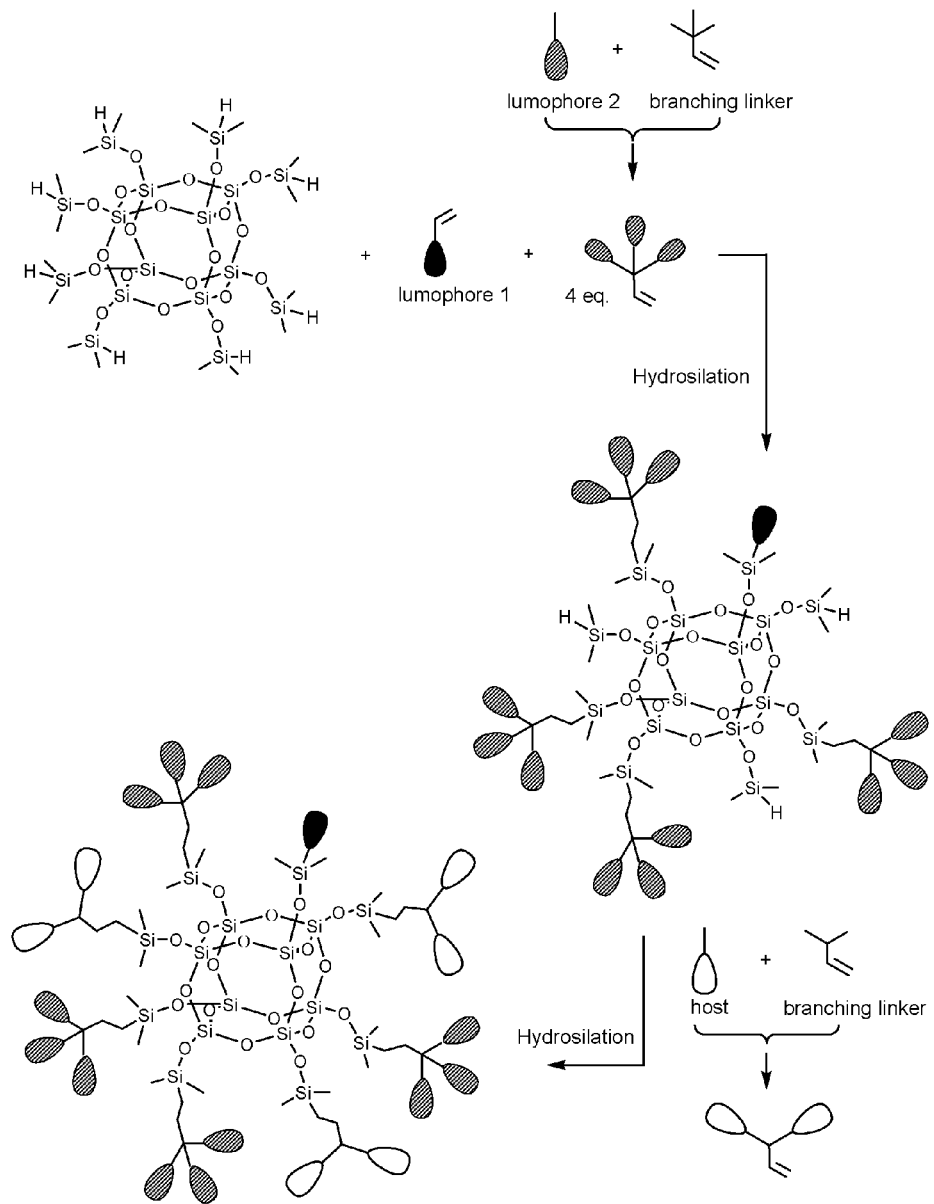
FIG. 3 illustrates a general process for preparing a lumophore-functionalized nanoparticle comprising branched linking groups and a silsesquioxane nanoparticle core.

In some embodiments, one or more lumophores or hosts can be attached to the nanoparticle core through a linking group, which may be monovalent, multivalent, linear or branched, e.g., as illustrated in FIG. 3. In some embodiments, the linking group may be selected from the following combinations of linker moieties: -$L_A$-$L_B$-$L_C$-, -$L_A$-$L_B$-, and -$L_A$-, wherein $L_A$, $L_B$, and $L_C$ are linker moieties, and each can be independently selected from the following group:

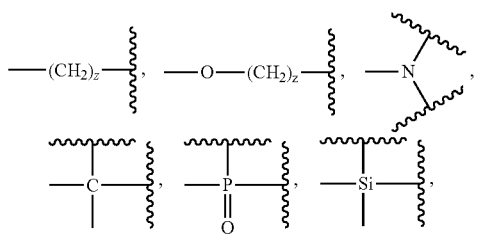

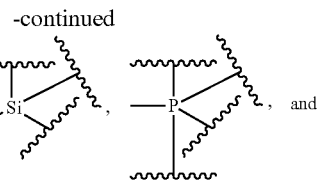

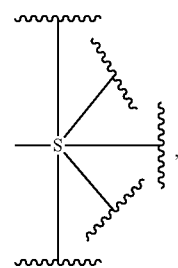

wherein z is an integer selected from 1 to 30. In some embodiments, $L_A$, $L_B$, and $L_C$ may represent same or different moieties. In some embodiments, z may be an integer selected from 1 to 20, 1 to 10 or 1 to 6.

For example, in some embodiments, $L^1$ and $L^2$ in Formula (I) can each independently comprise a monovalent, a divalent, a trivalent, a tetravalent or a pentavalent moiety. In this context, the valency indicates the number of lumophores or additional linker moieties to which the particular linker moiety is attached. In an embodiment, the linking group can include a monovalent or divalent moiety selected from the group consisting of:

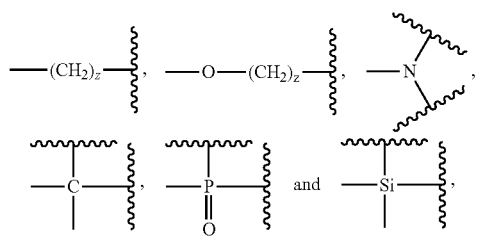

wherein z is an integer selected from 1 to 30. These groups are either monovalent or divalent, as depicted by the symbol

which indicates the point of attachment to a lumophore or another linker moiety that attaches to one or more lumophore. The ordinary chemical bond symbol "—" indicates a chemical bond between the linker moiety and the nanoparticle core, or between the linker moiety and another linker moiety that in turn attaches to the nanoparticle core.

In an embodiment, the linking group can comprise a trivalent moiety selected from the group consisting of

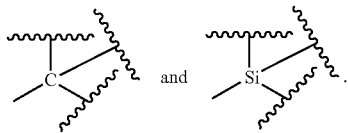

In an embodiment, the linking group can comprise a tetravalent moiety such as

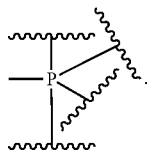 [SMILES: *P(*)(*)(*)C]

In an embodiment, the linking group can comprise a pentavalent moiety, for example

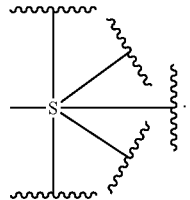 [SMILES: *S(*)(*)(*)(*)C]

In certain embodiments, $L^1$ and $L^2$ can each comprise

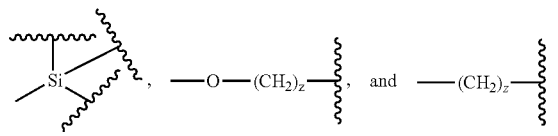

linker moieties. One example of a light-emitting nanoparticle that includes such linking group is described in Example 11.

In some embodiments, one or more of the linking units are different from the nanoparticle core to which they are attached, e.g., topologically distinct from the core, compositionally distinct from the core, or both. For example, in an embodiment, $L^1$ and $L^2$ in Formula (I) are topologically distinct from the nanoparticle core, compositionally distinct from the nanoparticle core, or both. In this context, the terms "topologically distinct" and "compositionally distinct" refer to differences in topology and composition, respectively, between a linking unit and the nanoparticle core to which it is attached. For example, some dendrimers comprise successive onion skin-like layers or "generations" that have essentially the same degree of branching as one another and thus are topologically indistinct from one another. Likewise, some dendrimers contain successive onion skin-like layers or generations that have essentially the same chemical composition as one another and thus are compositionally indistinct from one another.

In some embodiments, the phosphorescent emitting lumophore can comprise a metal (e.g., platinum). In some embodiments, the phosphorescent emitting lumophore can be an organometallic complex such as a platinum-based organometallic complex. In an embodiment, the platinum-based organometallic complex has the structure:

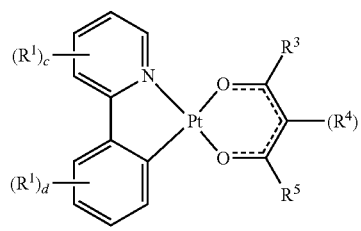

wherein each $R^1$ can be hydrogen, $C_{1-6}$ alkyl or a single bond serving as a point of attachment to the linking group or the core; each $R^2$ can be hydrogen or an electron-withdrawing group; each $R^3$, $R^4$ and $R^5$ can be independently selected from the group consisting of hydrogen, optionally substituted $C_{1-20}$ alkyl, optionally substituted $C_{2-20}$ alkenyl, optionally substituted $C_{2-20}$ alkynyl, optionally substituted $C_{5-30}$ aryl, optionally substituted $C_{5-30}$ heteroaryl, and a single bond serving as a point of attachment to the linking group or the core; c is an integer in the range of 1 to 4; d is an integer in the range of 1 to 4. When m in Formula (I) is 0, at least one of $R^1$, $R^3$, $R^4$ and $R^5$ is a point of attachment to the core; or when m in Formula (I) is 1 or above, at least one of $R^1$, $R^3$, $R^4$ and $R^5$ is a point of attachment to Suitable phosphorescent emitters (i.e., lumophores) include, but are not limited to the following:

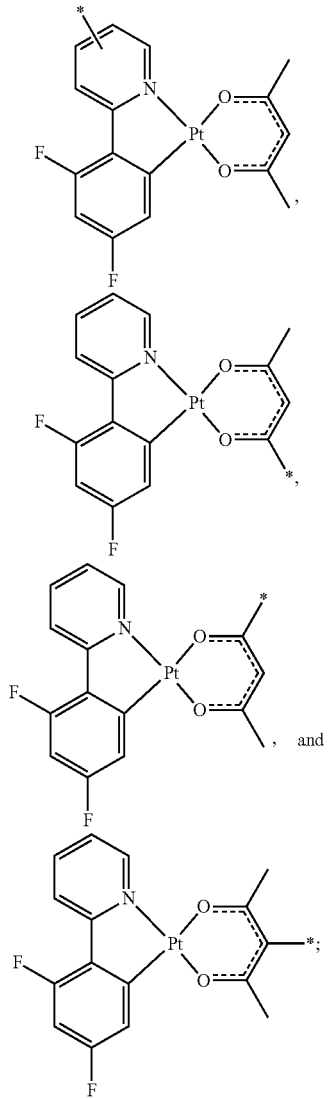

wherein * indicate the point of attachment to $L^1$ or the core.

In some embodiments, the host can have a molecular weight (MW)<1000 g/mol. Exemplary groups that can be hosts include an optionally substituted moiety selected from the following: an aromatic-substituted amine; a carbazole, a 3,6-disubstituted carbazole, an aromatic-substituted phosphine; a thiophene; an oxadiazole such as 2-(4-biphenylyl)-5-(4-tert-butylphenyl)-1,3,4-oxadiazole (PBD) and/or 1,3-bis(N,N-t-butyl-phenyl)-1,3,4-oxadiazole (OXD-7); a triazole such as 3-phenyl-4-(1'-naphthyl)-5-phenyl-1,2,4-triazole (TAZ), 3,4,5-Triphenyl-1,2,3-triazole and/or 3,5-Bis (4-tert-butyl-phenyl)-4-phenyl[1,2,4]triazole; an aromatic phenanthroline such as 2,9-dimethyl-4,7-diphenyl-phenanthroline (bathocuproine or BCP) and/or 2,9-Dimethyl-4,7- diphenyl-1,10-phenanthroline; a benzoxazole; a benzothiazole; a quinoline such as aluminum tris(8-hydroxyquinolate) (Alq3); a pyridine; a dicyanoimidazole; a cyano-substituted aromatic; 1,3,5-tris(2-N-phenylbenzimidazolyl)benzene (TPBI); 4,4'-bis[N-(naphthyl)-N-phenyl-amino]biphenyl (α-NPD); N,N'-bis(3-methylphenyl)N,N'-diphenyl-[1,1'-biphenyl]-4,4'-diamine (TPD); 4,4'-bis[N,N'-(3-tolyl)amino]-3,3'-dimethylbiphenyl (M14); 4,4'-bis[N,N'-(3-tolyl)amino]-3,3'-dimethylbiphenyl (HMTPD); 1,1-Bis(4-bis(4-methylphenyl)aminophenyl) cyclohexane; a carbazole such as 4,4'-N,N'-dicarbazole-biphenyl (CBP), poly(9-vinylcarbazole) (PVK), and/or N,N'N"-1,3,5-tricarbazoloylbenzene (tCP); a polythiophene; a benzidine such as N,N'-bis(4-butylphenyl)-N,N'-bis(phenyl)benzidine; a triphenylamine such as 4,4',4"-Tris(N-(naphthylen-2-yl)-N-phenylamino) triphenylamine and/or 4,4',4"-tris(3-methylphenylphenylamino)triphenylamine (MTDATA); a phenylenediamine; a polyacetylene, and a phthalocyanine metal complex. Additional, suitable hosts are known to those skilled in the art, such are those described in U.S. Pat. No. 5,707,745, which is hereby incorporated by reference in its entirety.

In some embodiments, the host may be selected from the following:

-continued
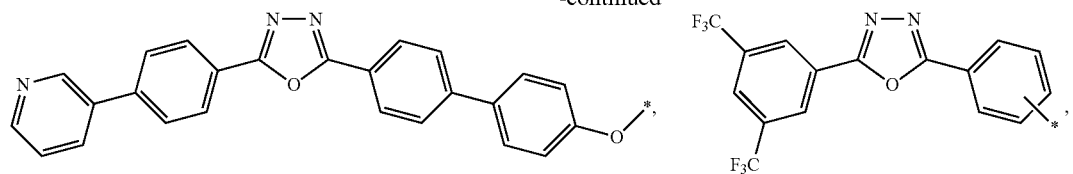
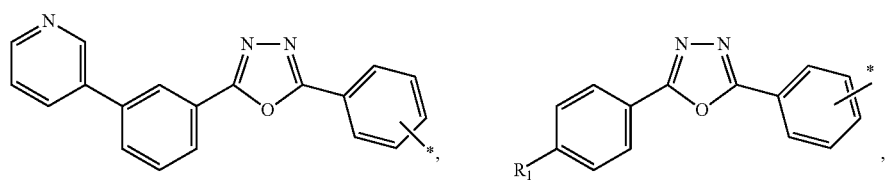
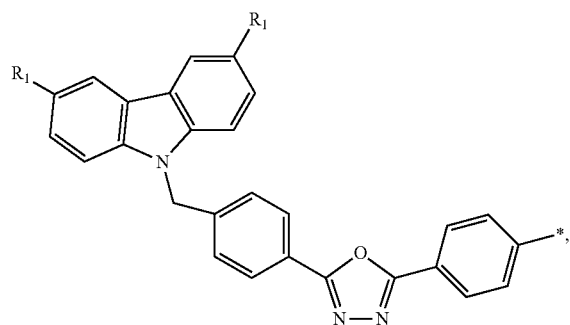
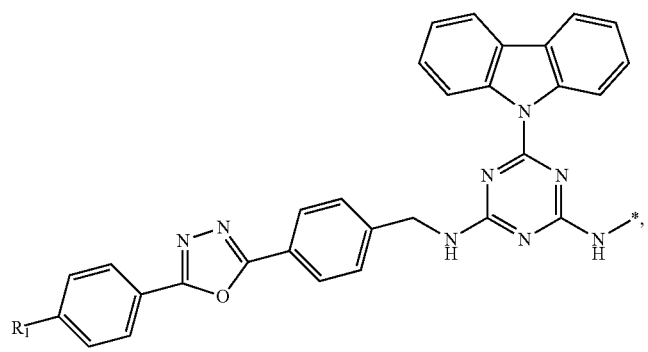
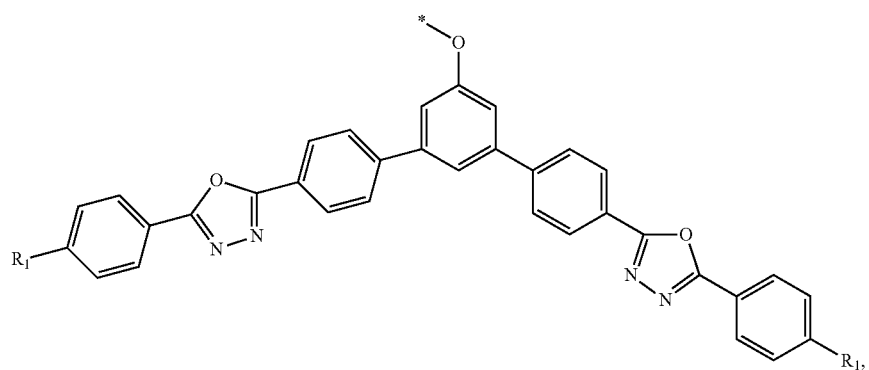

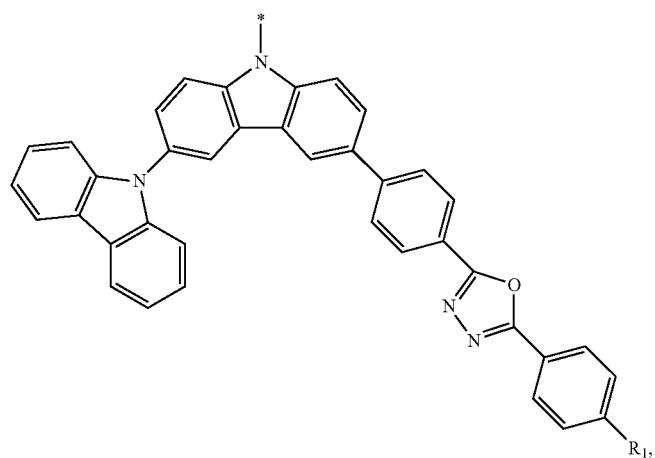
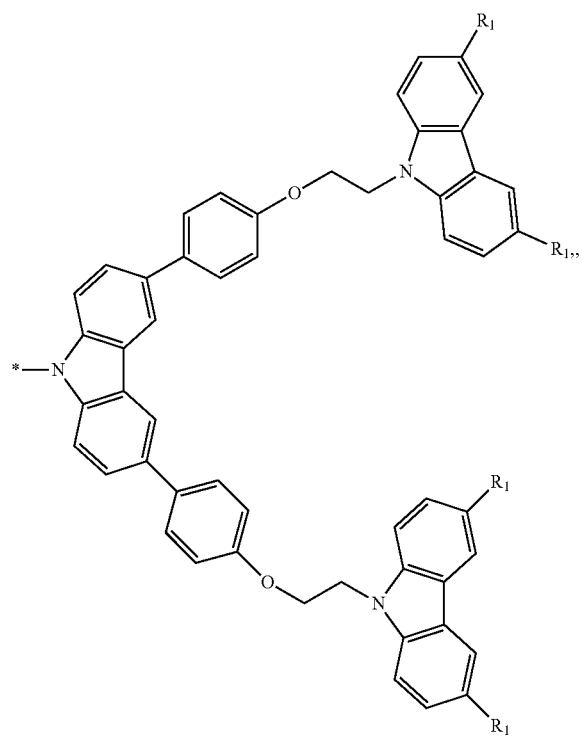
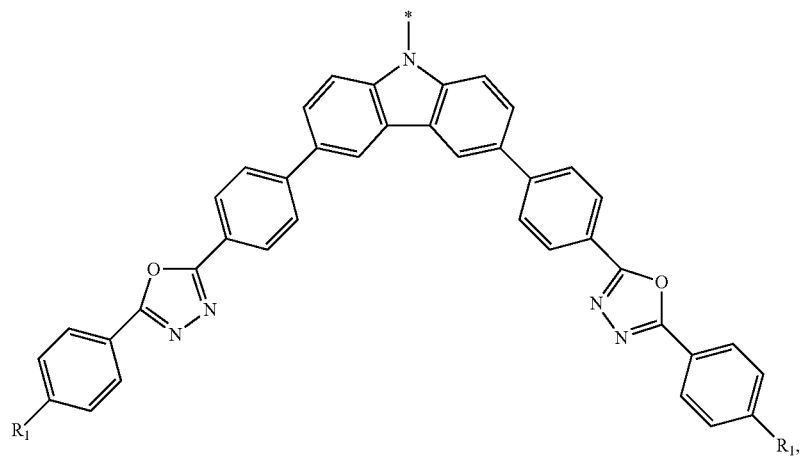

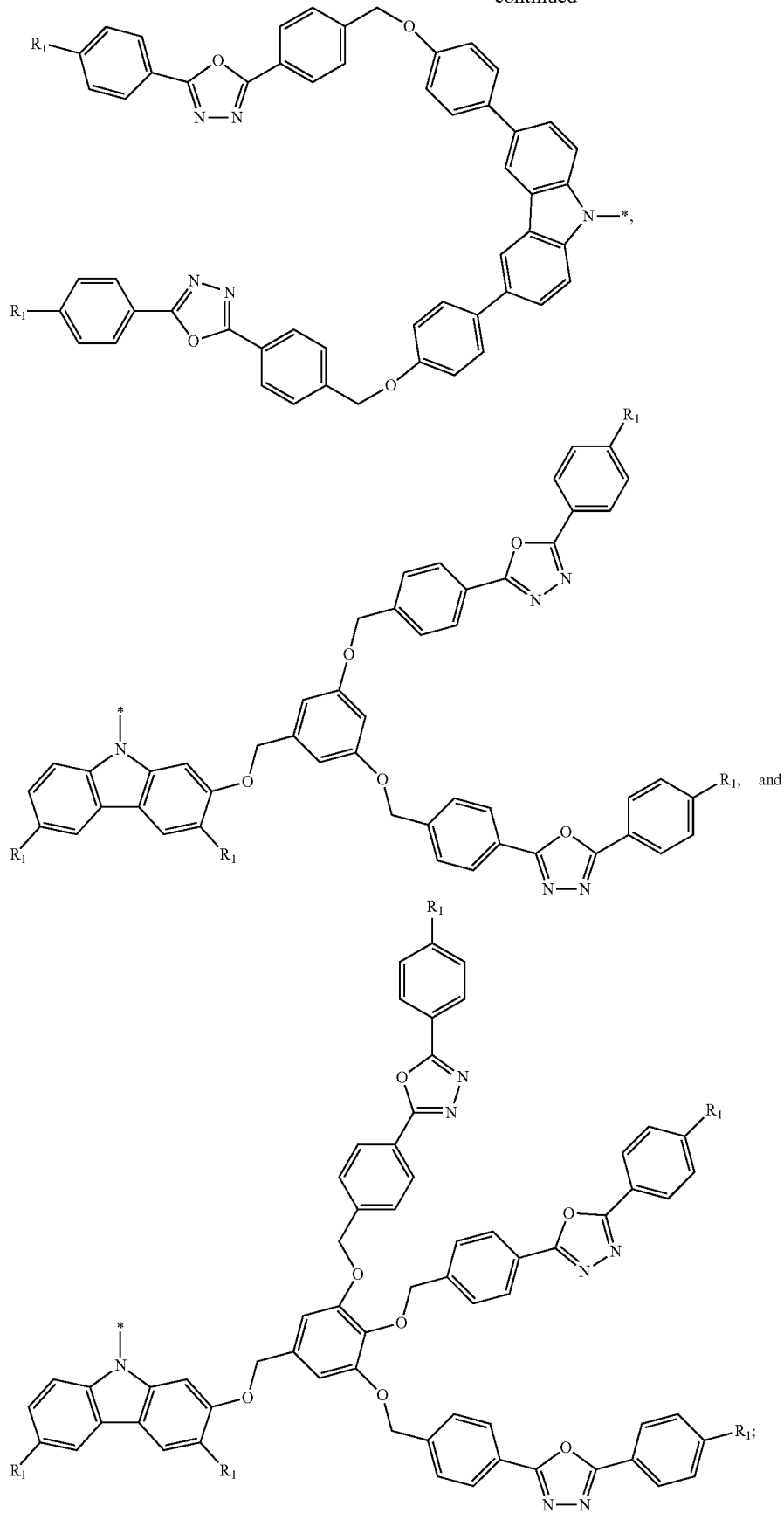

wherein $R_1$ is H or alkyl, and * indicates the site of attachment to the linking group or the core. In some embodiments, $R_1$ is H or $C_{1-10}$ alkyl, and alkyl may be linear or branched. In some embodiments, $R_1$ is H or $C_{1-6}$ alkyl, and alkyl may be linear or branched.
In some embodiment, the host can be selected from the following:
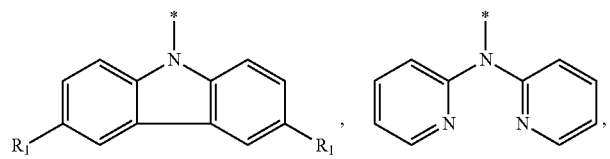
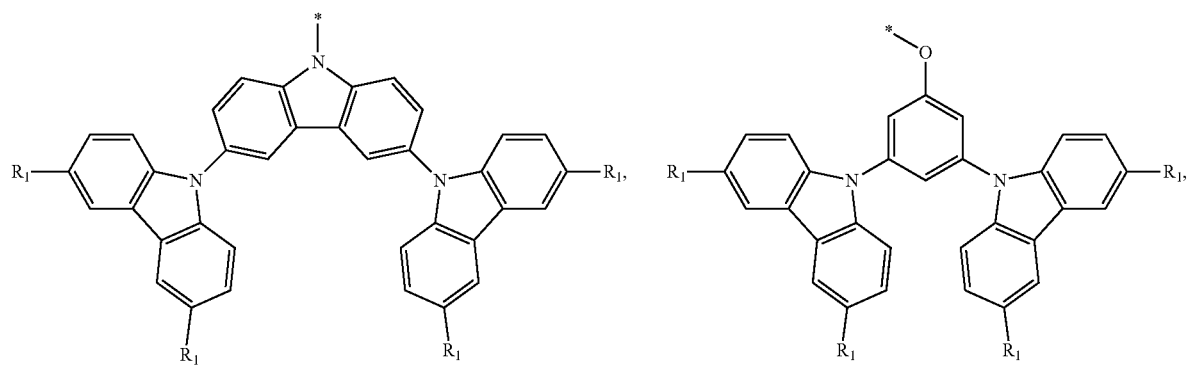
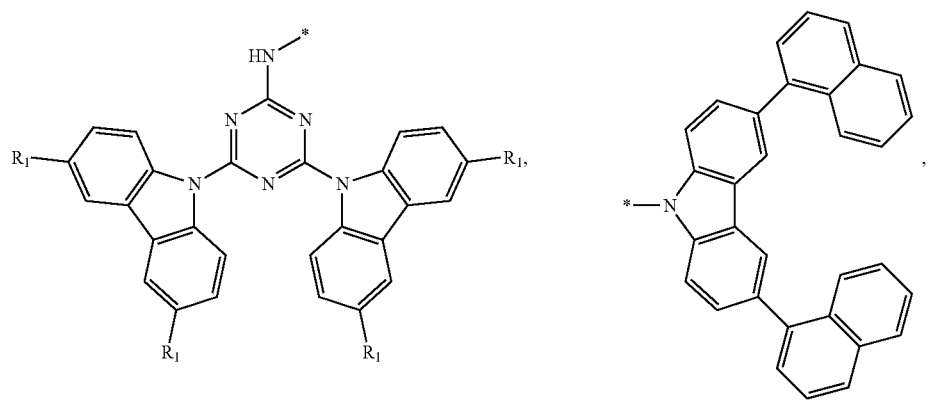
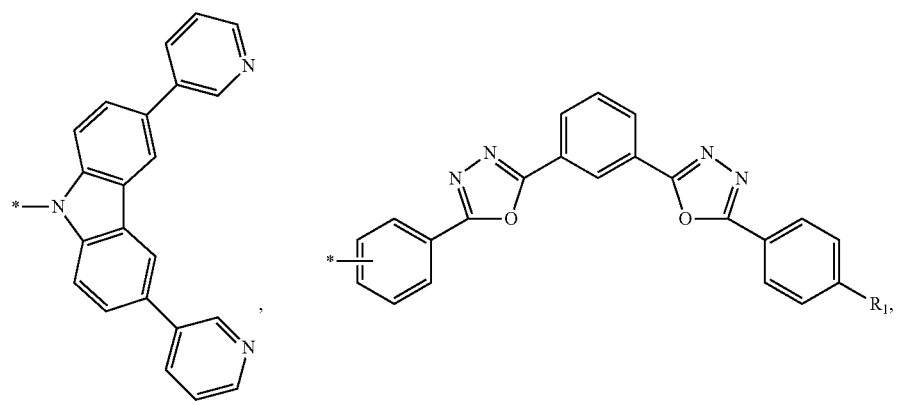

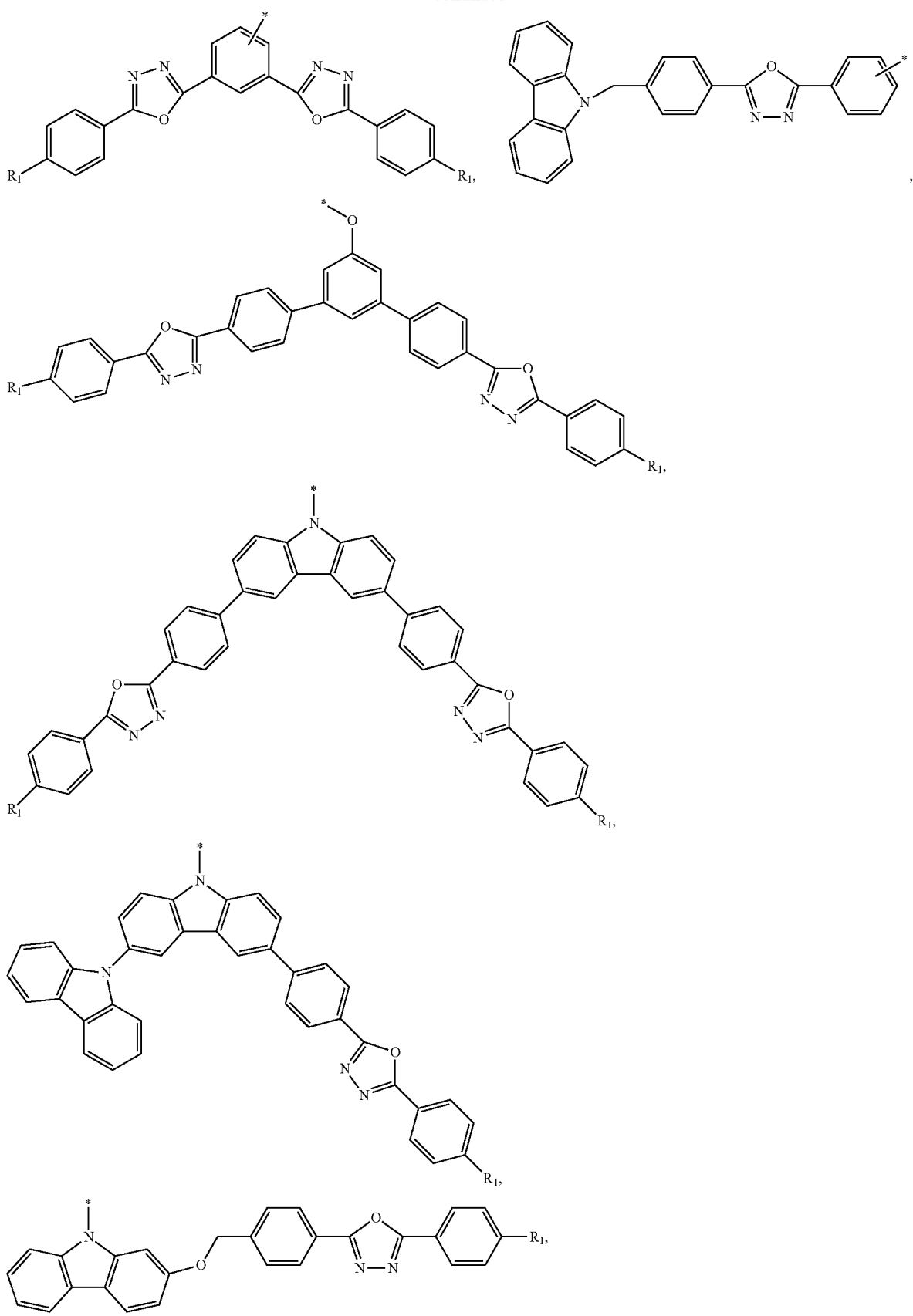

-continued
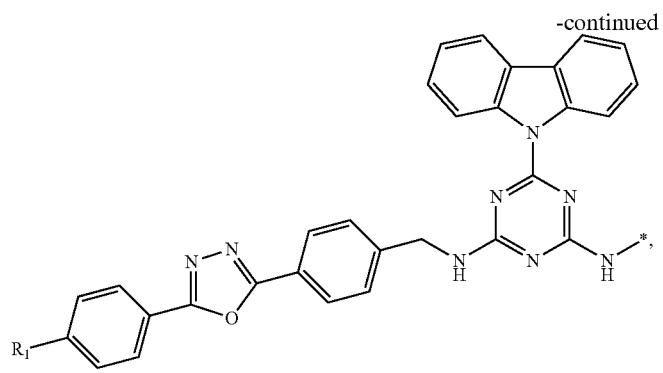
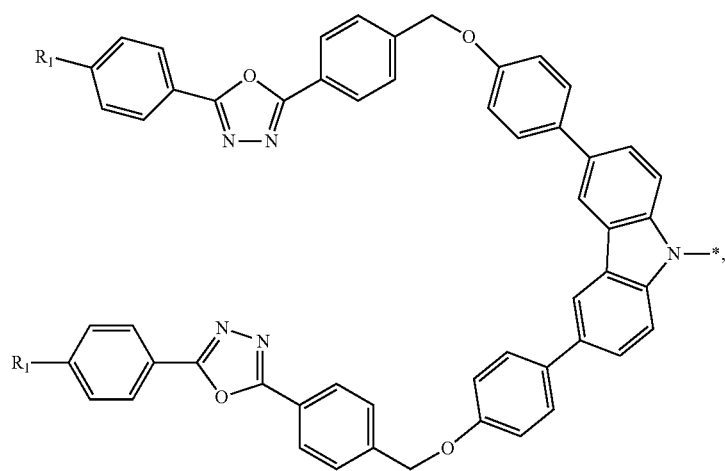
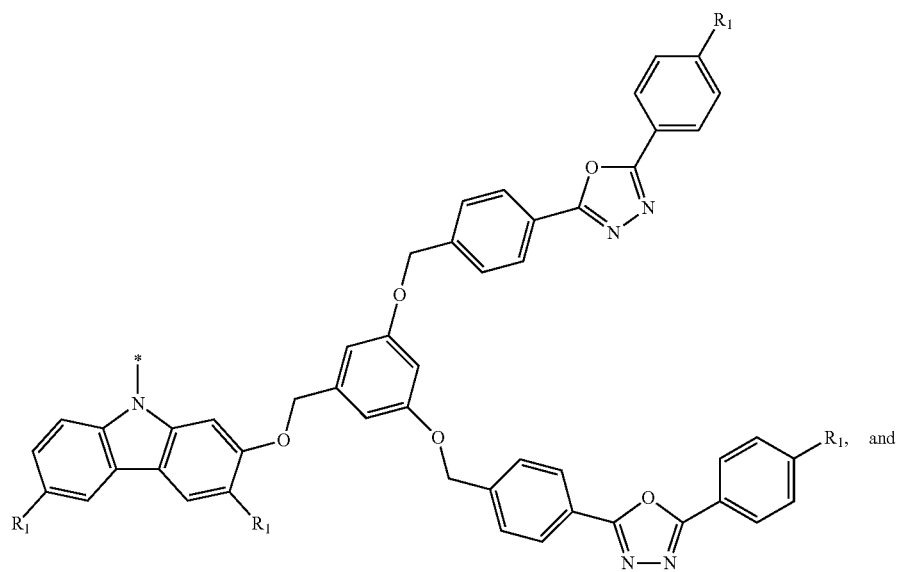
and

-continued
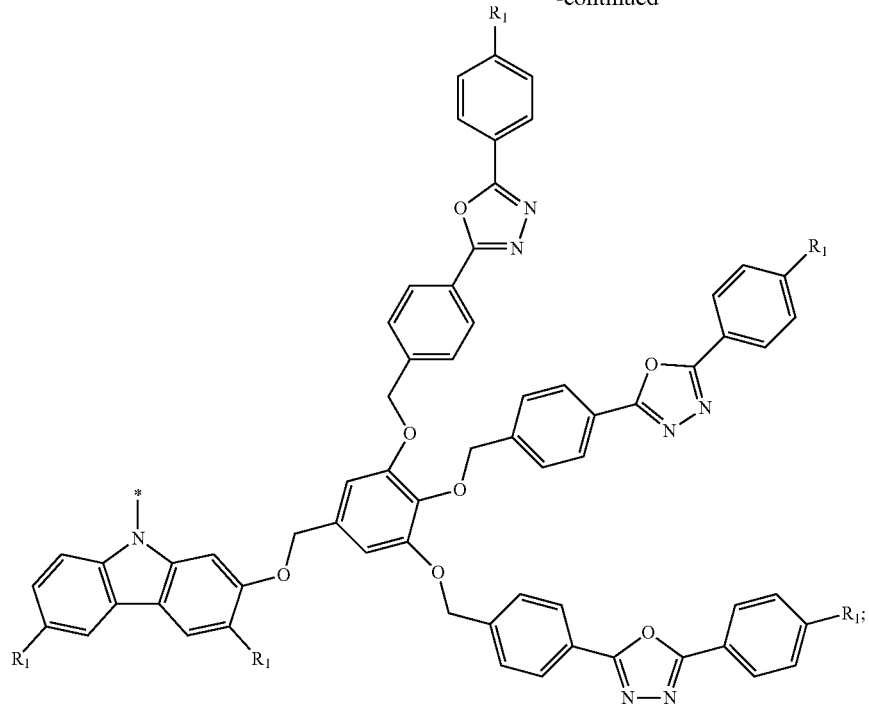
wherein $R_1$ is H or $C_{1-6}$ alkyl, alkyl may be linear or branched, and * indicates the site of attachment to the linking group or the core.
In some embodiments, the host may be selected from the following group consisting of:
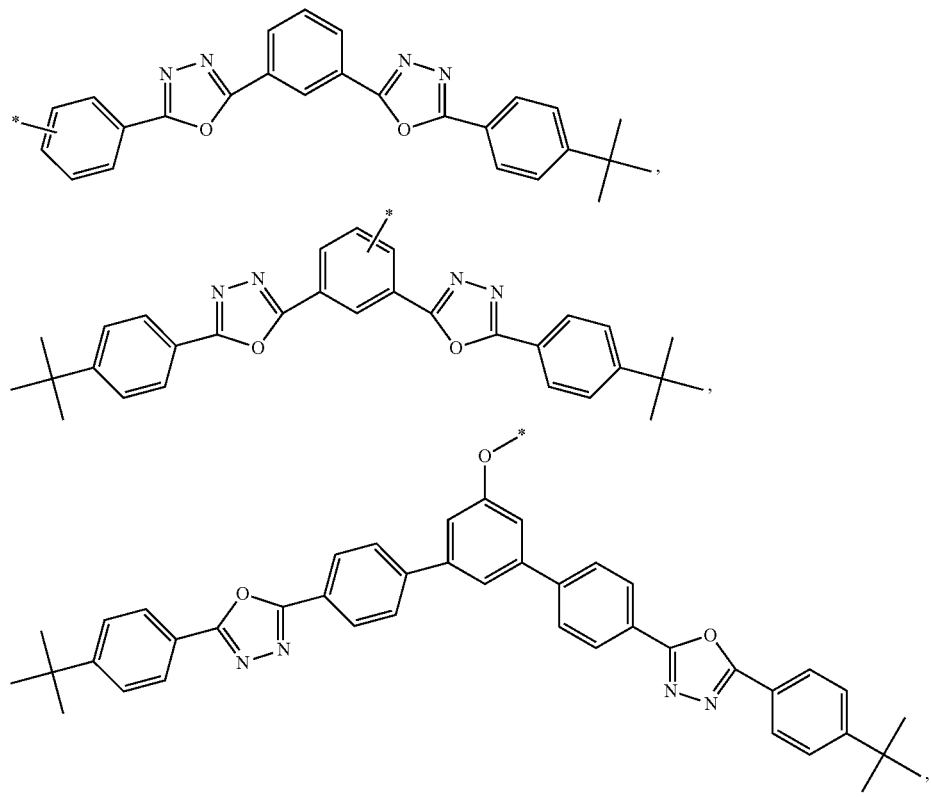

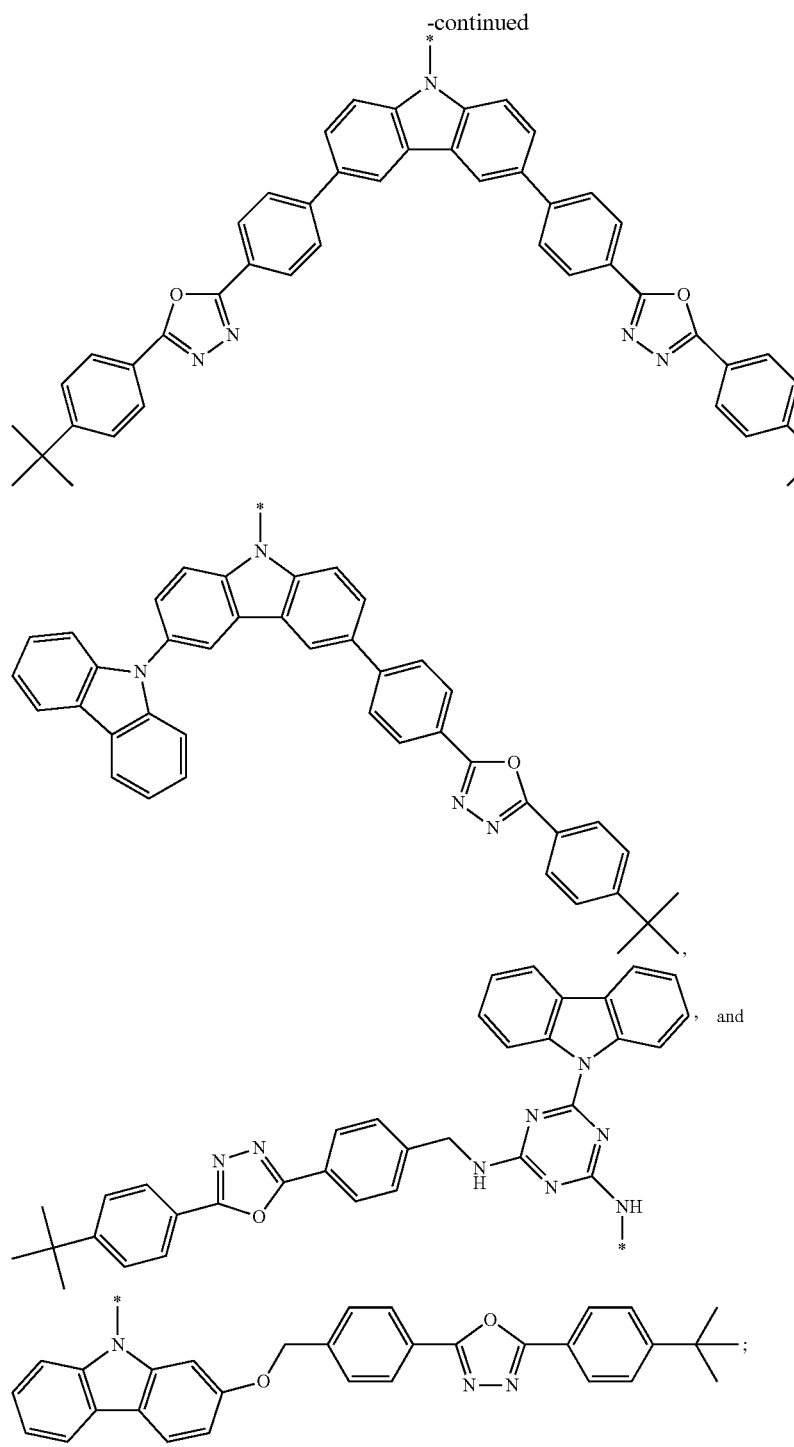

wherein * indicates the site of attachment to the linking group or the core.

In some embodiments, the host can have a molecular weight (MW)<1000 g/mol. Exemplary groups that can be hosts include an optionally substituted moiety selected from the following: an aromatic-substituted amine; a carbazole, a 3,6-disubstituted carbazole, an aromatic-substituted phosphine; a thiophene; an oxadiazole such as 2-(4-biphenylyl)-5-(4-tert-butylphenyl)-1,3,4-oxadiazole (PBD) and/or 1,3-bis(N,N-t-butyl-phenyl)-1,3,4-oxadiazole (OXD-7); a triazole such as 3-phenyl-4-(1'-naphthyl)-5-phenyl-1,2,4-triazole (TAZ), 3,4,5-Triphenyl-1,2,3-triazole and/or 3,5-Bis(4-tert-butyl-phenyl)-4-phenyl[1,2,4]triazole; an aromatic phenanthroline such as 2,9-dimethyl-4,7-diphenyl-phenanthroline (bathocuproine or BCP) and/or 2,9-Dimethyl-4,7-diphenyl-1,10-phenanthroline; a benzoxazole; a benzothiazole; a quinoline such as aluminum tris(8-hydroxyquinolate) (Alq3); a pyridine; a dicyanoimidazole; a cyano-substituted aromatic; 1,3,5-tris(2-N-phenylbenzimidazolyl)benzene (TPBI); 4,4'-bis[N-(naphthyl)-N-phenyl-amino]biphenyl (α-NPD); N,N'-bis(3-methylphenyl)N,N'-diphenyl-[1,1'-biphenyl]-4,4'-diamine (TPD); 4,4'-bis[N,N'-(3-tolyl)amino]-3,3'-dimethylbiphenyl (M14); 4,4'-bis[N,N'-(3-tolyl)amino]-3,3'-dimethylbiphenyl (HMTPD); 1,1-Bis(4-bis(4-methylphenyl)aminophenyl)cyclohexane; a carbazole such as 4,4'-N,N'-dicarbazole-biphenyl (CBP), poly(9-vinylcarbazole) (PVK), and/or N,N'N"-1,3,5-tricarbazoloylbenzene (tCP); a polythiophene; a benzidine such as N,N'-bis(4-butylphenyl)-N,N'-bis(phenyl)benzidine; a triphenylamine such as 4,4',4"-Tris(N-(naphthylen-2-yl)-N-phenylamino) triphenylamine and/or 4,4',4"-tris(3-methylphenylphenylamino)triphenylamine (MTDATA); a phenylenediamine; a polyacetylene, and a phthalocyanine metal complex. Additional, suitable hosts are known to those skilled in the art, such are those described in U.S. Pat. No. 5,707,745, which is hereby incorporated by reference in its entirety.

It is understood to those skilled in the art that the groups described above as possible hosts can function as hole-transport materials or electron-transport materials, or as ambipolar materials (containing both hole transport and electron transport moieties), or the mixture thereof. Exemplary hole-transport materials include carbazole, 4,4'-bis[N-(naphthyl)-N-phenyl-amino]biphenyl (α-NPD), N,N'-bis(3-methylphenyl) N,N'-diphenyl-[1,1'-biphenyl]-4,4'-diamine (TPD), 4,4'-bis [N,N'-(3-tolyl)amino]-3,3'-dimethylbiphenyl (M14), 4,4',4'-tris(3-methylphenylphenylamino)triphenylamine (MTDATA), 4,4'-bis[N,N'-(3-tolyl)amino]-3,3'-dimethylbiphenyl (HMTPD), N,N'N"-1,3,5-tricarbazoloylbenzene (tCP), 4,4'-N,N'-dicarbazole-biphenyl (CBP), poly(9-vinylcarbazole) (PVK), 3,4,5-Triphenyl-1,2,3-triazole, 3,5-Bis(4-tert-butyl-phenyl)-4-phenyl[1,2,4]triazole, 2,9-Dimethyl-4,7-diphenyl-1,10-phenanthroline, 1,1-Bis(4-bis(4-methylphenyl)aminophenyl)cyclohexane, N,N'-bis(4-butylphenyl)-N,N'-bis(phenyl)benzidine, 4,4',4"-Tris(N-(naphthylen-2-yl)-N-phenylamino)triphenylamine, and copper phthalocyanine. Examples of electron-transport materials include aluminum tris(8-hydroxyquinolate) (Alq3), 2-(4-biphenylyl)-5-(4-tert-butylphenyl)-1,3,4-oxadiazole (PBD), 1,3-bis(N,N-t-butyl-phenyl)-1,3,4-oxadiazole (OXD-7), 3-phenyl-4-(1-naphthyl)-5-phenyl-1,2,4-triazole (TAZ), 2,9-dimethyl-4,7-diphenyl-phenanthroline (bathocuproine or BCP), and 1,3,5-tris[2-N-phenylbenzimidazol-z-yl]benzene (TPBI).

A wide variety of lumophores and host groups are commercially available. The lumophores and host groups may be modified (if such modification is needed) to contain a functional group (such as a primary alkene group) capable of reacting with a functional group (such as silane) on the nanoparticle core. The process described above may also be modified to utilize other nanoparticles.

Lumophore-functionalized nanoparticles may be configured to emit various colors, depending on the identities of the lumophores and hosts, and on the relative ratios of hosts to lumophores. The relative ratio of lumophores to hosts is preferably selected so that the resulting mixture of the lumophore-functionalized nanoparticles emits the desired color, (e.g., white light). Additionally, the identities of the lumophores and host groups, and the relative ratio of host groups to lumophores are selected so as to have a high level of energy transfer from the host(s) to the lumophore(s) and/or so that light is emitted when energy is transferred to the lumophore(s) from the host(s) from both excimers and monomers. In another embodiment, the identities of the lumophores and hosts are selected to emit white light. White light can be obtained by the appropriate choice of lumophores and/or hosts, and/or the relative ratios of hosts to lumophores. In another embodiment, the chosen lumophores have Commission Internationale de L'Eclairage (CIE) color coordinates that lie on a line which substantially intersects the achromatic point. For example, host/lumophore-functionalized nanoparticles, e.g., FPt-6/carbazole-functionalized nanoparticles, may be used to generate white light. In some embodiments, the identities of the lumophores and the relative ratio of lumophores to hosts can be selected to as to have a CRI value in the range of about 60 to about 100. In an embodiment, the identities of the lumophores and the relative ratio of lumophores to hosts can be selected to as to have a CRI value in the range of about 80 to about 100. In some embodiments, the identities of the lumophores and the relative ratio of lumophores to host groups can be selected to as to have a CRI value greater than 70. The white light-emitting nanoparticles can be configured to emit white light under conditions known to those skilled in the art such as, for example, irradiation with ultraviolet light, preferably light with a wavelength between about 250 nm and about 420 nm.

In some embodiments, the nanoparticle core can be a single silsesquioxane with a silsesquioxane core represented by Formula (II). The silsesquioxane core shown in Formula (II) has a relatively stiff cubical structure and the lumophores can be attached at the vertices of the silsesquioxane at one or more location represented by R. In other embodiments, the nanoparticle core can be represente by Formula (III). The lumophores may be attached to at least one location represented by R'. In some embodiments, one more host moiety may also be attached to the core at a locations R or R' to form host/lumophore-functionalized nanoparticles. Without being bound by any theory of operation, it is believed that the nanoparticle core acts to decouple the emitting states of the lumophores and prevent physical interactions between lumophores. Moreover, it is believed that the incorporation of lumophores onto the exterior surface of the nanoparticle core, rather than embedding the lumophores in the nanoparticle matrix or core, substantially reduces the interaction between the lumophores and hence prevents aggregation. As a result, the emission of white light by the lumophore-functionalized nanoparticles described herein is improved. In addition, it is believed that the silsesquioxane core lends some thermal stability to the light-emitting compositions described herein. Exemplary host/lumophore-functionalized nanoparticles with a silsesquioxane core are shown below:

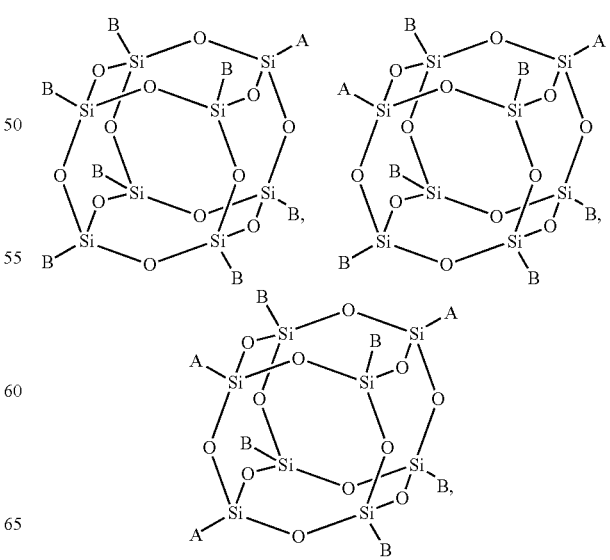

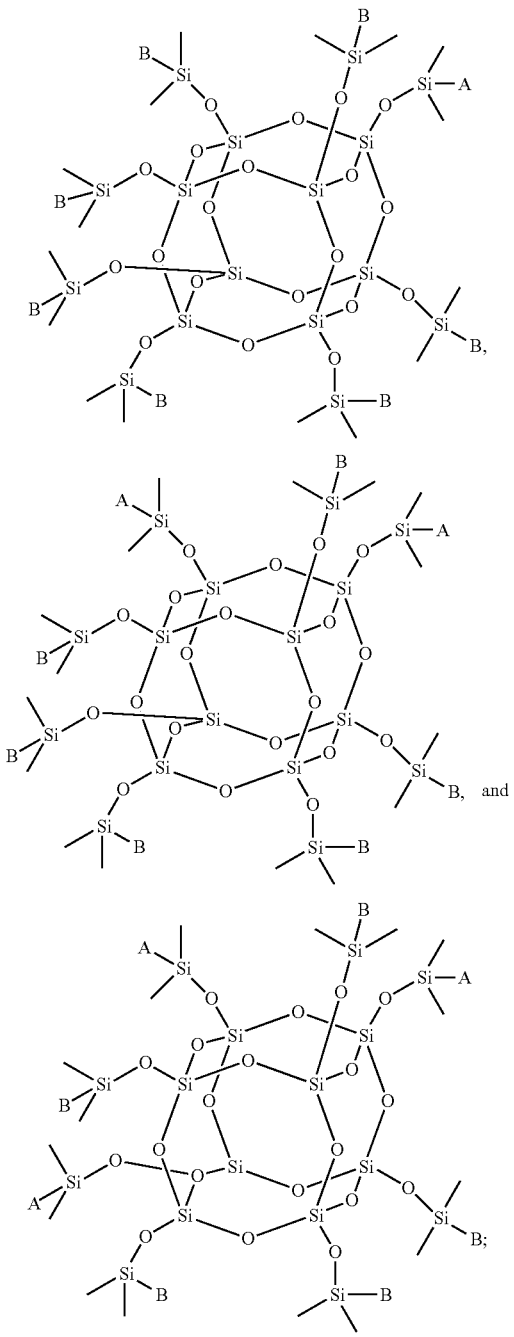

wherein A is a lumophore and B is a host.

An embodiment provides a light-emitting composition that includes a blend of host-functionalized nanoparticles and host/lumophore-functionalized nanoparticles. For example, the light-emitting composition can comprise a mixture of an amount of a first compound of formula (I), wherein the core is 1,3,5,7,9,11,13,15-octakis(dimethylsilyloxy)pentacyclo-[9.5.1.1$^{3,9}$.1$^{5,15}$.1$^{7,13}$]octasiloxane, m=0, n=0, p=1, q=1, x=1 and y=7; an amount of a second compound of formula (I), wherein core is 1,3,5,7,9,11,13,15-octakis(dimethylsilyloxy) pentacyclo-[9.5.1.1$^{3,9}$.1$^{5,15}$.1$^{7,13}$]octasiloxane, m=0, n=0, p=1, q=1, x=2 and y=6; and an amount of a third compound having the structure:

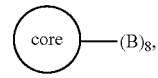

wherein the core is 1,3,5,7,9,11,13,15-octakis(dimethylsilyloxy)pentacyclo-[9.5.1.1$^{3,9}$.1$^{5,15}$.1$^{7,13}$]octasiloxane and B is as defined above in Formula (I). The first compound is also a host/lumophore-functionalized nanoparticle represented by formula (IV), the second compound is also a host/lumophore-functionalized nanoparticle represented by formula (V), and the third compound is a host-functionalized nanoparticle represented by formula (VI) below.

(IV)

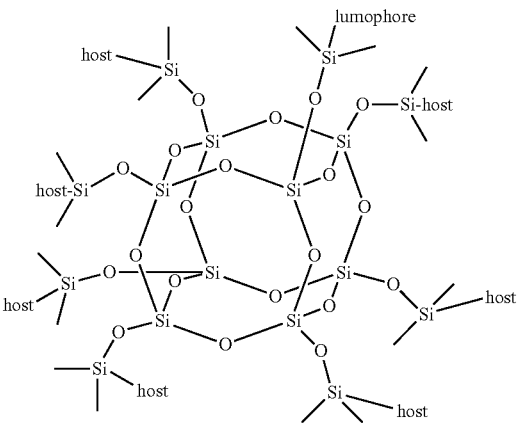

(V)

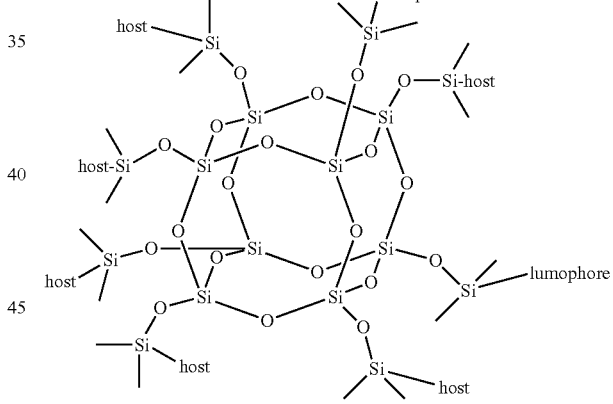

(VI)

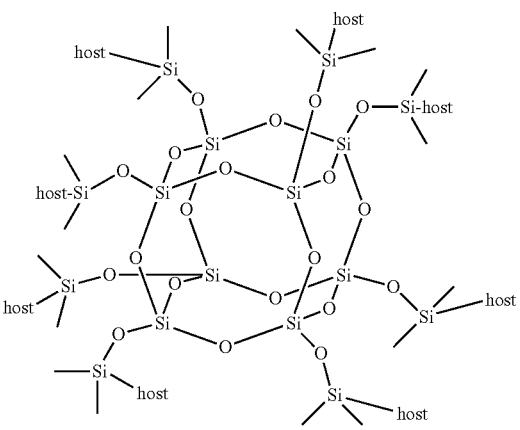

In Formulae (IV), (V) and (VI), "host" and "lumophore" represent independently selected lumophores and hosts, respectively, from the lists for A (i.e., lumophore) and B (i.e., host) above. In an embodiment, the light-emitting composition can be a mixture that includes an amount of the first compound of formula (I) in the range of about 40 mole/mole % to about 60 mole/mole %; and an amount of the second compound of formula (I) in the range of about 10 mole/mole % to about 30 mole/mole %; and an amount of the third compound of formula (VI) in the range of about 10 mole/mole % to about 50 mole/mole %.

In one embodiment, the light emitting composition may consist essentially of a compound of formula (I), wherein the core is 1,3,5,7,9,11,13,15-octakis(dimethylsilyloxy)pentacyclo-[9.5.1.1$^{3,9}$.1$^{5,15}$.1$^{7,13}$]octasiloxane, m=0, n=0, p=1, q=1, x=1 and y=7. Such compound may be represented by Formula (IV).

In another embodiment, the light emitting composition may consist essentially of a compound of formula (I), wherein the core is 1,3,5,7,9,11,13,15-octakis(dimethylsilyloxy)pentacyclo-[9.5.1.1$^{3,9}$.1$^{5,15}$.1$^{7,13}$]octasiloxane, m=0, n=0, p=1, q=1, x=2 and y=6. Such compound may be represented by Formula (V).

In some embodiments, the lumophore-functionalized nanoparticles described herein can be incorporated into light-emitting devices in various ways. For example, an embodiment provides a light-emitting device, comprising: an anode layer comprising a high work function metal; a cathode layer comprising a low work function metal; and a light-emitting layer positioned between, and electrically connected to, the anode layer and the cathode layer.

In some embodiments, the light-emitting layer comprises a lumophore-functionalized nanoparticle or composition thereof, as described herein. For example, in some embodiments, the light-emitting layer comprises one or more lumophore-functionalized nanoparticles such as phosphorescent emitting-lumophore-functionalized nanoparticles. In an embodiment, the lumophore-functionalized nanoparticle is represented by Formula (I). In an embodiment, the lumophore-functionalized nanoparticle is an organic-inorganic lumophore-functionalized nanoparticle. In an embodiment, the organic-inorganic lumophore-functionalized nanoparticle comprises a nanoparticle core that comprises inorganic elements such as phosphorous (P), silicon (Si), and/or a metal. For example, in an embodiment, a nanoparticle core comprises a moiety selected from the group consisting of a silsesquioxane, a cyclophosphazene, a triazine, a cyclodextrin, a calixarene, a phthalocyanine, and a silica particle. In some embodiments, the light-emitting layer comprises a blend of host/lumophore-functionalized nanoparticles.

The amount of the lumophore-functionalized nanoparticle in the light-emitting composition can vary. In some embodiments, the amount of lumophore-functionalized nanoparticle in the light-emitting composition layer can be in the range of from about 1% to about 100% by weight based on total weight of the light-emitting layer. In an embodiment, the amount of lumophore-functionalized nanoparticle in the light-emitting layer can be in the range of from about 30% to about 70% by weight based on total weight of the light-emitting layer. In some embodiments, the amount of lumophore-functionalized nanoparticle in the light-emitting layer can be in the range of from about 1% to about 10% by weight based on total weight of the light-emitting layer. In some embodiments, the light-emitting layer can have a thickness in the range of about 30 nm to about 250 nm.

In some embodiments, one or more additional compounds may be added to the light-emitting layer. The additional compound(s) can be selected from the group consisting of electron-transport moiety, a hole-transport moiety, an electron-injection moiety and hole-injection moiety such as those described herein. In an embodiment, one of the additional compounds can be an electron transport compound such as those described herein. An example of a suitable electron transport material is OXD-7. In an embodiment, one of the additional compounds can be a hole-transport compound including those described herein. The additional compounds can be incorporated into the light-emitting layer using methods known to those skilled in the art. One method is mixing the lumophore-functionalized nanoparticles described herein with the addition compound in a solvent and forming the light-emitting layer by a wet process.

An anode layer may comprise a conventional material such as a metal, mixed metal, alloy, metal oxide or mixed-metal oxide, or a conductive polymer. Examples of suitable metals include the Group 1 metals, the metals in Groups 4, 5, 6, and the Group 8-10 transition metals. If the anode layer is to be light-transmitting, mixed-metal oxides of Group 12, 13, and 14 metals or alloys thereof, such as Au, Pt, and indium-tin-oxide (ITO), may be used. The anode layer may include an organic material such as polyaniline, e.g., as described in "Flexible light-emitting diodes made from soluble conducting polymer," Nature, vol. 357, pp. 477-479 (Jun. 11, 1992). Examples of suitable high work function metals include but are not limited to Au, Pt, indium-tin-oxide (ITO), or alloys thereof. In an embodiment, the anode layer can have a thickness in the range of about 1 nm to about 1000 nm.

A cathode layer may include a material having a lower work function than the anode layer. Examples of suitable materials for the cathode layer include those selected from alkali metals of Group 1, Group 2 metals, Group 12 metals including rare earth elements, lanthanides and actinides, materials such as aluminum, indium, calcium, barium, samarium and magnesium, and combinations thereof. Li-containing organometallic compounds, LiF, and Li$_2$O may also be deposited between the organic layer and the cathode layer to lower the operating voltage. Suitable low work function metals include but are not limited to Al, Ag, Mg, Ca, Cu, Mg/Ag, LiF/Al, CsF, CsF/Al or alloys thereof. In an embodiment, the cathode layer can have a thickness in the range of about 1 nm to about 1000 nm.

If desired, additional layers may be included in the light-emitting device. Additional layers that may be included include an electron injection layer (EIL), electron transport layer (ETL), hole blocking layer (HBL), exciton blocking layer (EBL), hole transport layer (HTL), and/or hole injection layer (HIL).

In some embodiments, the light-emitting device can include an electron injection layer (EIL), e.g., between the cathode layer and the light emitting layer. The lowest unoccupied molecular orbital (LUMO) energy level of the material(s) that can be included in the electron injection layer is preferably high enough to prevent it from receiving an electron from the light emitting layer. The energy difference between the LUMO of the material(s) that can be included in the electron injection layer and the work function of the cathode layer is preferably small enough to allow efficient electron injection from the cathode. A number of suitable electron injection materials are known to those skilled in the art. Examples of suitable material(s) that can be included in the electron injection layer include but are not limited to, an optionally substituted compound selected from the following: aluminum quinolate (Alq$_3$), 2-(4-biphenylyl)-5-(4-tert-butylphenyl)-1,3,4-oxadiazole (PBD), phenanthroline, quinoxaline, 1,3,5-tris[N-phenylbenzimidazol-z-yl]benzene (TPBI) a triazine, a metal chelate of 8-hydroxyquinoline such as tris(8-hydroxyquinoliate) aluminum, and a metal thioxinoid compound such as bis(8-quinolinethiolato) zinc.

Some embodiments described herein can include an electron transport layer (ETL) positioned between the cathode and light-emitting layer. Exemplary electron transport materials that can be included in the electron transport layer are described herein.

In another embodiment, the device can include a hole blocking layer (HBL), e.g., between the cathode and the light-emitting layer. Various suitable hole blocking materials that can be included in the hole blocking layer are known to those skilled in the art. Suitable hole blocking material(s) include but are not limited to, an optionally substituted compound selected from the following: bathocuproine (BCP), 3,4,5-triphenyl-1,2,4-triazole, 3,5-bis(4-tert-butyl-phenyl)-4-phenyl-[1,2,4]triazole, 2,9-dimethyl-4,7-diphenyl-1,10-phenanthroline, and 1,1-bis(4-bis(4-methylphenyl)aminophenyl)-cyclohexane.

In still another embodiment, the light-emitting device can include an exciton blocking layer (EBL), e.g., between the light-emitting layer and the anode. The band gap of the material(s) that comprise exciton blocking layer is preferably large enough to substantially prevent the diffusion of excitons. A number of suitable exciton blocking materials that can be included in the exciton blocking layer are known to those skilled in the art. Examples of material(s) that can compose an exciton blocking layer include an optionally substituted compound selected from the following: aluminum quinolate ($Alq_3$), 4,4'-bis[N-(naphthyl)-N-phenyl-amino]biphenyl (α-NPD), 4,4'-N,N'-dicarbazole-biphenyl (CBP), and bathocuproine (BCP), and any other material(s) that have a large enough band gap to substantially prevent the diffusion of excitons.

In yet still another embodiment, the light-emitting device can include a hole transport layer (HTL), e.g., between the light-emitting layer and the anode. Suitable hole transport material(s) that can be included in the hole transport layer are described herein.

In an embodiment, the light-emitting device can include a hole injection layer (HIL), e.g., between the light-emitting layer and the anode. Various suitable hole injection materials that can be included in the hole injection layer are known to those skilled in the art. Exemplary hole injection material(s) include an optionally substituted compound selected from the following: a polythiophene derivative such as polytheylenedioxythiophene (PEDOT)/polystyrene sulphonic acid (PSS), a benzidine derivative such as N,N,N',N'-tetraphenylbenzidine, poly(N,N'-bis(4-butylphenyl)-N,N'-bis(phenyl)benzidine), a triphenylamine or phenylenediamine derivative such as N,N'-bis(4-methylphenyl)-N,N'-bis(phenyl)-1,4-phenylenediamine, 4,4',4''-tris(N-(naphthylen-2-yl)-N-phenylamino)triphenylamine, an oxadiazole derivative such as 1,3-bis(5-(4-diphenylamino)phenyl-1,3,4-oxadiazol-2-yl) benzene, a polyacetylene derivative such as poly(1,2-bis-benzylthio-acetylene), or a phthalocyanine metal complex derivative such as phthalocyanine copper. Hole-injection materials while still being able to transport holes are distinguished from conventional hole-transport materials in that hole injection materials have a hole mobility substantially less than the hole mobility of conventional hole transport materials.

Figure 5A:
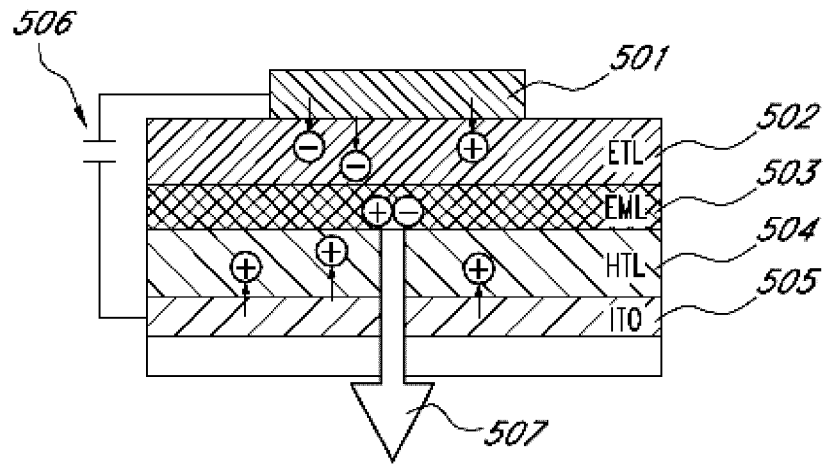
FIGS. 5A and 5B are exemplary configurations of organic light-emitting devices.
Figure 5B:
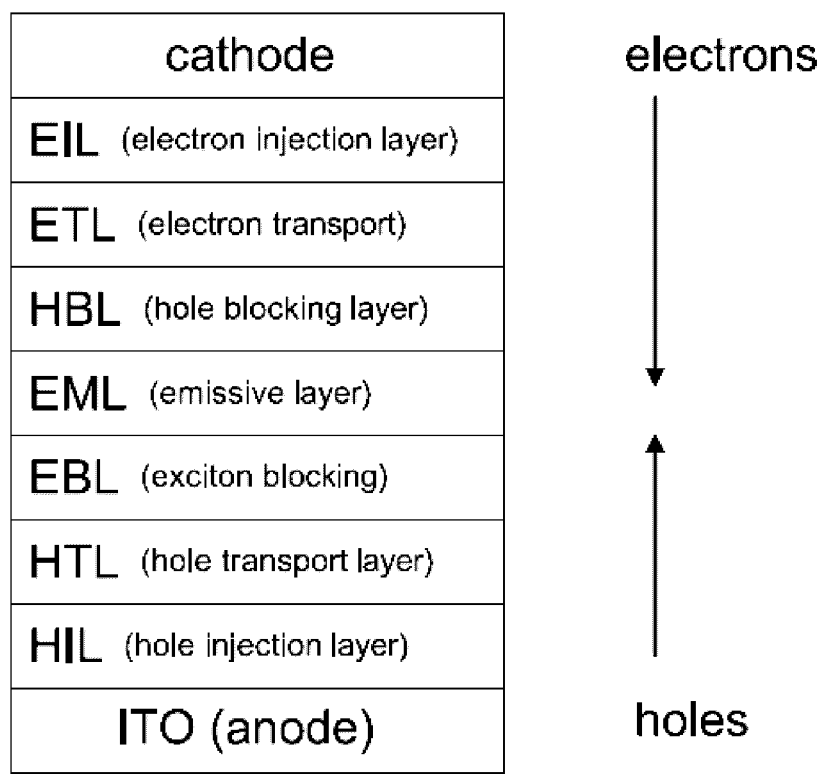

Those skilled in the art recognize that the various materials described above can be incorporated in several different layers depending on the configuration of the device. Preferably, the materials used in each layer are selected to result in the recombination of the holes and electrons in the light-emitting layer. An example of a device configuration that incorporates the various layers described herein is illustrated schematically in FIG. 5A. A light-emitting device may comprise a cathode 501, an electron transport layer 502, an emissive layer 503, a hole transport layer 504, and a transparent anode 505 (e.g., ITO coated glass or plastic). The cathode 501 and anode 505 are connected to a voltage generator 506 or a power source. The electrons are injected into the electron transport layer 502 from the cathode 501, while the holes are injected into hole transport layer 504 from the anode 505. When an electron and a hole recombine in the emissive layer 503, the energy is release and the light 507 is generated. Another example of a device configuration that incorporates the various layers described herein is illustrated schematically in FIG. 5B. The electron injection layer (EIL), electron transport layer (ETL), hole blocking layer (HBL), exciton blocking layer (EBL), hole transport layer (HTL), and hole injection layer (HIL) can be added to the light-emitting device using methods known to those skilled in the art (e.g., vapor deposition).

In some of the embodiments described herein the light-emitting composition is configured to emit white light. In an embodiment, the light-emitting layer can emit light having a CIE x-coordinate of about 0.28 to about 0.50 and a CIE y-coordinate of about 0.28 to about 0.50.

Light-emitting devices comprising lumophore-functionalized nanoparticles can be fabricated using techniques known in the art, as informed by the guidance provided herein. For example, a glass substrate can be coated with a high work functioning metal such as ITO, which can act as an anode. After patterning the anode layer, a light-emitting composition layer that includes the lumophore-functionalized nanoparticles can be deposited on the anode. The cathode layer, comprising a low work functioning metal (e.g., Mg:Ag), can then be vapor evaporated onto the light-emitting composition layer.

In some embodiments, the device can also include an electron transport/injection layer, a hole blocking layer, a hole injection layer, an exciton blocking layer and/or a second light-emitting layer that can be added to the device using techniques known in the art, as informed by the guidance provided herein. In a preferred embodiment, an advantage of the light-emitting compositions described herein is that their molecular weights are large enough to allow for spray, dip, printing, and/or spray coating. Thus, the lighting-emitting device can be produced without having to employ complicated and expensive multilayer vapor deposition. Furthermore, in another preferred embodiment, the lumophore-functionalized nanoparticles described herein can be easily spun off onto a hard or flexible substrate. As a result, the manufacture of the OLED device becomes much easier.

Embodiments of the lumophore-functionalized nanoparticles as described herein may provide one or more advantages over the molecular and polymer approaches currently described in the literature. While not to be bound by any particular theory, in one mode of operation, the lumophore-functionalized nanoparticles described herein can produce white light by the combined monomer/excimer emissions of a lumophore that is covalently bonded to the host/lumophore-functionalized core, thus reducing or eliminating the need for doping. By eliminating the doping process, in some embodiments, the compositions and devices described herein will have better color stability as compared to their doped counterparts. It is believed that this extra stability is achieved because the attachment of both the host and the lumophore to the core prevents aggregation of the lumophore and the host which often occurs in doped systems due to reorientation of the lumophore over time and/or with fluctuation of temperature. Moreover, in an embodiment, by reducing or eliminating changes in the concentration of the aggregate species in the emission layer, the monomer/aggregate emission ratio will not significantly change over time and a stable emission color will result. In some embodiments, the lighting-compositions and devices described herein have the potential to make device lifetimes much longer by eliminating the need to deal with the compatibility between polymer matrix and doped lumophores. Furthermore, in an embodiment, the light-emitting compositions described herein are capable of producing a monodisperse single molecular emitter, which enhances the quality and reproducibility of the product. In addition, in some embodiments, the intermolecular distances and orientations will be more controllable relative to a doped system, which will allow fine tuning of the device properties.

EXAMPLES

Representative embodiments of the invention will now be described, including how such embodiments may be made. It is understood that the methods, materials, conditions, process parameters, apparatus and the like do not necessarily limit the scope of the invention. It is also contemplated that all materials suitable for use as an anode, a cathode, a hole-injection/smoothing layer, an electron-injection layer, an electron-transport layer, a hole-transport layer, dopants and other components of a light-emitting device can be used in connection with the embodiments of this invention.

The general synthesis of functionalized POSS materials is shown in Example 3, illustrating that the color balance can be easily adjusted by changing the amount of phosphorescent-emitting lumophores attached to the POSS nanoparticle core:

Example 1

Synthesis of Platinum(II) (2-(4',6'-difluorophenyl)pyridinato-N,C$^{2'}$)(2,4-oct-7-en-dionato-O,O) (FPt-4), and Platinum(II) (2-(4',6'-difluorophenyl)pyridinato-N,C$^{2'}$)(3-allylpentane-2,4-dionato-O,O) (FPt-6)

Figure 4:
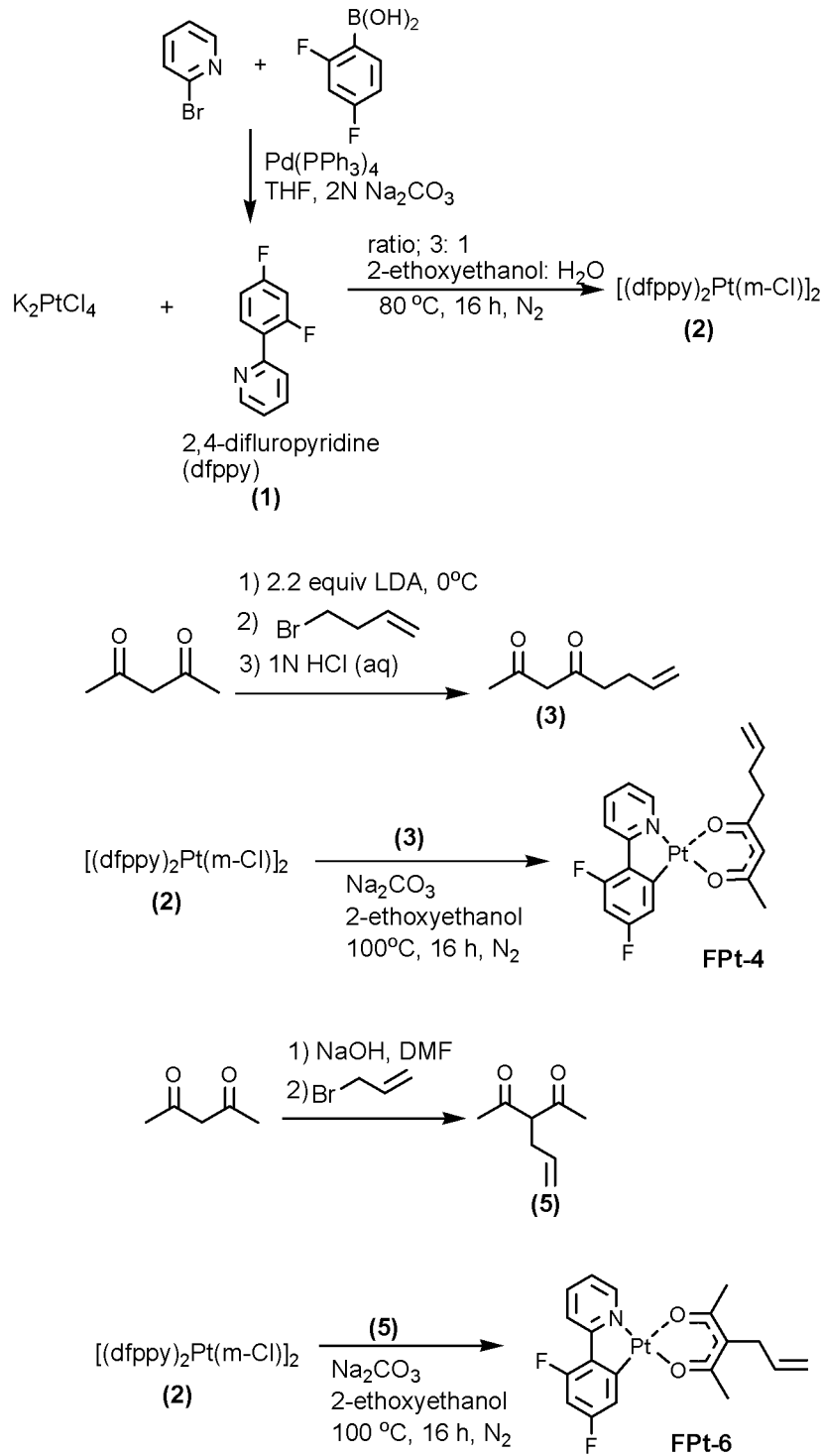
FIG. 4 illustrates a general process for preparing platinum (II) (2-(4',6'-difluorophenyl)pyridinato-N, $C^{2'}$)(2,4-oct-7-endionato-O,O), (FPt-4), and platinum(II) (2-(4',6'-difluorophenyl)pyridinato-N,$C^{2'}$)(3-allylpentane-2,4-dionato-O,O) (FPt-6).

The 2-(2,4-Difluorophenyl)pyridine (dfppy), 1, was synthesized using methods described in *J. Am. Chem. Soc.*, 2005, 127, 12438, *Synlett.* 1999, 1, 45-48, and *Appl. organometal. Chem.*, 2005, 19, 1225. The Pt (II) μ-dichloro-bridged dimer, [(dfppy)Pt(μ-Cl)]$_2$, 2, and monomeric Pt (II) complexes, FPt-4 and FPt-6, were prepared by a similar procedure that disclosed in *Inorg Chem.* 2002, 41, 3055, and *J. Chem. Soc. Dalton. Trans.*, 1973, 404-410. 7-octene-2,4-pentanedione, 3, and its analogue compounds were synthesized using methods disclosed in *J. Am. Chem. Soc.*, 2003, 125(8), 2056, *Organometallics.* 2005, 24(2), 287, and *Helv Chim Acta* 1974, 57, 2306. Ally-2,4-pentanedione, 5, was synthesized in an accordance with the procedures described in *J. Am. Chem. Soc.*, 1955, 77, 3284. All the aforementioned references with respect to the synthesis of compounds 1-5 are hereby incorporated by reference in their entireties. The experimental details are described in detail below, and the process for preparing FPt-4 and FPt-6 are shown in FIG. 4.

Synthesis of dfppy, 1

2-Bromopyridine (2.01 mL, 21.1 mmol), 2,4-difluorophenylboronic acid (4.00 g, 25.3 mmol) and tetrakis(triphenylphosphine)palladium(0) (0.732 g, 0.633 mmol) were added to round-bottomed flask with reflux condenser and dissolved to 50 mL of THF. After 30 mL of aqueous 2N Na$_2$CO$_3$ was introduced, the reaction mixture was heated at 70° C. for 1 day. After cooling, the crude mixture was poured into water, extracted with CH$_2$Cl$_2$ (50 mL x 3 times), and dried over magnesium sulfate. The product was purified by silica column (n-hexane:EtOAc=4:1) to give dfppy 1 as colorless liquid (3.90 g, 97%).

Synthesis of [(dfppy)Pt(μ-Cl)]$_2$

2: K$_2$PtCl$_4$ (3.08 g, 7.40 mmol) and 2.5 equivalent of 1 (3.55 g, 18.6 mmol) were mixed and dissolved in a 3:1 ratio of 2-ethoxyethanol and water. The resulting yellow solution was heated to 80° C. for 16 h under N$_2$ atmosphere. The cooled reaction mixture was then quenched by cold water, giving a pale yellow-greenish powder. The resulting powder was collected by a frit via a vacuum filtration and dried over air and vacuum. The product, 2, was isolated as a pale yellow powder (4.43 g, 98%) and was used for the next step reaction without further purification.

Synthesis of 7-octene-2,4-pentanedione 3

2,4-pentanedione (4.11 mL, 39.9 mmol) was dissolved in anhydrous THF (120 mL) and cooled to 0° C. using an ice-water bath. To the stirred THF solution, 2.2 equivalent of 2.0 M LDA (44 mL, 87.8 mmol) was slowly added. After addition was complete, the mixture was stirred at 0° C. for 20 min under argon atmosphere. Allyl bromide (3.46 mL, 39.9 mmol) was then added to the resulting pale red solution at 0° C. under argon. After removing of ice-water bath, the resulting reaction was allowed to stir for 20 min at room temperature before being quenched by saturated aqueous 1 M of HCl (aq). The reaction mixture was extracted with EtOAc (2×50 mL). The combined EtOAc extracts were washed with brine, water (3×50 mL), dried over MgSO$_4$. After filtration, the solution was concentrated, and the residue was purified by chromatography using 9:1 ratio of n-hexane:EtOAc. The product, 3, was isolated as a pale yellow oil, 1.21 g (22% yield).

Synthesis of FPt-4

2 (1.30 g, 1.54 mmol), 3 (0.56 g, 4.02 mmol), and Na$_2$CO$_3$ (1.63 g, 15.4 mmol) were dissolved in 50 mL of 2-ethoxyethanol. After being degassed, the reaction vessel was maintained under nitrogen. The temperature was raised to 100° C. and the reaction mixture was stirred for 10 h. After cooling to room temperature, the white salts were filtered off and the solvent was evaporated by reduced pressure. The dark yellow residue was extracted with EtOAc (200 mL), washed with brine (50 mL), and water (150 mL×3 times). Further purification was conduct using a silica-gel column using 2:3 ratio of DCM:n-Hexane as an eluent. The product was then recrystallized in dichloromethane:methanol, giving 0.54 g (38.6% yield) of FPt-4 as a pale yellowish-green powder.

Synthesis of 3-allylpentane-2,4-dione 5

NaOH (4.51 g, 113 mmol) was dissolved in anhydrous MeOH. After cooling the mixture to 0° C. using an ice-bath, acetylacetone (10.0 g, 99.8 mmol) was added while stirring over a period of several minutes. Allyl bromide (10.4 mL, 123 mmol) was then added without cooling over a period of 10 min. After addition was complete, the reaction mixture was refluxed for an additional 2 h. The mixture was cooled and filtered to remove excess NaBr. MeOH and the excess allyl bromide were removed by distillation. The product, 5, was isolated as a yellow oil, 6.72 g (48% yield), between 81-87° C.

Synthesis of FPt-6

2 (4.35 g, 5.17 mmol), 2.6 equiv of 5 (1.88 g, 13.4 mmol), and 10 equiv of $Na_2CO_3$ (5.48 g, 51.7 mmol) were dissolved in 2-ethoxyethanol (100 ml) and heated to 100° C. for 16 h under $N_2$ atmosphere. After cooling, the white salts were filtered off and the solvent was evaporated by reduced pressure. The remaining dark yellow crude was extracted with EtOAc (300 mL), washed with brine (100 mL), and water (150 mL×3 times). The crude product was run through a silica-gel chromatography with 2:3 ratio of DCM and n-hexane. FPt-6 was further purified by recrystalization with DCM:methanol, giving 873 mg (23% yield) of pale yellow-greenish powder.

Example 2

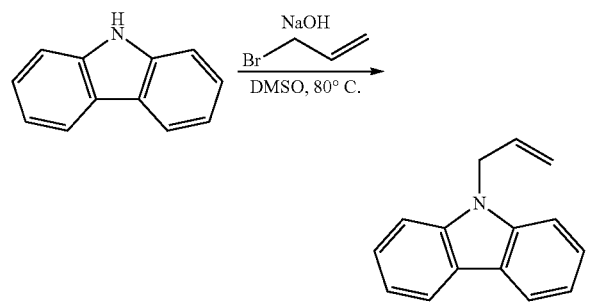

Synthesis of the Hole-Transport Material
N-Allylcarbazole

A mixture of 10.85 g (65.0 mmol) of carbazole, 2.60 g (65.0 mmol) of sodium hydroxide and 6.1 mL (72.0 mmol) of allylbromide in 100 mL dimethylsulfoxide was heated to 60° C. for 5 hours. The reaction mixture was poured into water and extracted with ethyl acetate. The ethyl acetate layer was washed with water and then concentrated. The crude product was purified using column chromatography (silica, 1:4 dichloromethane:hexane). Yield: 9.85 g (73%).

Example 3

Fabrication of Light-Emitting Device

Figure 6:
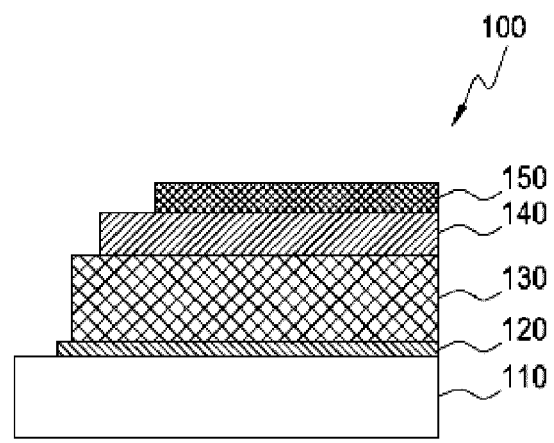
FIG. 6 is a cross-sectional view of a light-emitting device.

A glass substrate was coated with 100-200 nm of ITO. The ITO coated substrate was cut into 1 inch square pieces and cleaned using consecutive ultrasonic baths of acetone, methanol, and isopropanol. With reference to FIG. 6, the ITO anode was patterned either with a thick silicon oxide insulating layer or by etching the ITO with an acid bath to form the ITO anode/glass substrate layer 110. After patterning, the same cleaning procedure was implemented again followed by RF assisted plasma ashing for approximately 2 minutes. A hole injection/smoothing layer 120, e.g., polyethylenedioxythiophene (PEDOT)/polystyrene sulphonic acid (PSS), was spin coated at 3000 rpm onto the surface of the ITO anode, and annealed at 180° C. for 10 min. A light-emitting layer 130, comprising lumophore-functionalized nanoparticles such as those described herein, was deposited on top of the hole injection/smoothing layer 120 by spin-coating at 1000 rpm from a 15 mg/mL solution of the lumophore-functionalized nanoparticles in chloroform, and dried at 70-100° C. for 30 min in a nitrogen glove box. In one embodiment, 1,3-bis(N,N-t-butyl-phenyl)-1,3,4-oxadiazole (OXD-7) was doped into the light-emitting layer. The thickness of the resulting light-emitting layer 130 was approximately 600-800 Å as measured by stylus profilometry. In some embodiments, an electron injection layer 140 comprising a 300 Å-thick 1,3,5-tris[N-phenylbenzimidazol-2-yl]benzene (TPBI) layer was thermally evaporated on top of the light-emitting layer 130. A cathode layer 150, comprising CsF (15 Å) and Al (1500 Å), was then vapor evaporated respectively onto the surface of the light-emitting layer 130, or in some cases onto the surface of TPBI layer 140, to produce the light-emitting device 100 with an active area of 0.1 $cm^2$.

Example 4

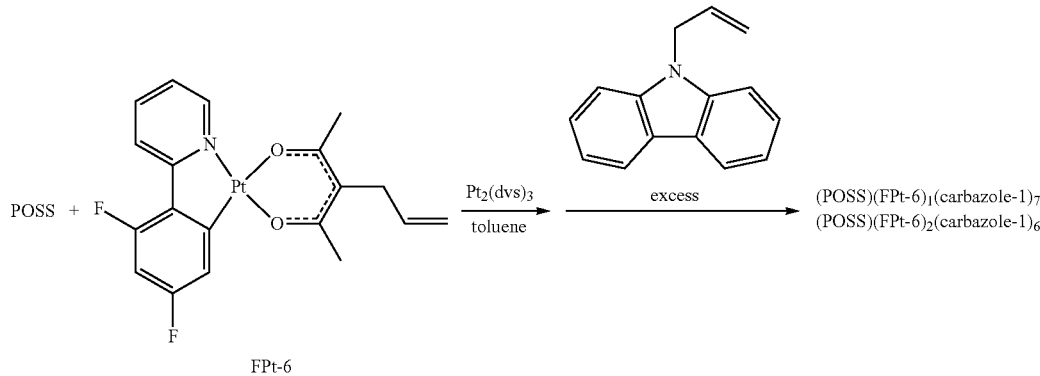

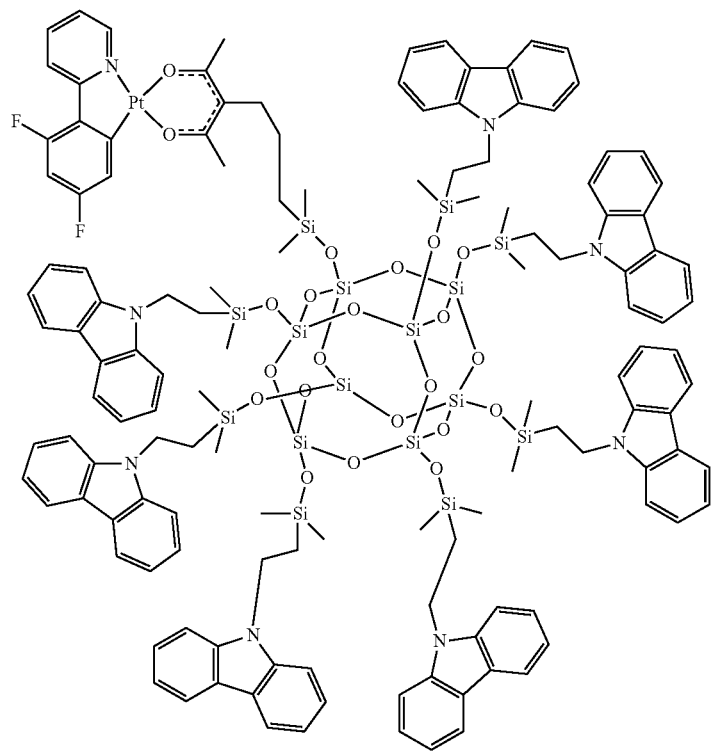
(POSS)(FPt-6)₁(carbazole-1)₇
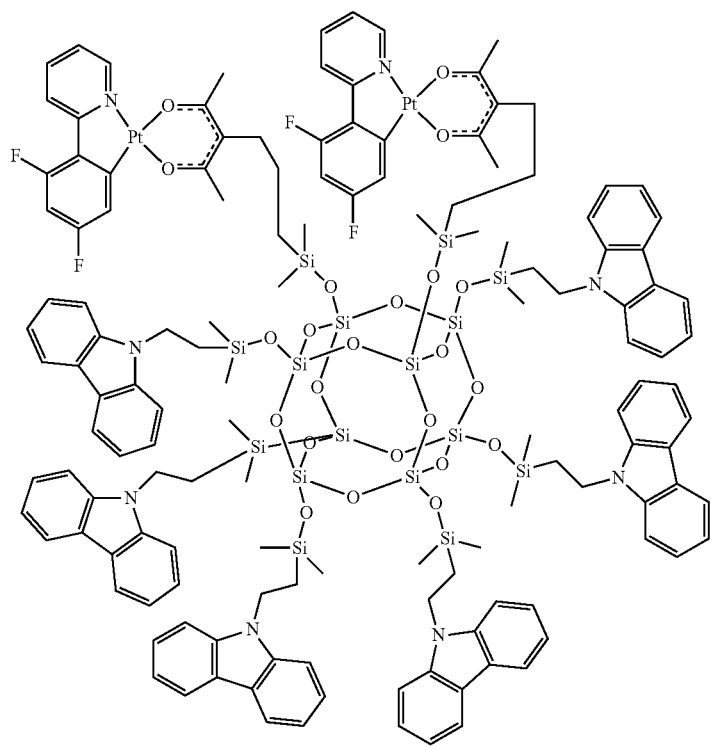
(POSS)(FPt-6)₂(carbazole-1)₆

General Reaction of POSS, FPt-6, and N-Allylcarbazole (Carbazole-1)

Figure 7:
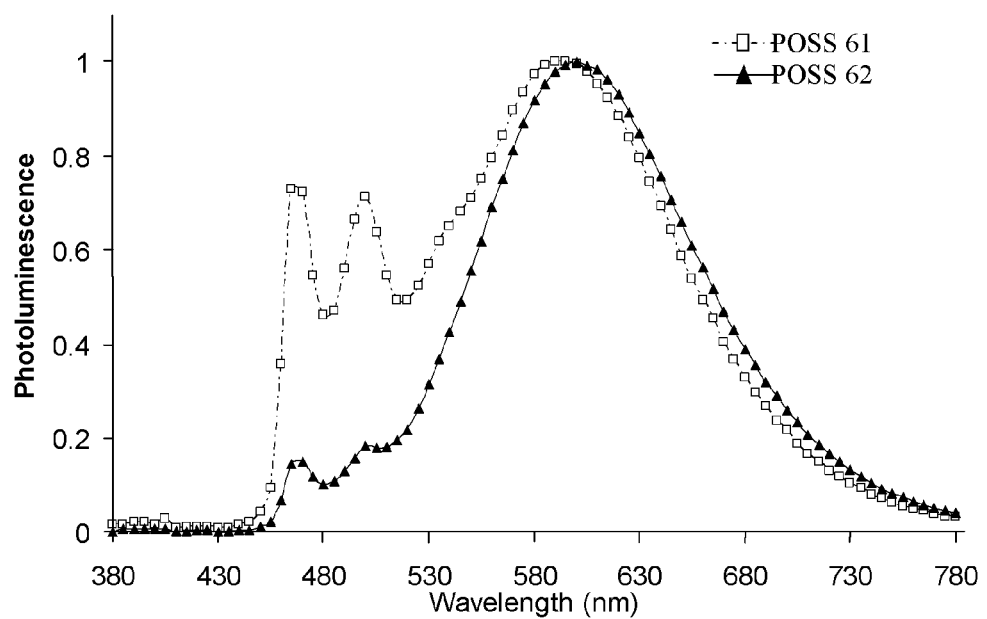
FIG. 7 shows the photoluminescent spectrum of (POSS)(FPt-6)$_1$(carbazole-1)$_7$(POSS 61) and (POSS)(FPt-6)$_2$(carbazole-1)$_6$(POSS 62).
Figure 8:
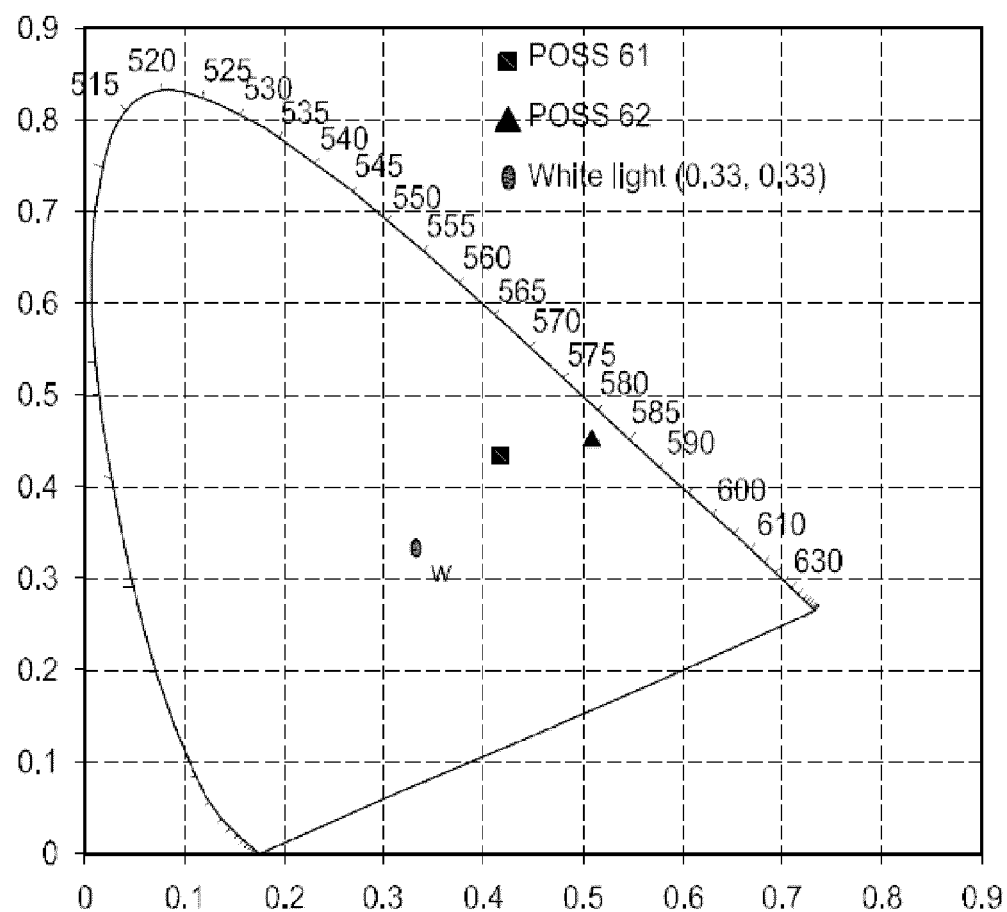
FIG. 8 shows the CIE coordinates for POSS 61 and POSS 62.

To a solution of 868 mg (0.853 mmol) of POSS and 447 mg (0.853 mmol) FPt-6 in 20 mL anhydrous toluene was added 4 drops of a solution of Platinum(0)-1,3-divinyl-1,1,3,3-tetramethyldisiloxane (Pt(dvs)) (2 wt. % Pt in xylene). The reaction mixture was stirred at room temperature for 1 hour and then 1.765 g (8.53 mmol) of N-allylcarbazole was added and the reaction mixture was stirred for an additional 16 hours. The reaction mixture was then precipitated out of cold methanol and filtered through a silica plug using dichloromethane as the eluent to give a mixture of lumophore/host functionalized nanoparticles. The reaction mixture was purified chromatographically and three products, (POSS)(carbazole host)$_8$, (POSS)(FPt-6)$_1$(carbazole host)$_7$ and (POSS)(FPt-6)$_2$(carbazole)$_6$ were separately isolated. The structures of the three products were confirmed by MALDI-TOF mass spectrometry. FIG. 7 shows the photoluminescent spectra of (POSS)(FPt-6)$_1$(carbazole host)$_7$ (POSS 61) and (POSS) (FPt-6)$_2$(carbazole)$_6$ (POSS 62). The photoluminescent spectrum of POSS 61 covers a broader region of the visible spectrum compared to that of POSS 62, and thus is a better material for a white-light emitting device. The CIE coordinates for POSS 61 and POSS 62 were (x=0.42, y=0.43) and (x=0.51, y=0.45), respectively, as shown in FIG. 8. As can be seen by FIG. 8, POSS 61 has CIE coordinates that is closer to the achromatic point (which represent the coordinates for white light) and a higher color rendering index (CRI) value. The CRI is a measure of the ability of a light source to reproduce the colors of various objects being lit by the source. The best possible rendition of colors is specified by a CRI of 100, while the very poorest rendition is specified by a CRI of 0.

General Reaction of POSS, FPt-4, and N-Allylcarbazole

Figure 9:
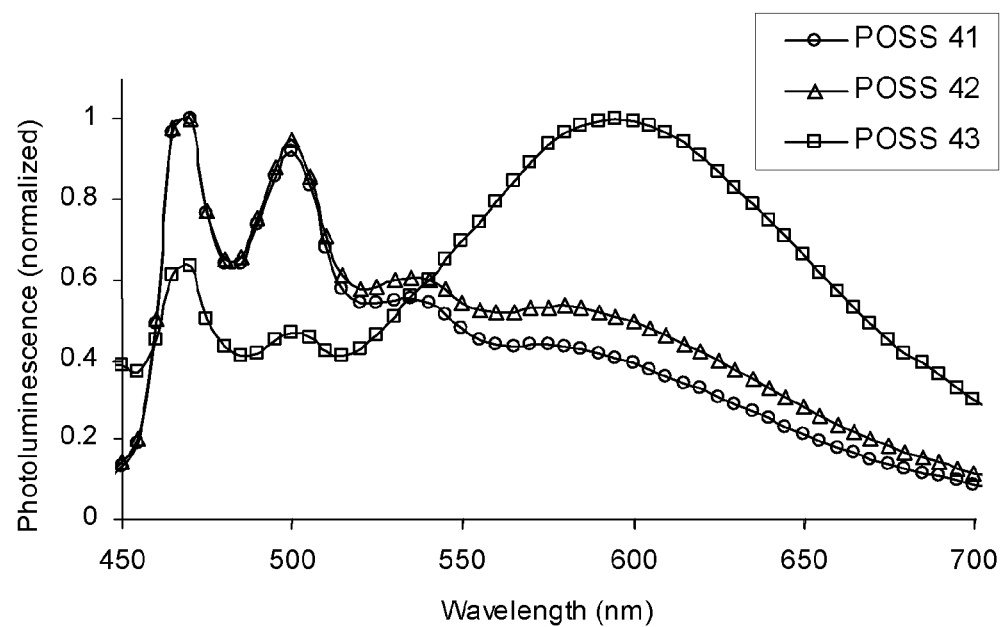
FIG. 9 shows the photoluminescent spectrum of lumophore/host-functionalized nanoparticles produced from 1.1 equivalents of FPt-4 (POSS 41), 2 equivalents of FPt-4 (POSS 42), and 3 equivalents of FPt-4 (POSS 43).
Figure 10:
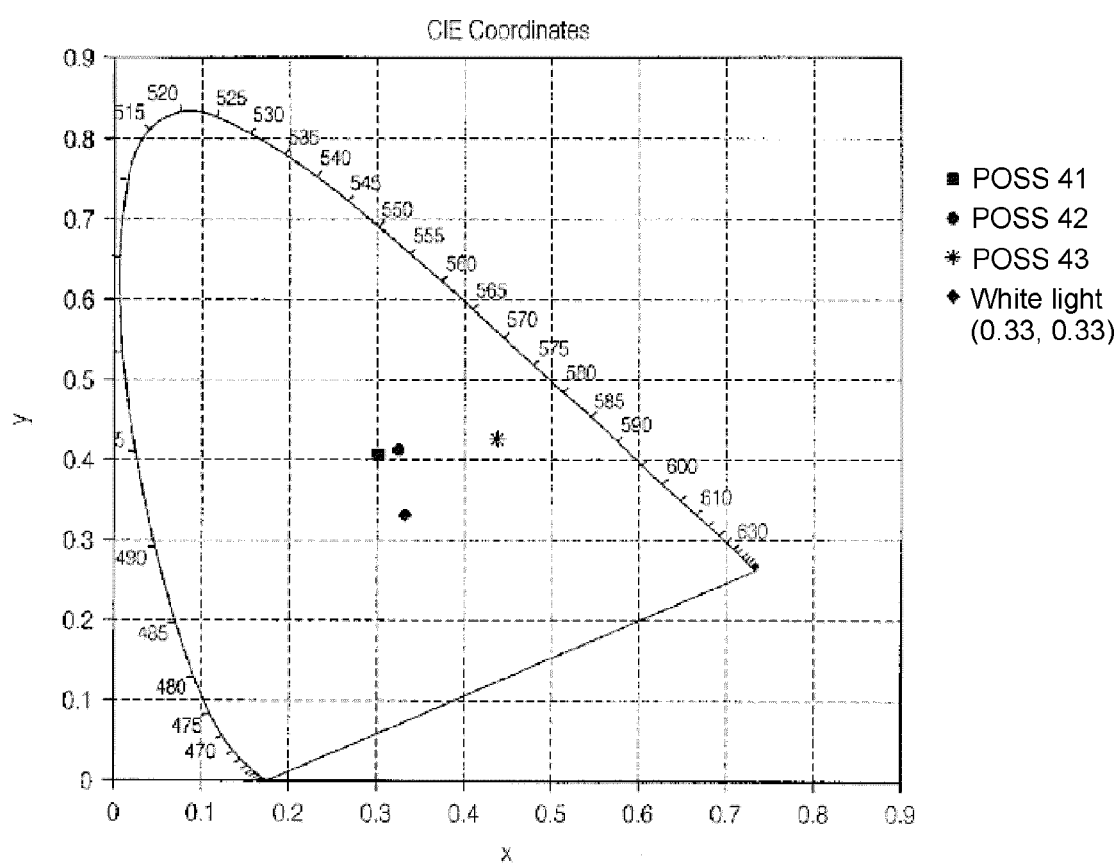
FIG. 10 shows the CIE coordinates of POSS 41, POSS 42 and POSS 43.

The reaction described above can also be carried out using FPt-4 in place of FPt-6. The product is a mixture of (POSS) (FPt-4)$_{z1}$(carbazol-1)$_{z2}$, wherein z1 varies from 0 to 7 and z2 is (8−z1). FIG. 9 shows the photoluminescent spectra of the lumophore/host-functionalized nanoparticles produced using 1.1 equivalents of FPt-4 (POSS 41), 2 equivalents of FPt-4 (POSS 42), and 3 equivalents of FPt-4 (POSS 43). FIG. 10 shows the CIE coordinates of each type of lumophore/host-functionalized nanoparticles. As shown by both FIGS. 9 and 10, the ratio of monomer to excimer can easily be changed by varying the ratio of lumophores to host groups through the addition of increasing molar equivalents of FPt-4.

Example 5

Light-Emitting Devices Incorporating POSS 41 POSS 61 and POSS 62

Figure 12:
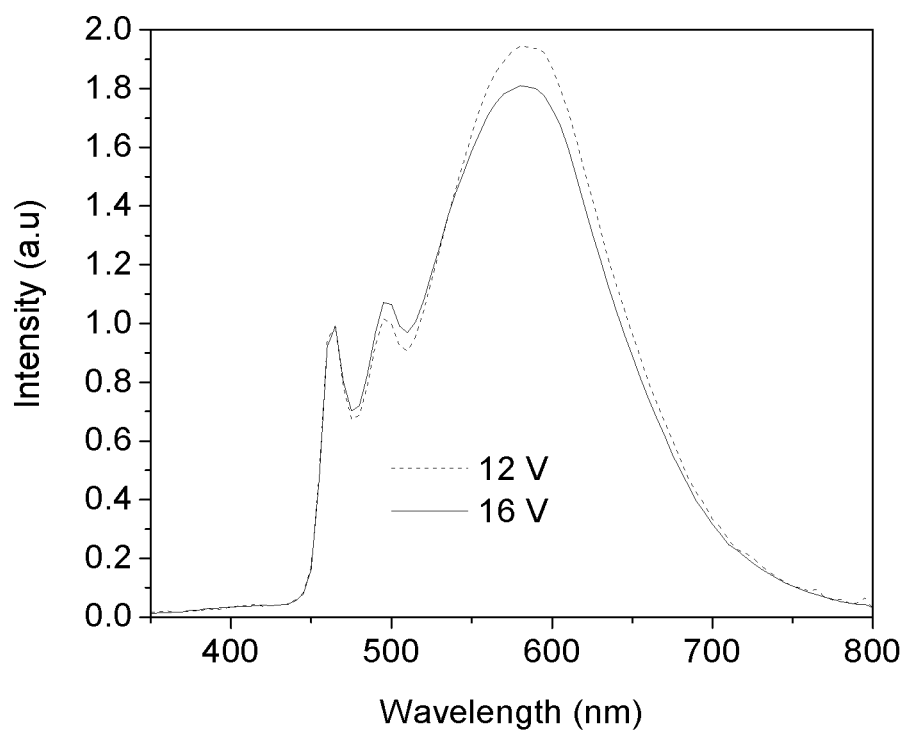
FIG. 12 shows the electroluminescent spectrum of a light-emitting device incorporating POSS 41 and 30% 1,3-bis(N,N-t-butyl-phenyl)-1,3,4-oxadiazole (OXD-7) into the light-emitting layer (Device P41XE).
Figure 13:
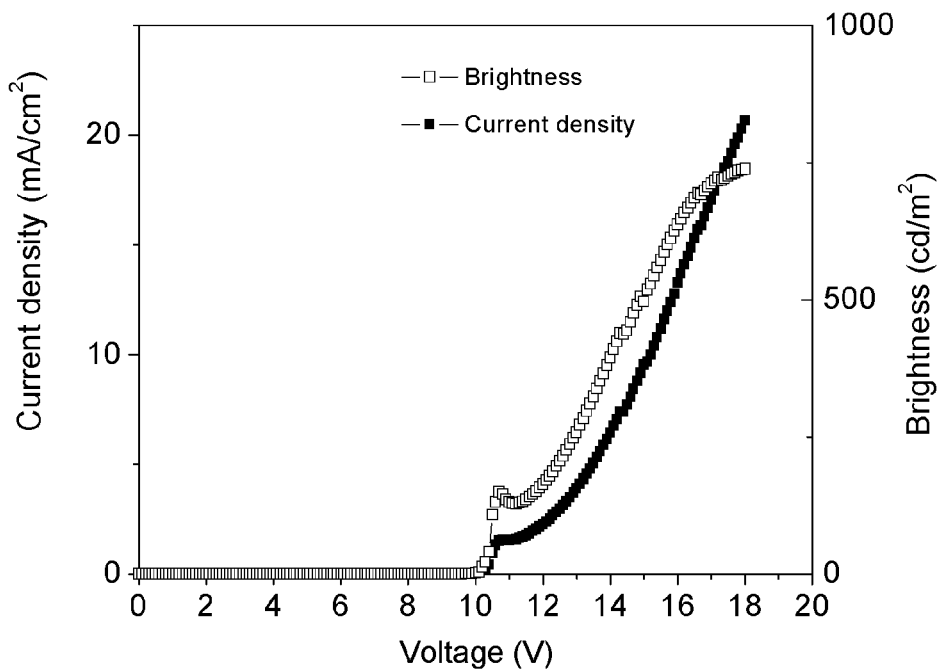
FIG. 13 is a plot of current density and brightness as a function of voltage for Device P41XE.
Figure 14:
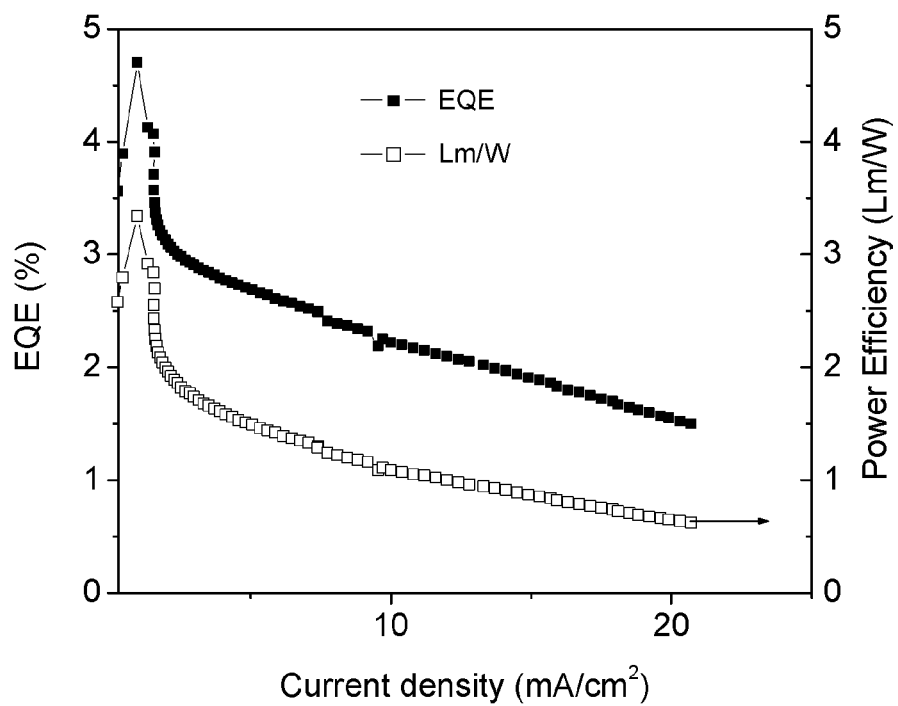
FIG. 14 is a plot of external quantum efficiency and power efficiency as a function of current density for Device P41XE.

Light-emitting devices were fabricated according to the general procedure described in Example 3. Device P41XE was made by incorporating POSS 41 and 1,3-bis(N,N-t-butyl-phenyl)-1,3,4-oxadiazole (OXD-7) into the light-emitting layer 203 of a light-emitting device 200 in FIG. 11. The cathode 201 comprises a CsF/Al layer, the electron injection layer 202 comprises TPBI, the hole injection/smoothing layer 204 comprises PEDOT:PSS, and the anode 205 is ITO/glass substrate. The electroluminescent spectra of Device P41XE acquired at 12 V and 16 V are displayed in FIG. 12. The electroluminescent characteristics of Device P41XE were not significantly altered by the change in operating voltage. The current density-voltage-brightness characteristics obtained from Device P41XE are shown in FIG. 13. The external quantum efficiency (EQE) and power efficiency versus current density are shown in FIG. 14. Device P41XE had CIE coordinates of (x=0.42, y=0.45) and a CRI value of 73 at 12 V, and CIE coordinates of (x=0.41, y=0.45) and a CRI value of also 73 at 16 V. This again shows that POSS 41 is a good lumophore/host functionalized nanoparticle material for making the light-emitting layer 203 of white light-emitting devices, and that its favorable electroluminescent characteristics remain unchanged at various operating voltages.

Figure 11:
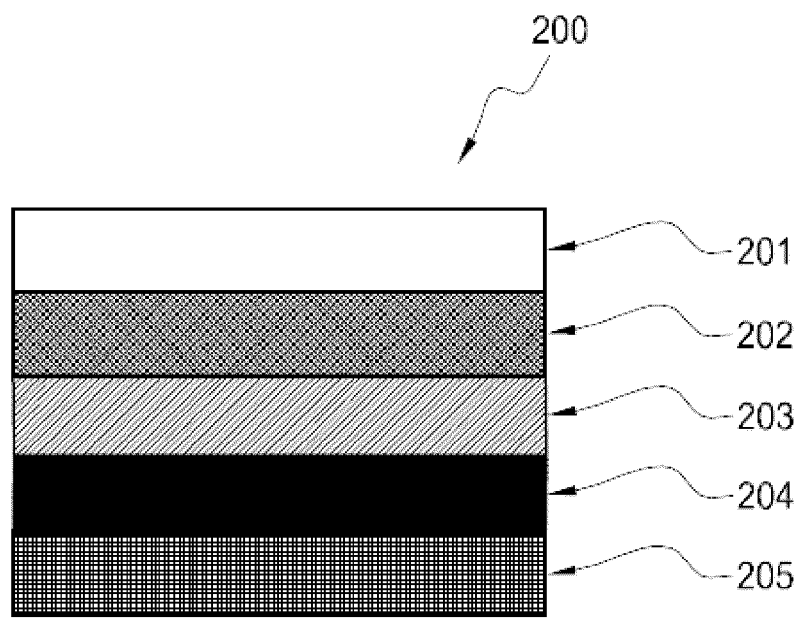
FIG. 11 illustrates the general structure of a light-emitting device comprising a cathode layer, an electron injection layer, a light-emitting layer, a hole injection/smoothing layer and an anode layer.
Figure 15:
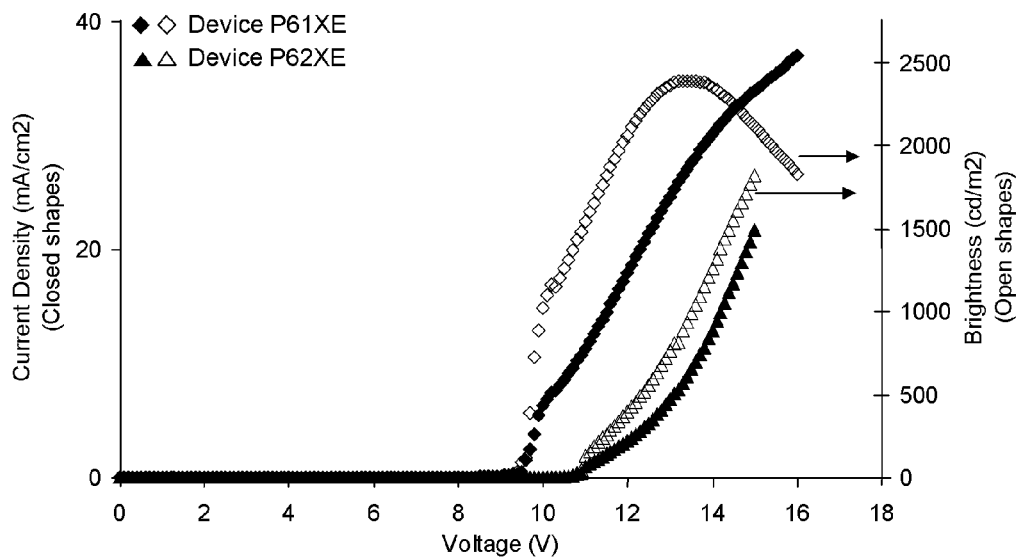
FIG. 15 is a plot of current density and brightness as a function of voltage of two light-emitting devices, P61XE and P62XE. Device P61XE has (POSS)(FPt-6)$_1$(carbazole-1)$_7$+30% OXD-7 incorporated into the light-emitting layer, and Device P62XE has (POSS)(FPt-6)$_2$(carbazole-1)$_6$, +30% OXD-7 incorporated into the light-emitting layer.
Figure 16:
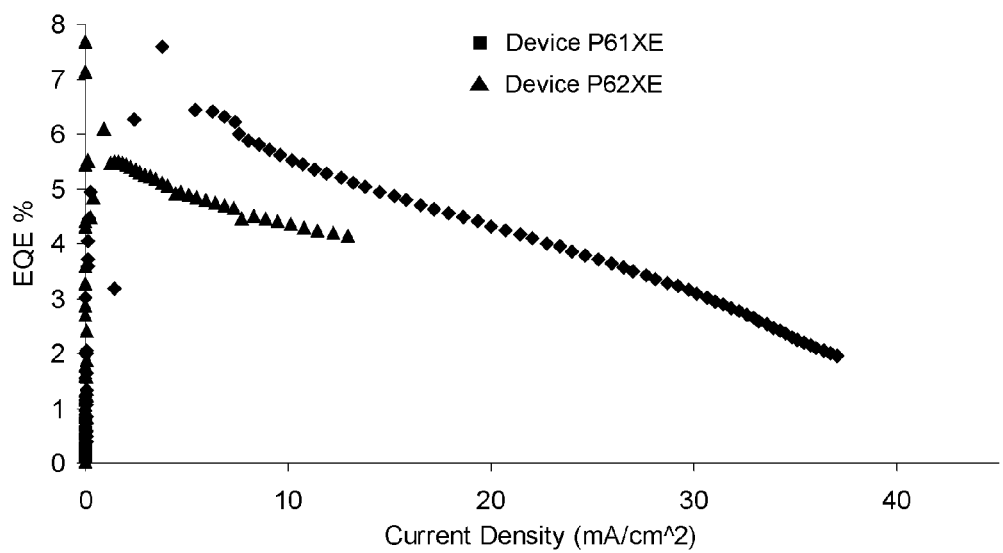
FIG. 16 is a plot of external quantum efficiency as a function of current density for Devices P61XE and P62XE.
Figure 17:
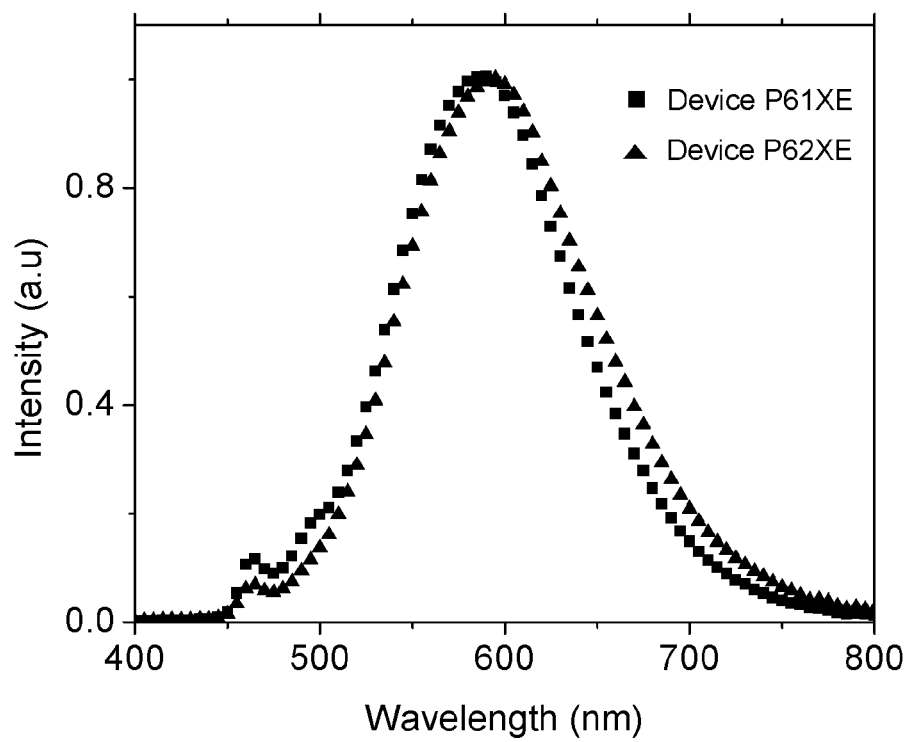
FIG. 17 shows the electroluminescent spectra of Devices P61XE and P62XE.

Both POSS 61 and POSS 62 have also been separately incorporated into light-emitting layer 203 to make Devices P61XE and P62XE according to the structure of device 200 in FIG. 11. The light-emitting layers 203 of Devices P61XE and P62XE were also doped with OXD-7. The current density versus voltage (closed shapes) and brightness versus voltage (open shapes) of Devices P61XE and P62XE are shown in FIG. 15. The external quantum efficiency (EQE) versus current density of Devices P61XE and P62XE are shown in FIG. 16. The electroluminescence spectra of both devices are shown in FIG. 17. Both Devices P61XE and P62XE had CIE coordinates of (x=0.48, y=0.48) and a CRI value of 60.

Figure 18:
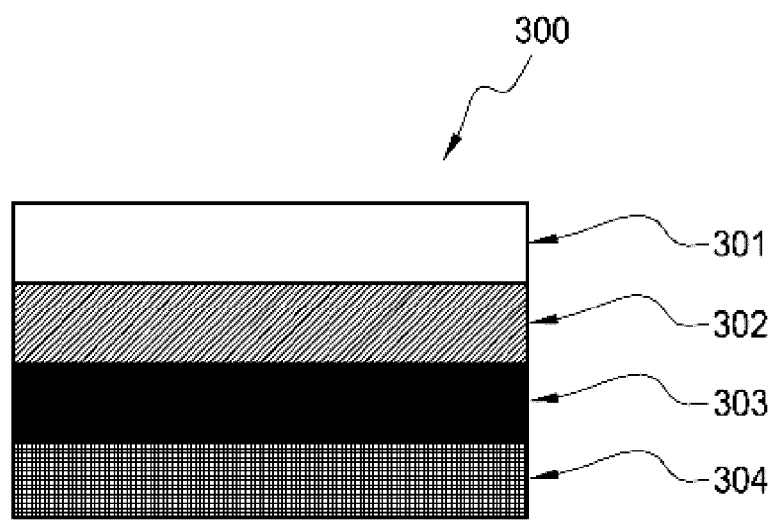
FIG. 18 illustrates the general structure of a light-emitting device that does not have the electron injection layer.
Figure 19:
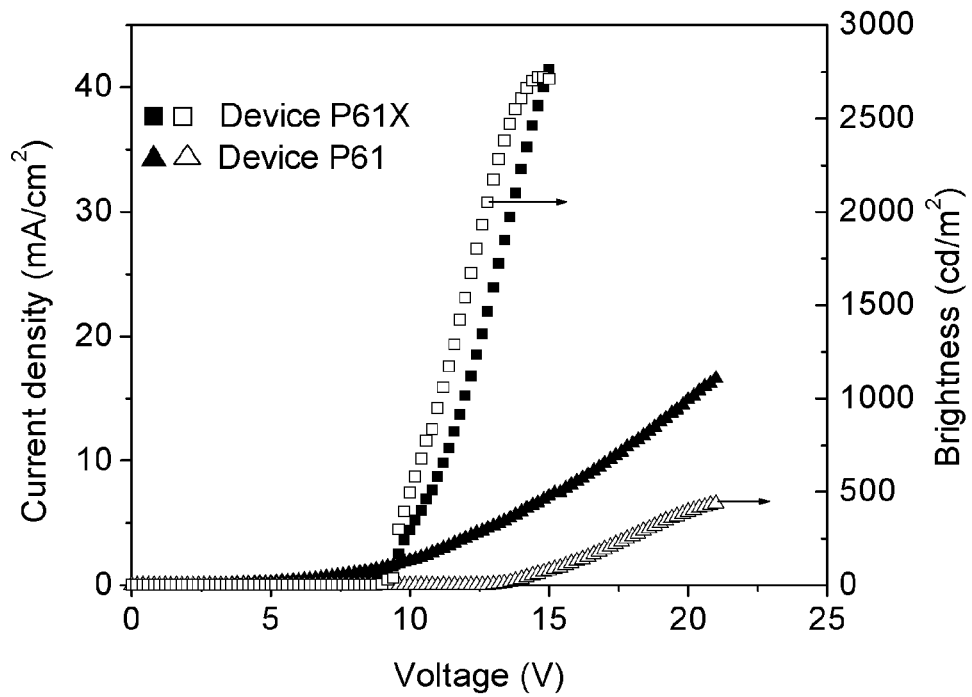
FIG. 19 is a plot of current density and brightness as a function of voltage for two light-emitting devices having the structure shown in FIG. 18—one incorporating (POSS)(FPt-6)$_1$(carbazole-1)$_7$+30% OXD-7 into the light-emitting layer (Device P61X) and the other incorporating (POSS)(FPt-6)$_1$(carbazole-1)$_7$ into the light-emitting layer (Device P61).
Figure 20:
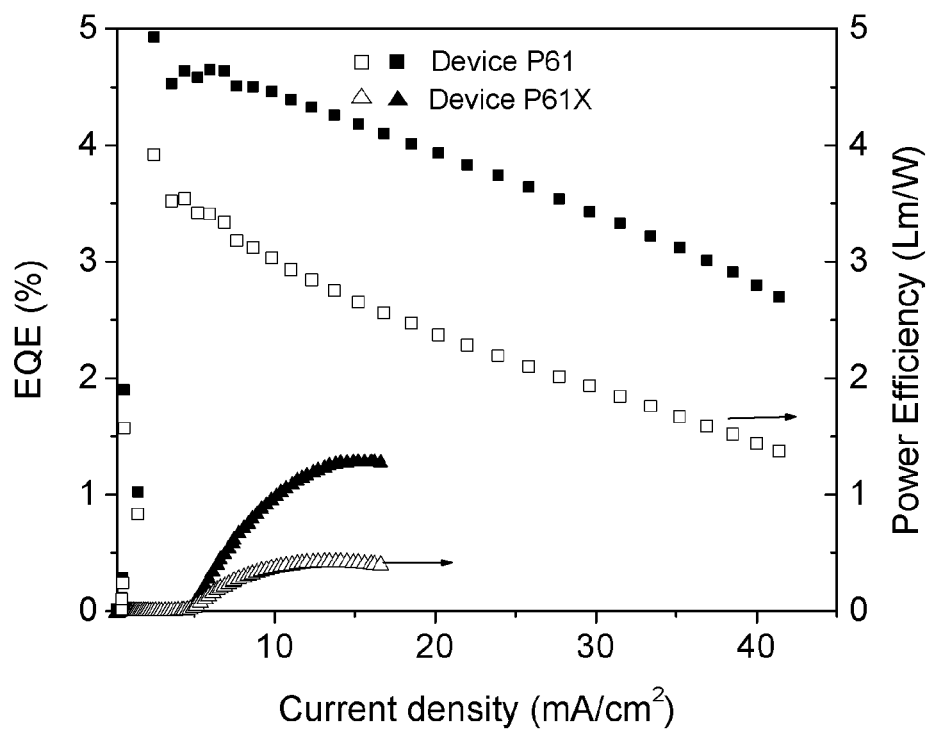
FIG. 20 is a plot of external quantum efficiency and power efficiency as a function of current density for Devices P61X and P61.
Figure 21:
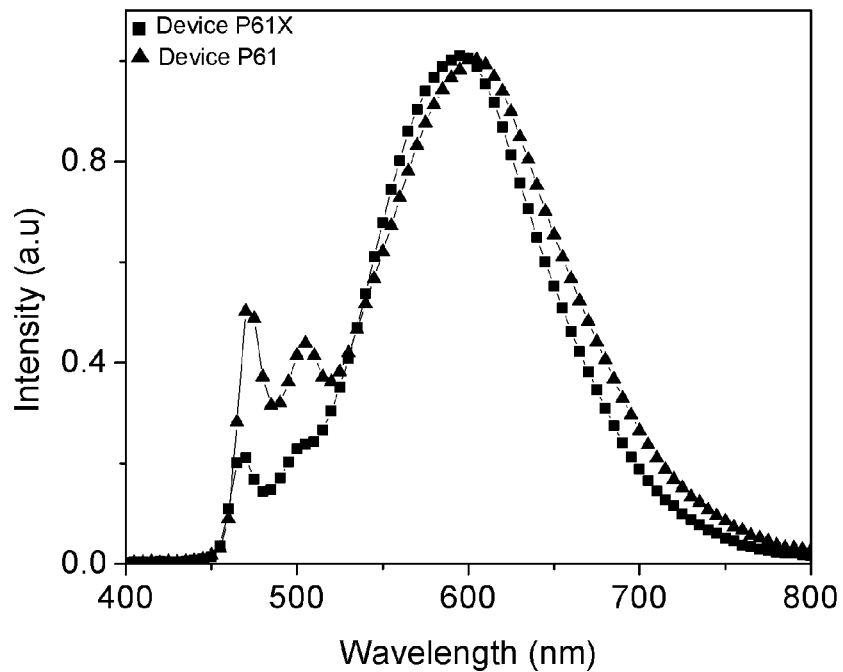
FIG. 21 shows the electroluminescent spectra of Devices P61X and P61.

To determine the effect of incorporating OXD-7 in the light-emitting layer, two light emitting devices were fabricated according to the general structure of device 300 shown in FIG. 18. The electron-injection layer has been omitted in these devices. The materials for cathode 301, hole injection/smoothing layer 303 and anode 304 were the same as the corresponding layers of device 200 described above. The light-emitting layer of the first device was made of POSS 61 without adding OXD-7 (Device P61). The light-emitting layer of the other light-emitting device was made of POSS 61 and doped with OXD-7 (Device P61X). The current density versus voltage (closed shapes) and brightness versus voltage (open shapes) of the two devices are shown in FIG. 19. The external quantum efficiency (EQE) versus current density (closed shapes) and the power efficiency versus current density (open shapes) of the devices are shown in FIG. 20. The electroluminescence spectra of these two devices are shown in FIG. 21. The CIE coordinates and CRI values for the light-emitting devices with and without OXD-7 are listed below in Table 1.

TABLE 1

CIE COORDINATES AND CRI VALUES FOR LIGHT-EMITTING DEVICES WITH AND WITHOUT OXD-7

| Device | CIE (x, y) | CRI |
|---|---|---|
| Device P61 | (0.44, 0.54) | 73 |
| Device P61X | (0.47, 0.46) | 66 |

As shown by FIGS. 19-21 and Table 1, the incorporation of OXD-7 into the light-emitting layer improved electron injection and electron transport capabilities, which then lowered the driving voltages and increased the external quantum efficiency (EQE) of the devices. The addition of OXD-7 to the light-emitting layer quenched the FPt-6 monomer emission that resulted in a lower CRI value.

Figure 22:
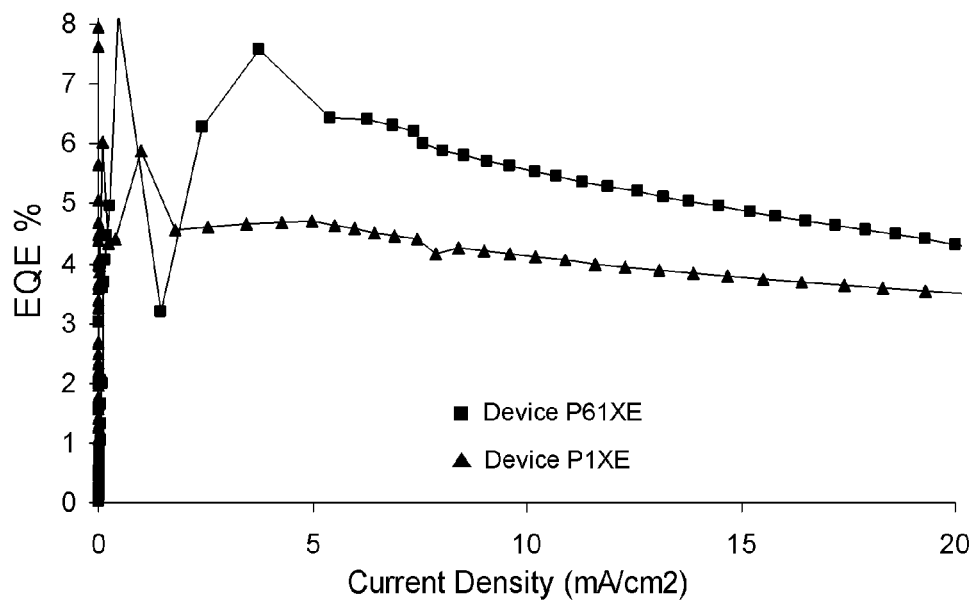
FIG. 22 shows the electroluminescent spectra of Device P61XE, which has a (POSS)(FPt-6)$_1$(carbazole-1)$_7$, +30% OXD-7 light-emitting layer, and Device P1XE, which has a 12% FPt-1+30% OXD-7+polyvinylcarbazole (PVK) light-emitting layer.

The differences between FPt-1 doped in polyvinylcarbazole (PVK) and (POSS)(FPt-6)$_1$(carbazole-1)$_7$ as light-emitting layer materials were also investigated. Two light-emitting devices with the structure of device 200 in FIG. 11 were fabricated using different light-emitting layer materials. Device P1XE has a light-emitting layer made of 12 wt. % FPt-1 and 30 wt. % OXD-7 doped into PVK. Device P61XE was fabricated by incorporating POSS 61 and 30 wt. % OXD-7 into the light-emitting layer. As illustrated by FIG. 22, Device P61XE produced a higher EQE value (EQE=6.4%) compared to Device P1XE (EQE=4.7%).

Figure 23:
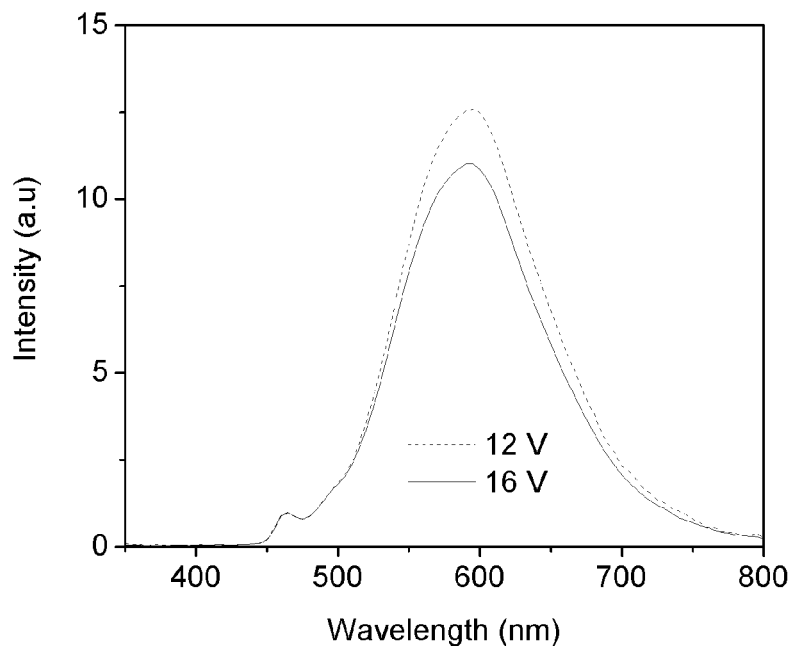
FIG. 23 shows the electroluminescent spectra of a light-emitting device incorporating a blend of [(POSS)(carbazole)$_8$ (30%), (POSS)(FPt-6)$_1$(carbazole-1)$_7$ (50%) and (POSS)(FPt-6)$_2$(carbazole-1)$_6$ (20%)]+30% OXD-7 into the light-emitting layer (Device P6012XE) at two different operating voltages.
Figure 24:
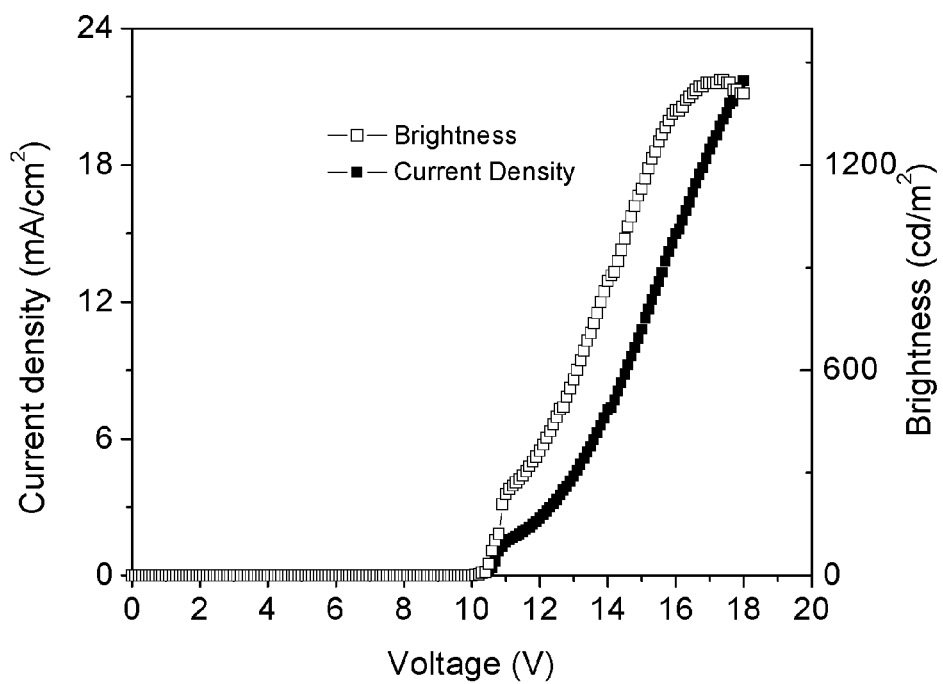
FIG. 24 is a plot of current density and brightness as a function of voltage for Device P6012XE.
Figure 25:
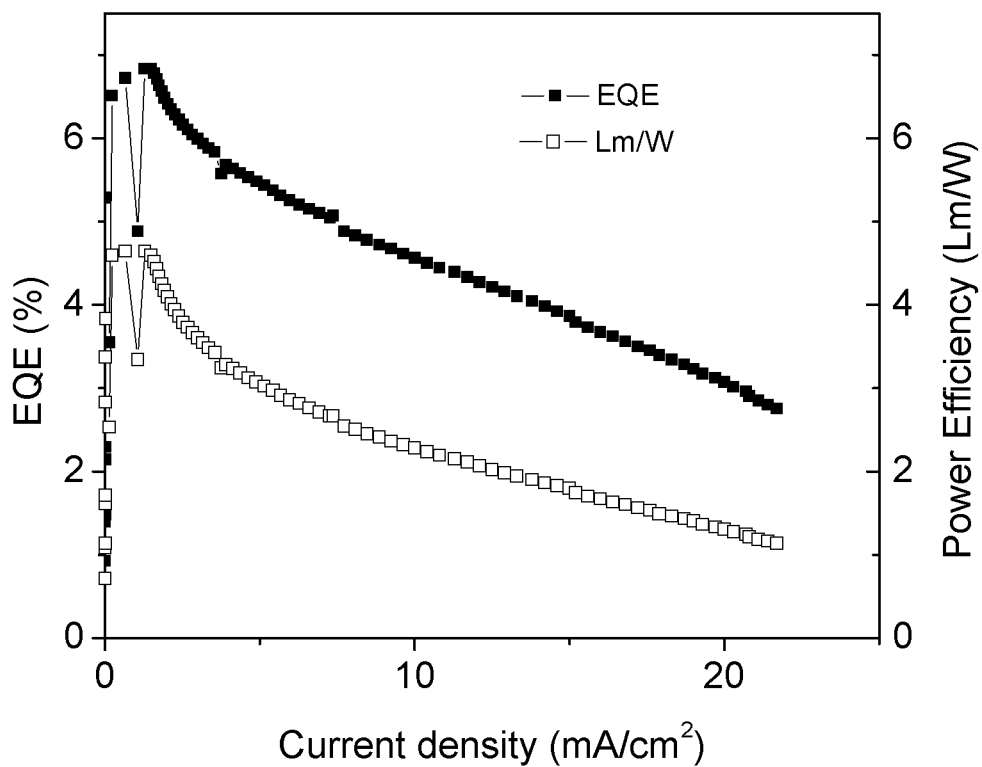
FIG. 25 is a plot of external quantum efficiency and power efficiency as a function of current density for Device P6012XE
Figure 26:
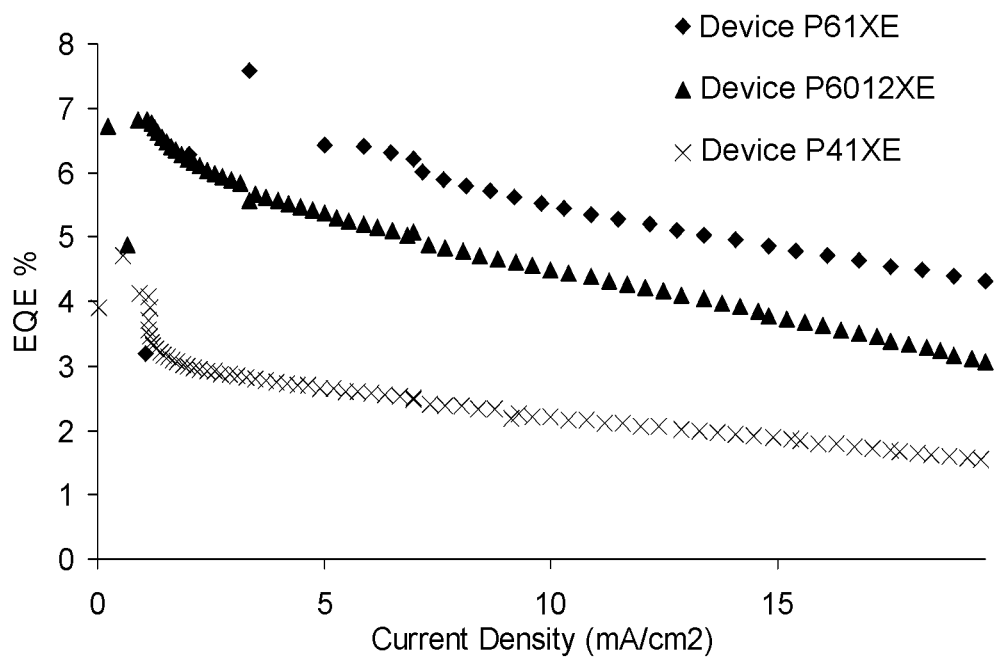
FIG. 26 shows the external quantum efficiency versus current density curves from light-emitting devices incorporating either (POSS)(FPt-6)$_1$(carbazole-1)$_7$+30% OXD-7 (Device P61XE), POSS 41+30% OXD-7 (Device P41XE) or a blend of [(POSS)(carbazole)$_8$ (30%), (POSS)(FPt-6)$_1$(carbazole-1)$_7$ (50%) and (POSS)(FPt-6)$_2$(carbazole-1)$_6$ (20%)]+30% OXD-7 (Device P6012XE) into the light-emitting layer.

To determine if the purity of the materials affected the EQE values of the light-emitting devices, a device was fabricated according to the structure of device 200 in FIG. 11. The light-emitting layer 203 was made with a blend of [(POSS) (carbazole-1)$_8$ (30%), POSS 61 (50%) and POSS 62 (20%)] and OXD-7. The electroluminescent spectra of the devices containing the blend of [(POSS)(carbazole-1)$_8$ (30%), POSS 61 (50%) and POSS 62 (20%)] (Device P6012XE) are shown in FIG. 23. Device P6012XE had CIE coordinates of (x=0.50, y=0.47) and a CRI of 63 at 12 volts and CIE coordinates of (x=0.49, y=0.47) and a CRI of 63 at 16 volts. The current density-voltage-brightness characteristics of Device P6012XE are shown in FIG. 24. The external quantum efficiency versus current density and power efficiency versus current density of Device P6012XE are shown in FIG. 25. FIG. 26 shows a comparison of the external quantum efficiency versus current density data from three different devices with the general structure shown in FIG. 11—Device P41XE, Device P61XE and Device P6012XE.

As shown in FIG. 26, Device P6012XE had a similar EQE value to Device P61XE. However, Device P6012XE has a significantly higher EQE value compared to Device P41XE, which suggests that POSS 41 may have impurities that hinder the EQE of the device.

Example 6

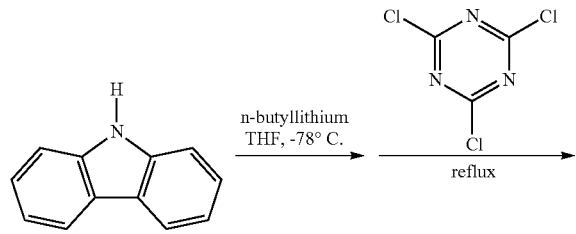

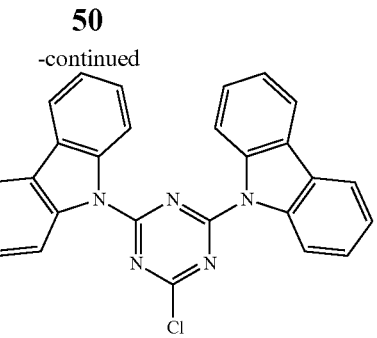

2-chloro-4,6-dicarbazole-1,3,5-triazine

Carbazole (10.05 g, 60.18 mmol) was dissolved in anhydrous tetrahydrofuran and the solution was cooled to −78° C. in a dry ice/acetone bath. A 2.5 M N-butyllithium in hexanes solution (24.1 mL, 60.18 mmol) was added dropwise and the mixture was allowed to warm to room temperature. In another flask a solution of cyanuric chloride (5.54 g, 30.09 mmol) in anhydrous tetrahydrofuran was prepared. The lithium-carbazole solution was then transferred to the cyanuric chloride solution. After the addition the mixture was heated to 60° C. for 5 hours. The mixture was then poured into methanol and filtered. The filter cake was rinsed with water and then methanol, and then collected and dried to yield 11.2 g of the product carbazole-2 as a pale yellow solid (83%).

Example 7

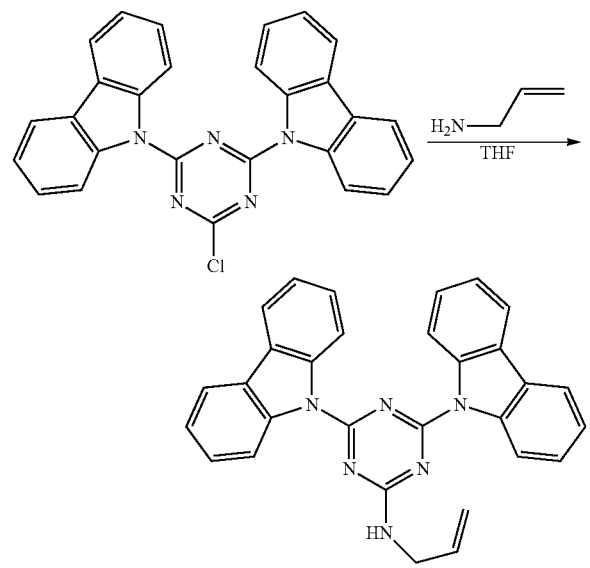

2-allyl-4,6-dicarbazole-1,3,5-triazine(carbazole-2)

2-chloro-4,6-dicarbazole-1,3,5-triazine (7.04 g, 15.78 mmol) was dissolved in THF. Allylamine (5.9 g, 78.9 mmol) was added. The reaction was stirred at room temperature for several hours. THF was then evaporated and the product re-dissolved in dichloromethane and run through a short plug of silica. The dichloromethane was then evaporated and 6.29 g of the product was recovered as an off white solid (85%).

Example 8
Product of Reaction of
Octakis(Dimethylsiloxy)POSS with
2-Allyl-4,6-Dicarbazole-1,3,5-Triazine and FPt-4
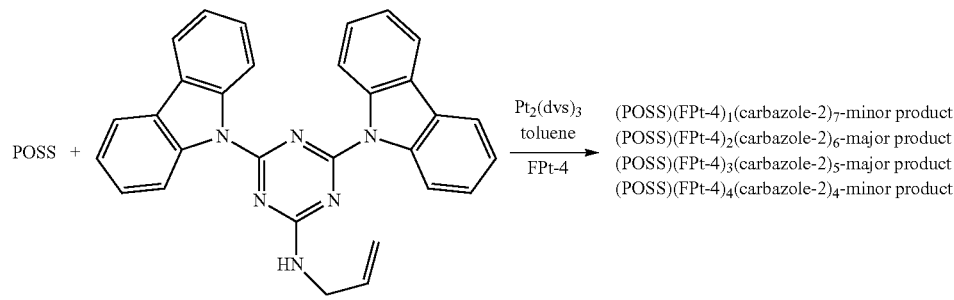
(POSS)(FPt-4)$_1$(carbazole-2)$_7$-minor product
(POSS)(FPt-4)$_2$(carbazole-2)$_6$-major product
(POSS)(FPt-4)$_3$(carbazole-2)$_5$-major product
(POSS)(FPt-4)$_4$(carbazole-2)$_4$-minor product
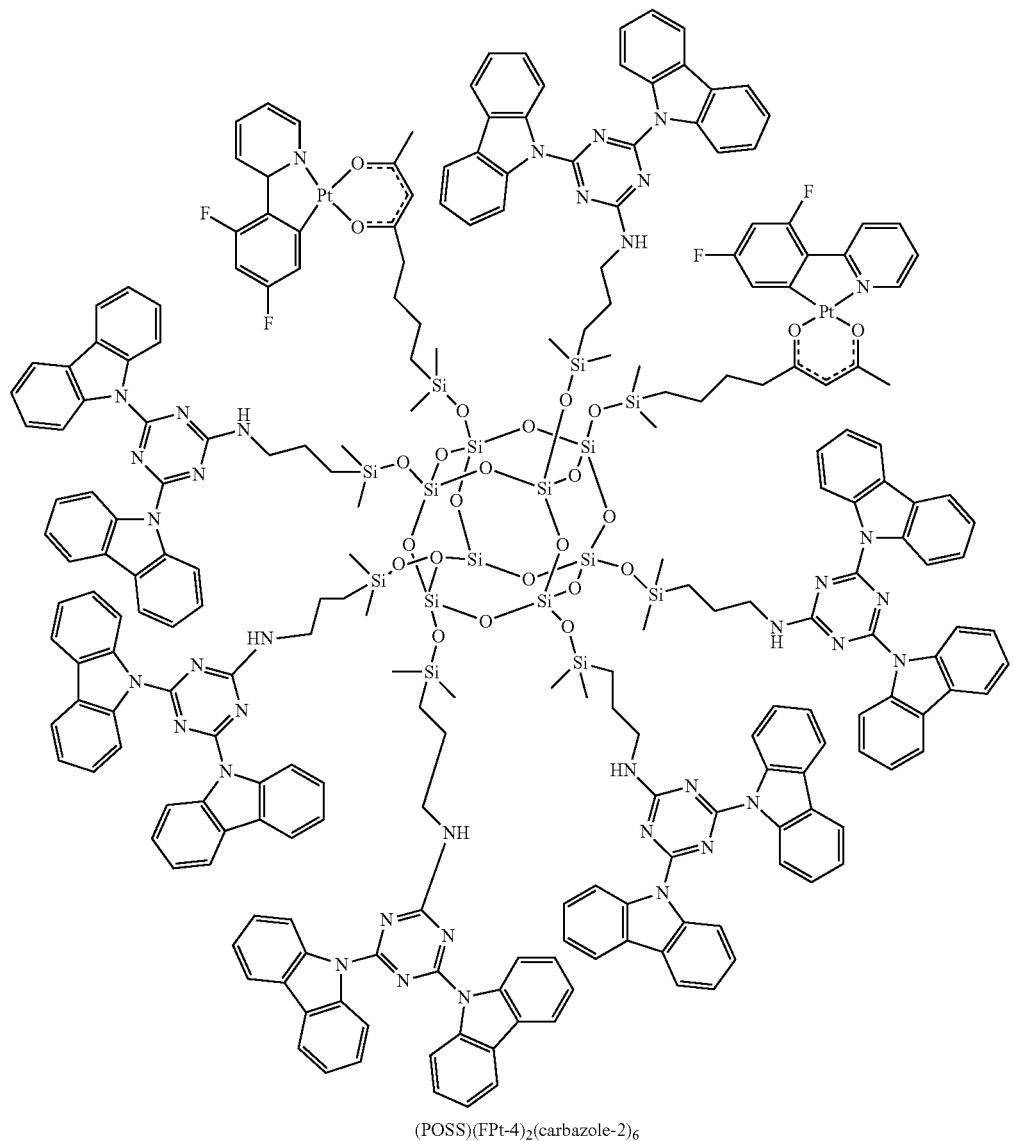
(POSS)(FPt-4)$_2$(carbazole-2)$_6$

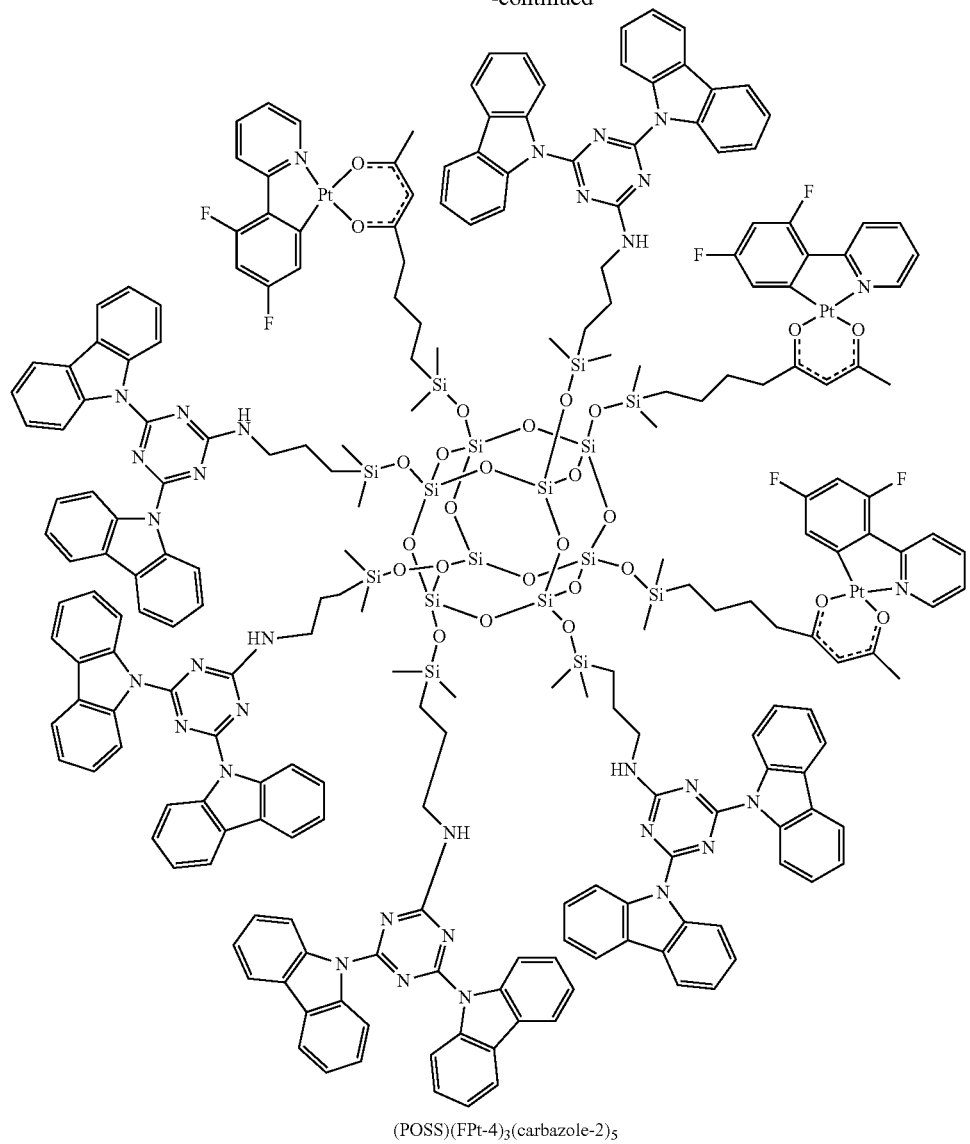

(POSS)(FPt-4)₃(carbazole-2)₅

Figure 27:
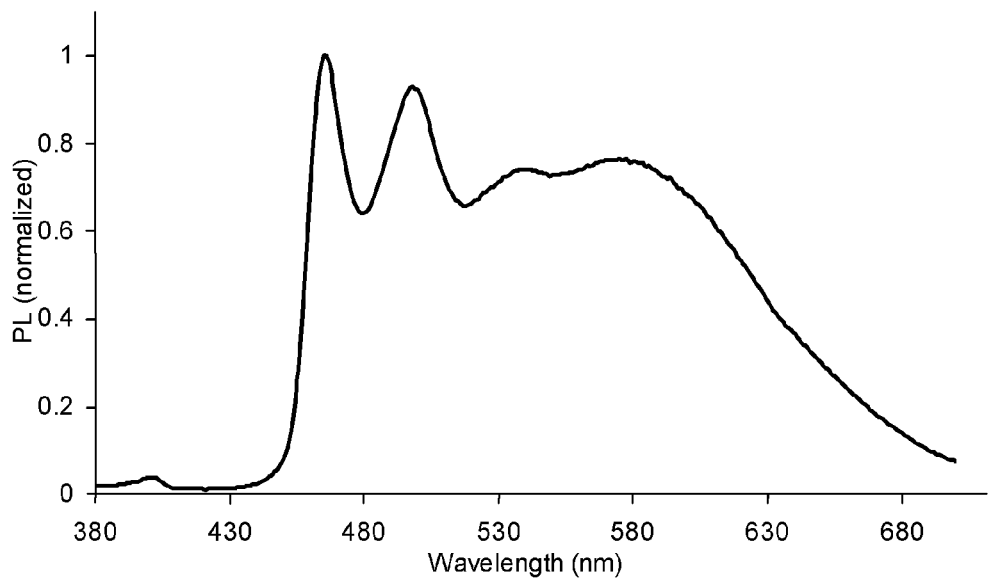
FIG. 27 shows the photoluminescent spectrum of lumophore/host-functionalized nanoparticles with 4,6-dicarbazole-1,3,5-triazine as hosts and FPt-4 as lumophores as a neat film (POSS 4B).

To a solution of 50 mg (0.0491 mmol) of octakis(dimethylsiloxy)POSS and 115 mg (0.245 mmol) of 2-allyl-4,6-dicarbazole-1,3,5-triazine in 3 mL anhydrous toluene was added 1 drop of a solution of Pt$_2$(dvs)$_3$ (2 wt. % Pt in xylene). The reaction mixture was stirred at room temperature for 1 hour and then 77 mg (0.147 mmol) of FPt-4 was added and the reaction mixture was stirred for 5 hours. The reaction mixture was then precipitated out of hexanes to recover 158 mg of the mixture of lumophore/host-functionalized nanoparticles (POSS 4B) as a pale yellow powder. A neat film of the resulting lumophore/host functionalized nanoparticles had a CIE coordinates of (x=0.35, y=0.41). The photoluminescence spectrum of the neat film of the POSS 4B is shown in FIG. 27.

Example 9

Light-Emitting Devices Incorporating POSS 4B

Figure 28:
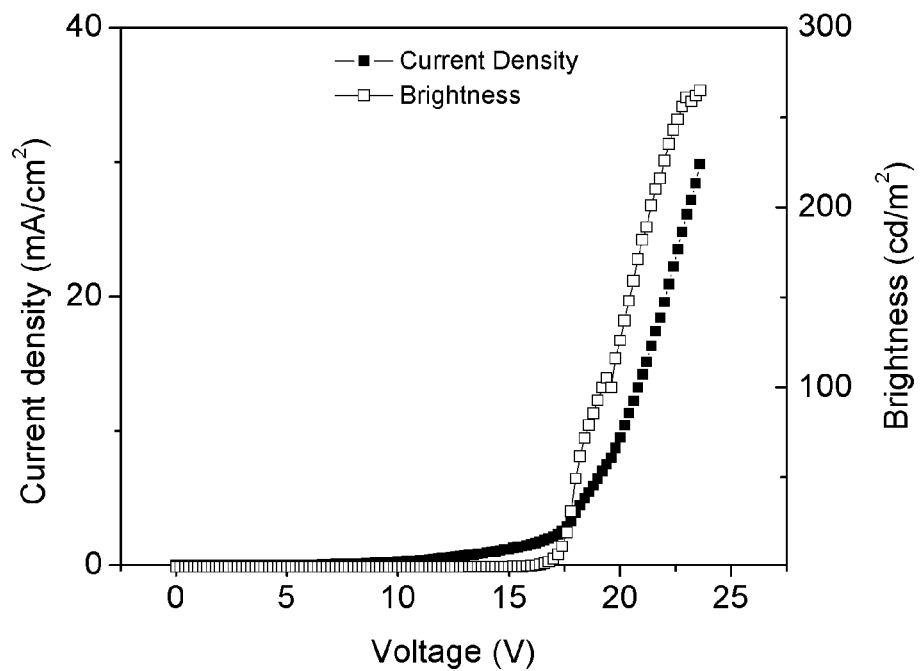
FIG. 28 is a plot of current density and brightness as a function of voltage for a light-emitting device incorporating lumophore/host-functionalized nanoparticles with 4,6-dicarbazole-1,3,5-triazine as hosts and FPt-4 as lumophores into the light-emitting layer (Device P4BE).
Figure 29:
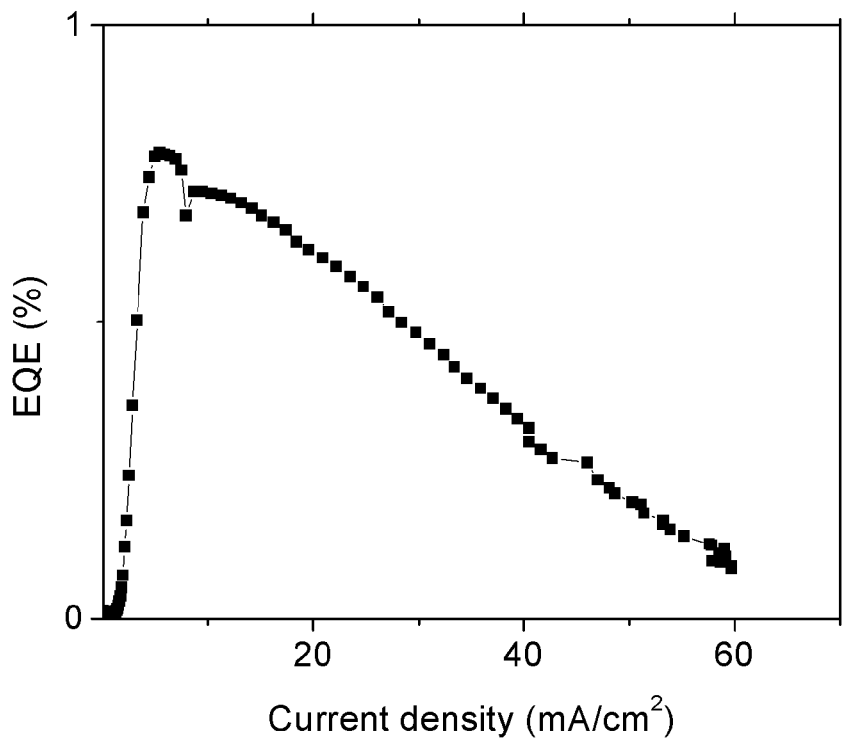
FIG. 29 is a plot of external quantum efficiency as a function of current density for Device P4BE.
Figure 30:
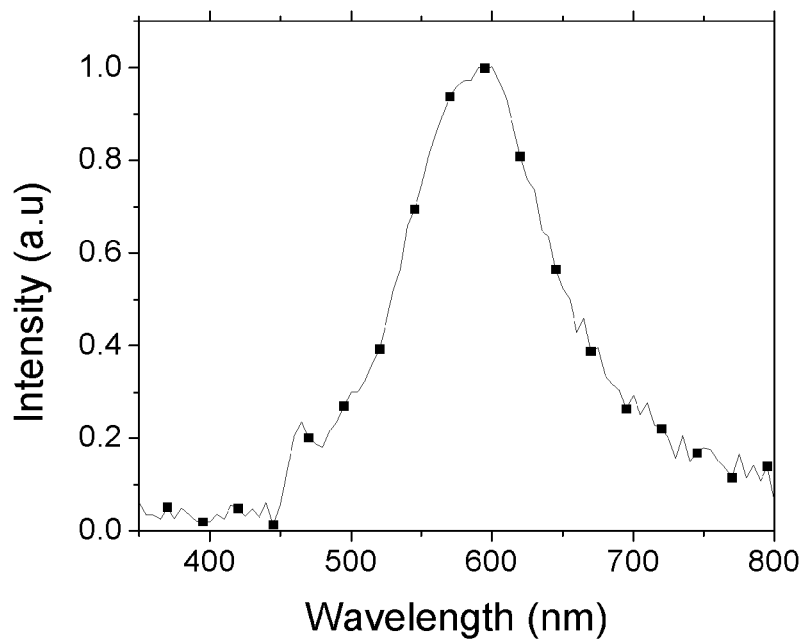
FIG. 30 shows the electroluminescent spectrum of Device P4BE.

The light-emitting device was fabricated according to the general procedure described in Example 3. The POSS 4B was incorporated into the light-emitting layer of the device 200 in FIG. 11 to form Device P4BE. The current density-voltage-brightness characteristics of Device P4BE can be seen in FIG. 28. The external quantum efficiency versus current density can be seen in FIG. 29. The electroluminescent spectrum of the device is shown in FIG. 30. It is believed that the lower efficiency of the devices was the result of impurities in the lumophore/host functionalized nanoparticles. The device had a CIE coordinate of (x=0.46, y=0.46) and a CRI value of 70.

Example 10

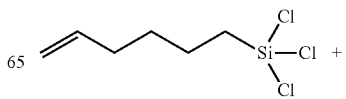

55
-continued

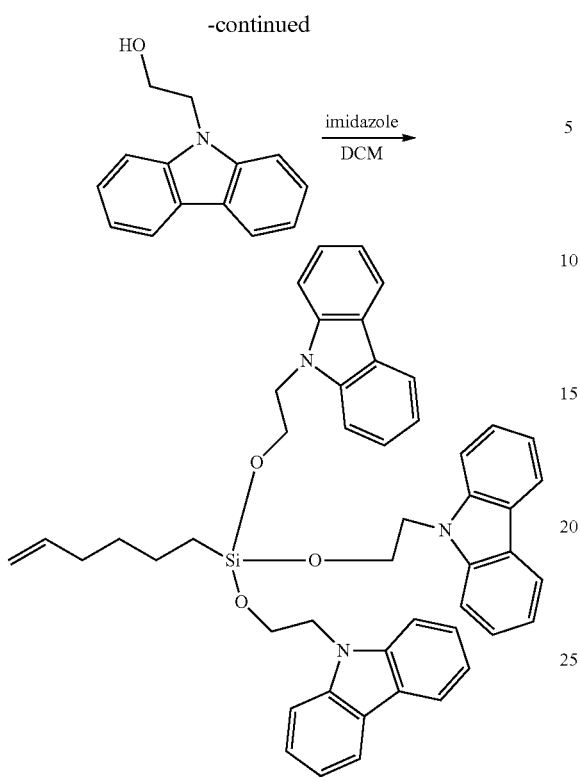

56
Tri(9-carbazole)ethoxy-5-hexenylsilane
(Si-carbazole-1)

To a solution of 9H-carbazole-9-ethanol and imidazole in anhydrous dichloromethane was added 5-hexenyltrichlorosilane. The solution was stirred at room temperature for 16 hours and then was run through a silica plug using 3:2 dichloromethane:hexanes as the eluent. The solvent was then evaporated and the product was re-dissolved in tetrahydrofuran. The product was precipitated from methanol and filtered to collect 4.84 g of the product as a white solid (86%).

Example 11

Product from the Reaction of
Octakis(Dimethylsiloxy)POSS with FPt-6 and
Tri9-Carbazole)Ethoxy5-hexenylsilane

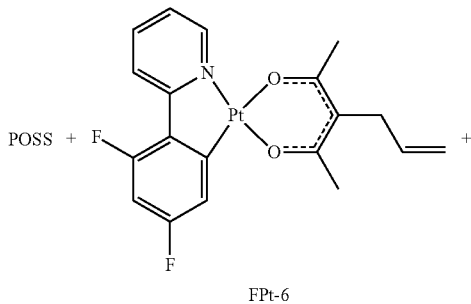

FPt-6

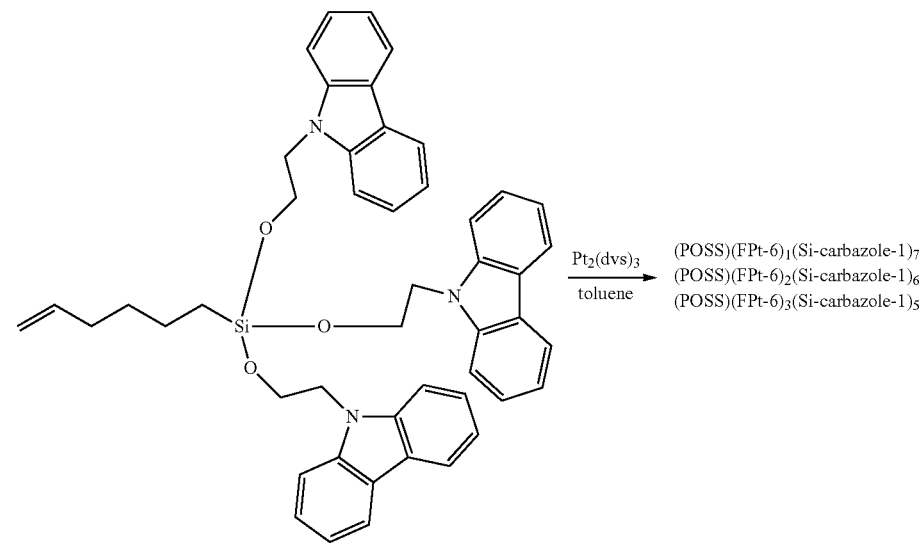

(POSS)(FPt-6)$_1$(Si-carbazole-1)$_7$
(POSS)(FPt-6)$_2$(Si-carbazole-1)$_6$
(POSS)(FPt-6)$_3$(Si-carbazole-1)$_5$ -continued

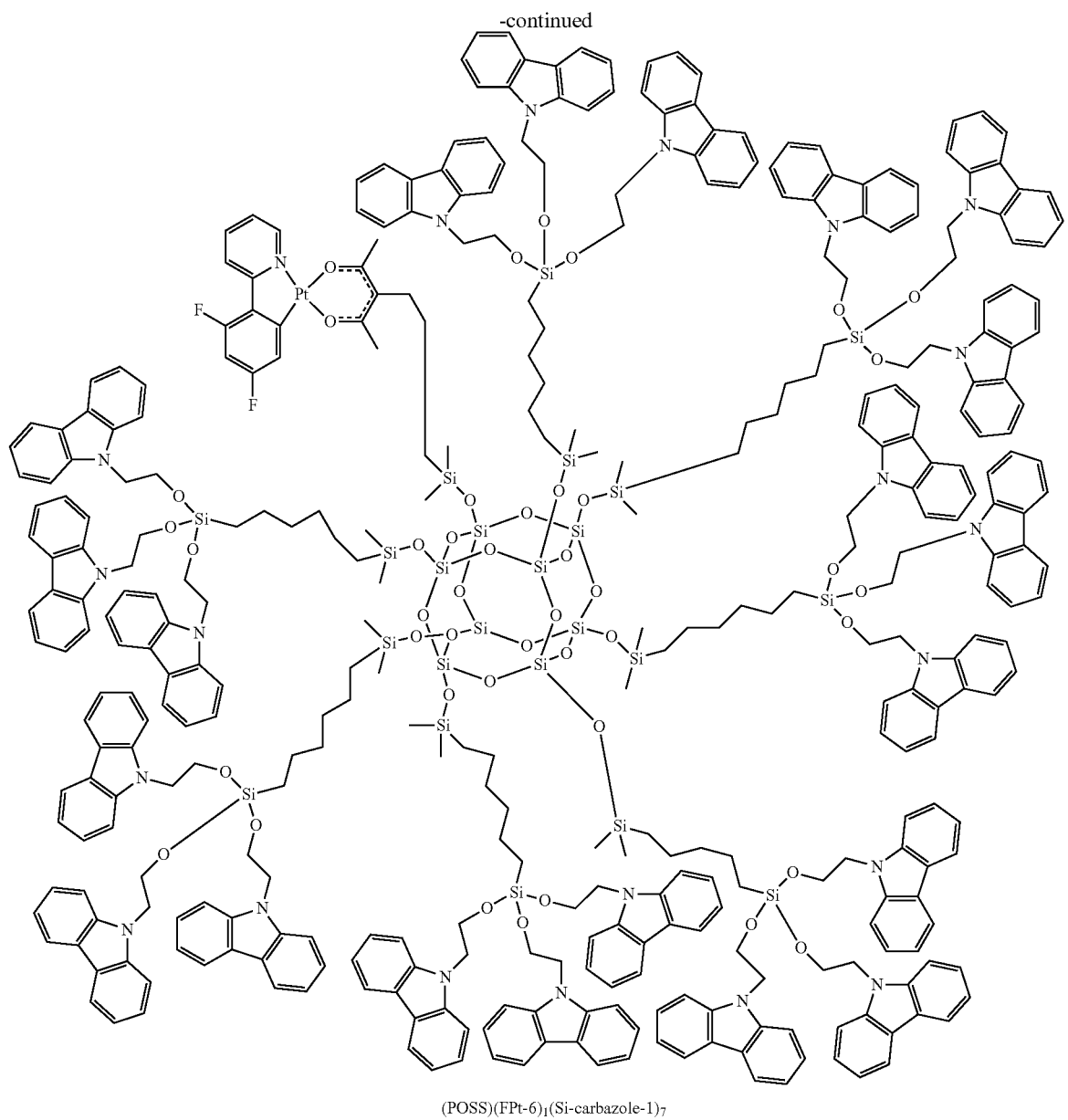

(POSS)(FPt-6)₁(Si-carbazole-1)₇

Figure 31:
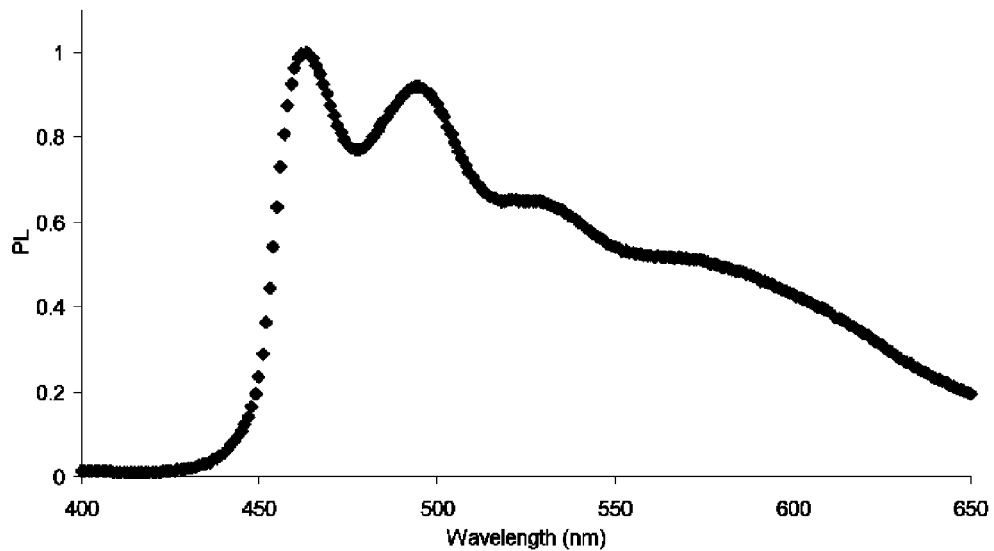
FIG. 31 shows the photoluminescent spectrum of (POSS)(FPt-6)$_1$(Si-carbazole-1)$_7$, (POSS)(FPt-6)$_2$(Si-carbazole-1)$_6$, and (POSS)(FPt-6)$_3$(Si-carbazole-1)$_5$ as a neat film (POSS 6B).

To a solution of 324 mg (0.318 mmol) of octakis(dimethylsiloxy)POSS and 167 mg (0.318 mmol) of FPt-6 in 10 mL anhydrous toluene was added 1 drop of a solution of Pt₂(dvs)₃ (2 wt. % Pt in xylene). The reaction mixture was stirred at room temperature for 1 hour and then 2.36 g (3.18 mmol) of tri(9-carbazole)ethoxy5-hexenylsilane was added and the reaction mixture was stirred for several hours. The reaction mixture was ran through a silica plug using 1:1 dichloromethane:hexane as the eluent in order to remove starting materials and then the product was eluded using dichloromethane. The product was further purified chromatographically using 7:3 dichloromethane:hexane. The solution was concentrated and then precipitated out of hexane, filtered and dried to yield 639 mg of a mixture of three types of lumophore/host functionalized nanoparticles. The three types of lumophore/host functionalized nanoparticleswere identified by MALDI-TOF mass spectrometry: 6736 (POSS)(FPt-6)₁(Si-carbazole host)₇, 6515 (POSS)(FPt-6)₂(Si-carbazole host)₆ and 6298 (POSS)(FPt-6)₃(Si-carbazole host)₅. A photoluminescence spectrum of a neat film of the resulting lumophore/host functionalized nanoparticles (POSS 6B) is shown in FIG. 31.

Example 12

Light-Emitting Devices Incorporating POSS 6B

Figure 34:
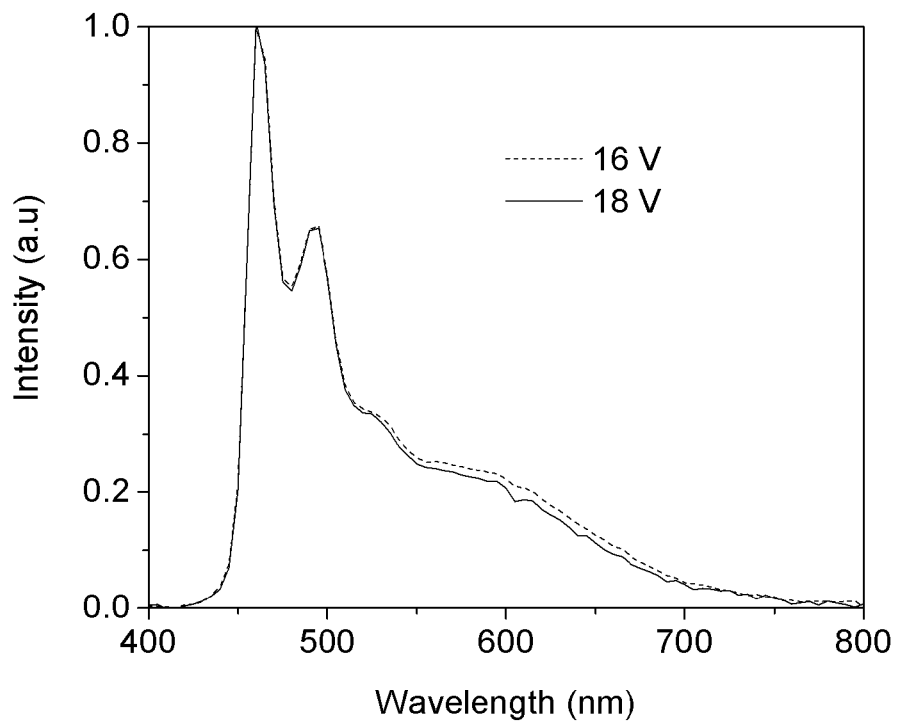
FIG. 34 shows the electroluminescent spectra of Devices P6B at two different operating voltages.
Figure 35:
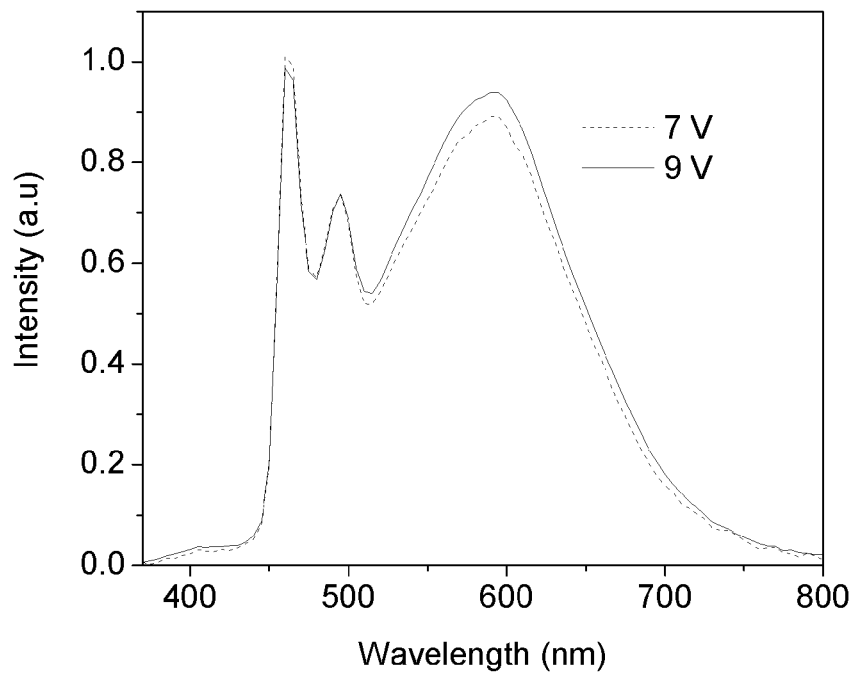
FIG. 35 shows the electroluminescent spectra of Devices P6BX at two different operating voltages.
Figure 36:
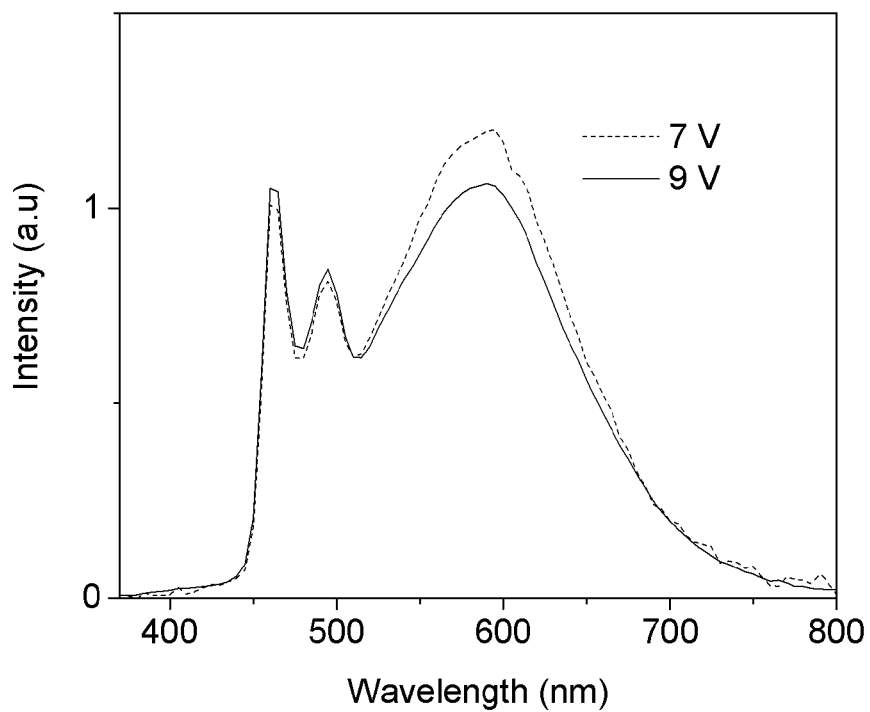
FIG. 36 shows the electroluminescent spectra of Devices P6BXE at two different operating voltages.

Three light-emitting devices were fabricated according to the general procedure described in Example 3. Device P6B and Device P6BX were made according to the general structure of device 300 in FIG. 18 and did not have the electron injection layer. The light-emitting layer of Device P6B contains only POSS 6B, while the light-emitting layer of Device P6BX contains both POSS 6B and 30% OXD-7. Device P6BXE was made according to the general structure of device 200 in FIG. 11 and had an electron injection layer. The light-emitting layer of Device P6BXE contains both POSS 6B and 30% OXD-7. The current density versus voltage (closed shapes) and brightness versus voltage (open shapes) can be seen in FIG. 32. The external quantum efficiency versus current density (closed shapes) and power efficiency versus current density (open shapes) can be seen in FIG. 33. The electroluminescence spectra of Devices P6B, P6BX and P6BXE are shown in FIGS. 34-36, respectively. The CIE coordinates and CRI values for these devices are listed in Table 2.

TABLE 2

CIE COORDINATES AND CRI VALUES

| Device | CIE (x, y) | CRI |
|---|---|---|
| Device P6B | at 16 volts (0.25, 0.32) | at 16 volts = 71 |
|  | at 19 volts (0.26, 0.32) | at 19 volts = 73 |
| Device P6BX | at 7 volts (0.38, 0.40) | at 7 volts = 81 |
|  | at 9 volts (0.38, 0.40) | at 9 volts = 81 |
| Device P6BXE | at 7 volts (0.40, 0.42) | at 7 volts = 78 |
|  | at 9 volts (0.39, 0.41) | at 9 volts = 79 |

Figure 32:
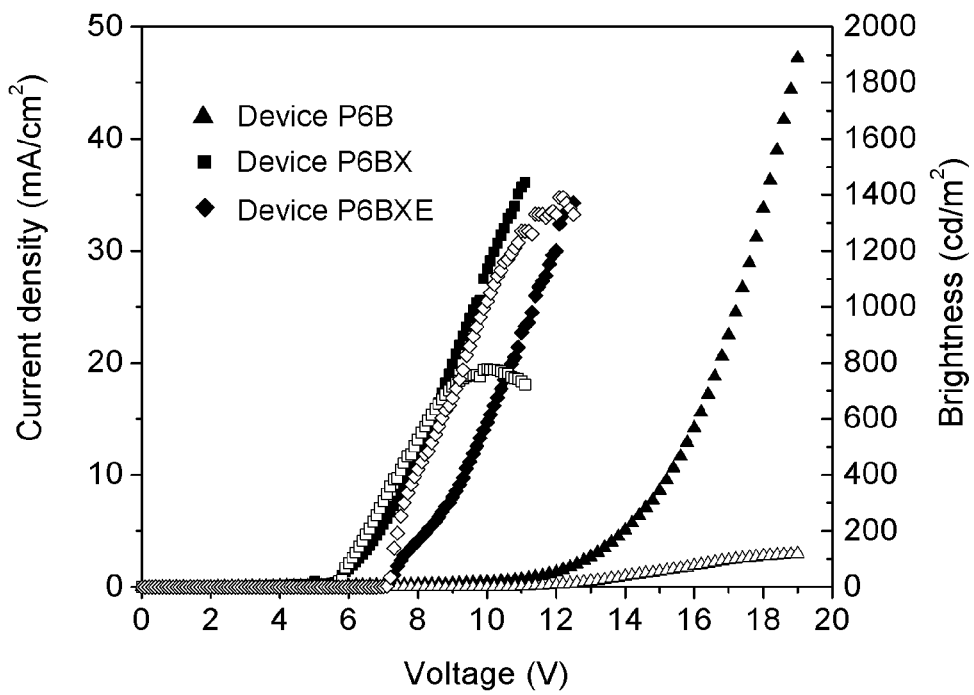
FIG. 32 shows a plot of current density and brightness as a function of voltage for a light-emitting device incorporating POSS 6B into the light emitting layer and having no electron injection layer (Device P6B), a device incorporation POSS 6B+30% OXD-7 into the light-emitting layer and having no electron injection layer (Device P6BX), and a device incorporation POSS 6B+30% OXD-7 into the light-emitting layer and having an electron injection layer (Device P6BXE).
Figure 33:
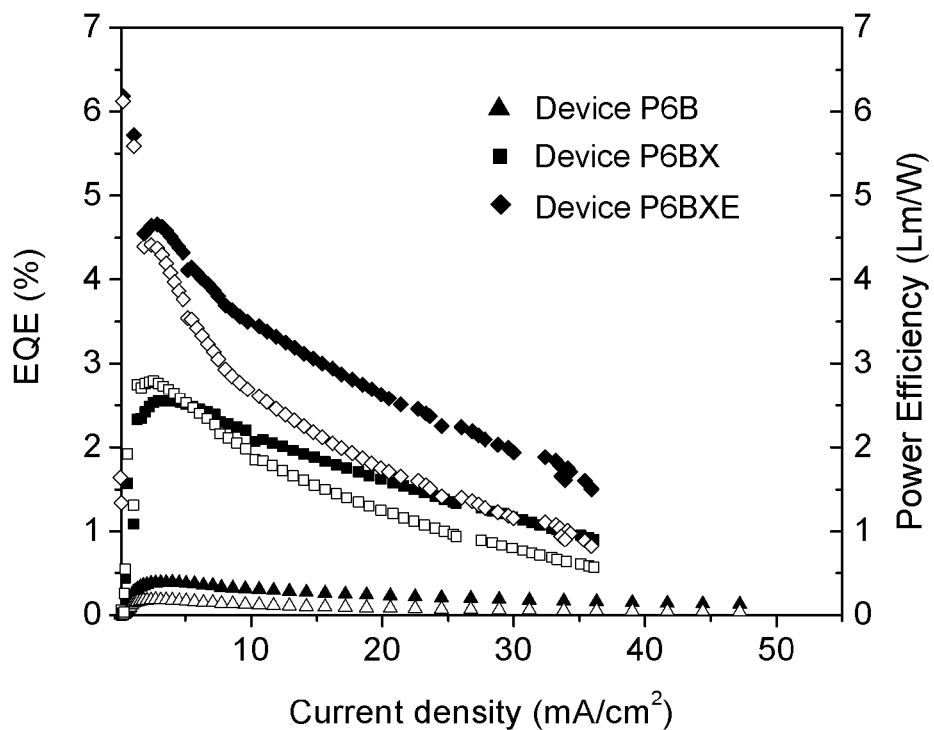
FIG. 33 is a plot of external quantum efficiency and power efficiency as a function of current density for Devices P6B, P6BX and P6BXE.

As shown by FIGS. 32 and 33, Device P6BXE is the most efficient device. Incorporation of OXD-7 into the light-emitting layer and incorporation of TPBI as the electron injection layer improves the transport properties of the device, thereby increasing the external quantum efficiency and power efficiency.

It will be appreciated by those skilled in the art that various omissions, additions and modifications may be made to the processes described above without departing from the scope of the invention, and all such modifications and changes are intended to fall within the scope of the invention.

What is claimed is:

1. A light-emitting composition comprising a compound of formula (I):

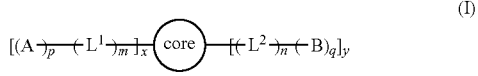

(I)

wherein:

core is a nanoparticle core;

A is a phosphorescent emitting lumophore selected from the group consisting of:

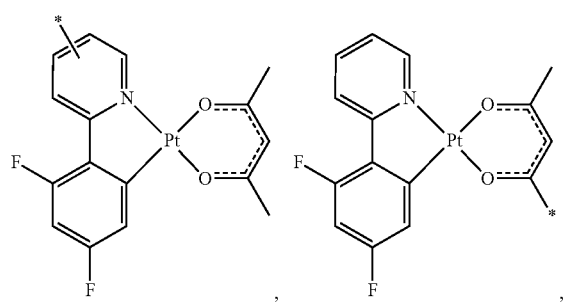

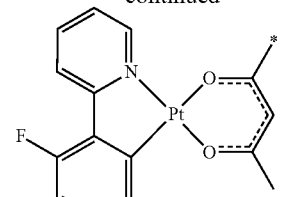

-continued

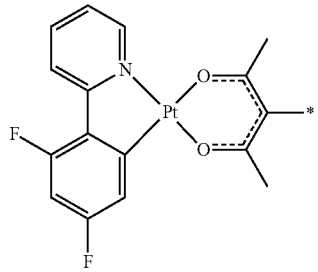

and wherein * indicate the point of attachment to $L^1$ or the core;

B is a host;

$L^1$ and $L^2$ are each a linking group;

m is 0 or 1;

n is 0 or 1;

p is an integer in the range of 1 to 50;

q is an integer in the range of 1 to 50;

x is an integer in the range of 1 to 100, wherein for x≥2 each $L^1$ can be the same or different, and each A can be the same or different, and each p can be the same or different; and y is an integer in the range of 1 to 100, wherein for y≥2 each $L^2$ can be the same or different, and each B can be the same or different, and each q can be the same or different.

2. The light-emitting composition of claim 1, wherein the core is selected from the group consisting of a silsesquioxane, a cyclophosphazene, a triazine, a cyclodextrin, a calixarene, a phthalocyanine, and a silica particle.

3. The light-emitting composition of claim 2, wherein the silsesquioxane comprises a 1,3,5,7,9,11,13,15-octakis(dimethylsilyloxy)pentacyclo-[9.5.1.13,9.15,15.17,13]-octasiloxane.

4. A light-emitting composition comprising:

an amount of a first compound of formula (I):

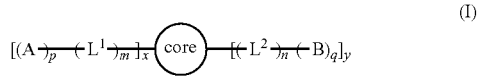

(I)

wherein:

core is a nanoparticle core;

A is a phosphorescent emitting lumophore;

B is a host;

$L^1$ and $L^2$ are each a linking group;

m is 0, n is 0, p is 1, q is 1, x is 1, and y is 7;

each $L^2$ can be the same or different, and each B can be the same or different;

an amount of a second compound of formula (I), wherein m=0, n=0, p=1, q=1, x=2, y=6;

each $L^1$ can be the same or different, each A can be the same or different, each $L^2$ can be the same or different, and each B can be the same or different; and an amount of a third compound having the structure:

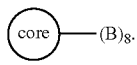

5. The light-emitting composition of claim 4, wherein the amount of the first compound of formula (I) is in the range of about 40 mole/mole % to about 60 mole/mole %; and the amount of the second compound of formula (I) is in the range of about 10 mole/mole % to about 30 mole/mole %.

6. A light-emitting composition consisting essentially of a compound of formula (I):

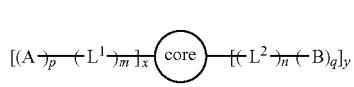

wherein:
core is a nanoparticle core;
A is a phosphorescent emitting lumophore;
B is a host;
$L^1$ and $L^2$ are each a linking group;
m=0, n=0, p=1, q=1, x=1; and y=7; and
wherein each $L^2$ can be the same or different, and each B can be the same or different.

7. A light-emitting composition consisting essentially of a compound of formula (I):

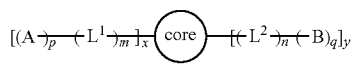

wherein:
core is a nanoparticle core;
A is a phosphorescent emitting lumophore;
B is a host;
$L^1$ and $L^2$ are each a linking group;
m=0, n=0, p=1, q=1, x=2; and y=6; and
wherein each $L^1$ can be the same or different, each A can be the same or different, each $L^2$ can be the same or different, and each B can be the same or different.

8. The light-emitting composition of claim 1, wherein the host is a group with a molecular weight (MW)<1000 g/mol.

9. The light-emitting composition of claim 8, wherein the host comprises an optionally substituted moiety selected from the following group: aromatic-substituted amine, aromatic-substituted phosphine, carbazole, 3,6-disubstituted carbazole, thiophene, oxadiazole, 2-(4-biphenylyl)-5-(4-tert-butylphenyl)-1,3,4-oxadiazole (PBD), 1,3-bis(N,N-t-butyl-phenyl)-1,3,4-oxadiazole (OXD-7), triazole, 3-phenyl-4-(1'-naphthyl)-5-phenyl-1,2,4-triazole (TAZ), 3,4,5-Triphenyl-1,2,3-triazole, 3,5-Bis(4-tert-butyl-phenyl)-4-phenyl[1,2,4]triazole, aromatic phenanthroline, 2,9-dimethyl-4,7-diphenyl-phenanthroline (bathocuproine or BCP), 2,9-Dimethyl-4,7-diphenyl-1,10-phenanthroline, benzoxazole, benzothiazole, quinoline, aluminum tris(8-hydroxyquino-late) (Alq3), pyridine, dicyanoimidazole, cyano-substituted aromatic, 1,3,5-tris(2-N-phenylbenzimidazolyl)benzene (TPBI), 4,4'-bis[N-(naphthyl)-N-phenyl-amino]biphenyl (α-NPD), N,N'-bis(3-methylphenyl)N,N'-diphenyl-[1,1'-biphenyl]-4,4'-diamine (TPD), 4,4'-bis[N,N'-(3-tolyl)amino]-3,3'-dimethylbiphenyl (M14), 4,4'-bis[N,N'-(3-tolyl)amino]-3,3'-dimethylbiphenyl (HMTPD), 1,1-Bis(4-bis(4-methylphenyl)aminophenyl)cyclohexane, carbazole, 4,4'-N,N'-dicarbazole-biphenyl (CBP), poly(9-vinylcarbazole) (PVK), N,N'N''-1,3,5-tricarbazoloylbenzene (tCP), polythiophene, benzidine, N,N'-bis(4-butylphenyl)-N,N'-bis(phenyl)benzidine, triphenylamine, 4,4',4''-Tris(N-(naphthylen-2-yl)-N-phenylamino)triphenylamine, 4,4',4''-tris(3-methylphenylphenylamino)triphenylamine (MTDATA), phenylenediamine, polyacetylene, and phthalocyanine metal complex.

10. The lighting-emitting composition of claim 8, wherein the host is selected from:

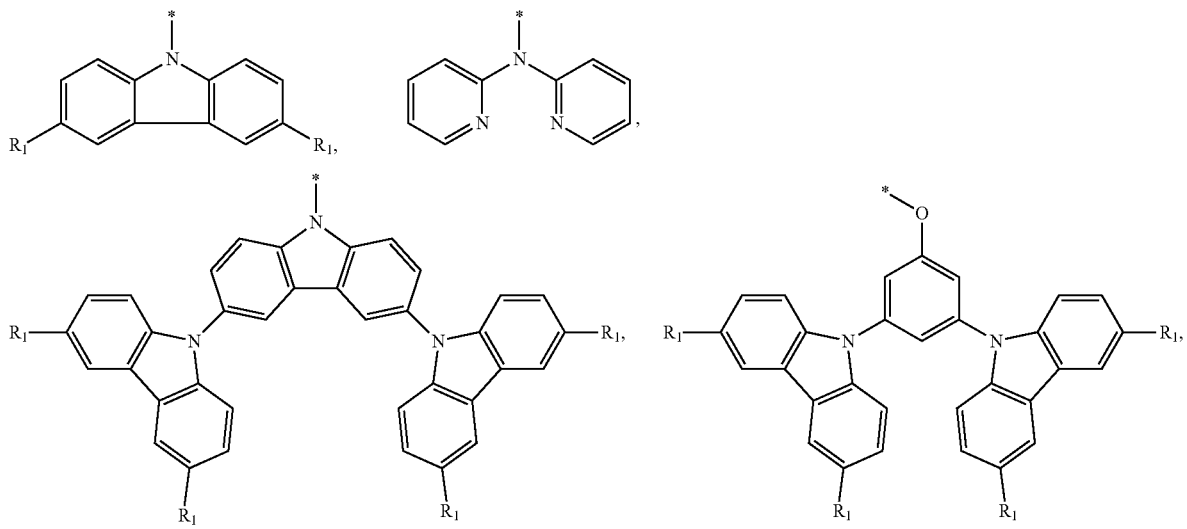

-continued
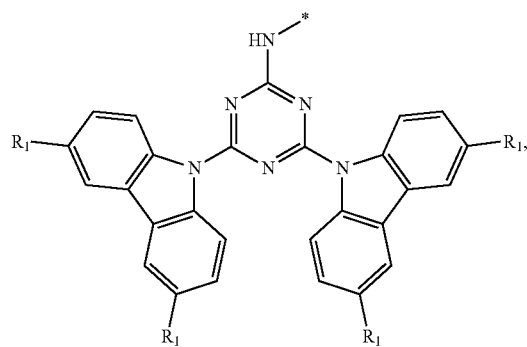
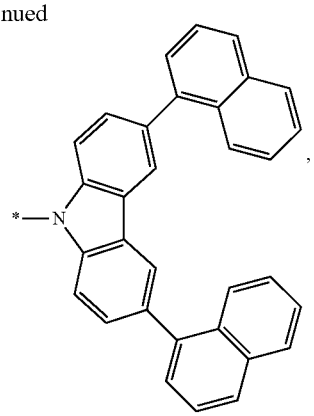
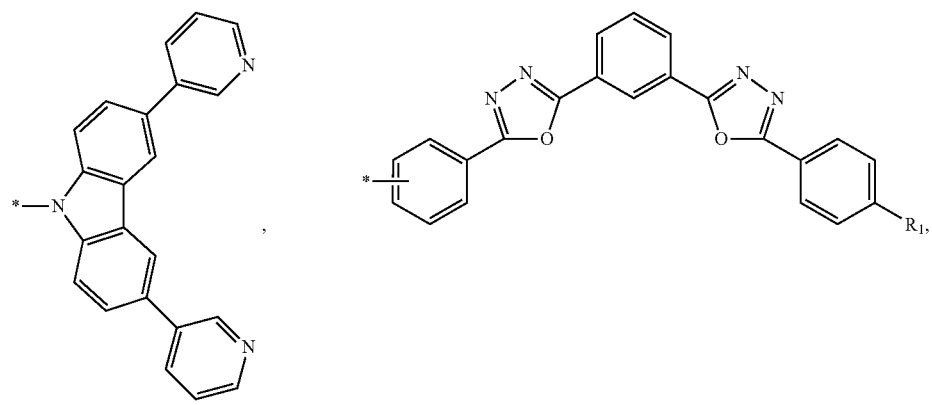
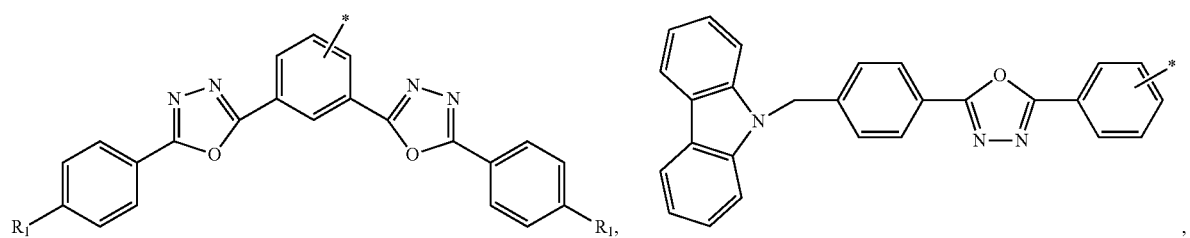
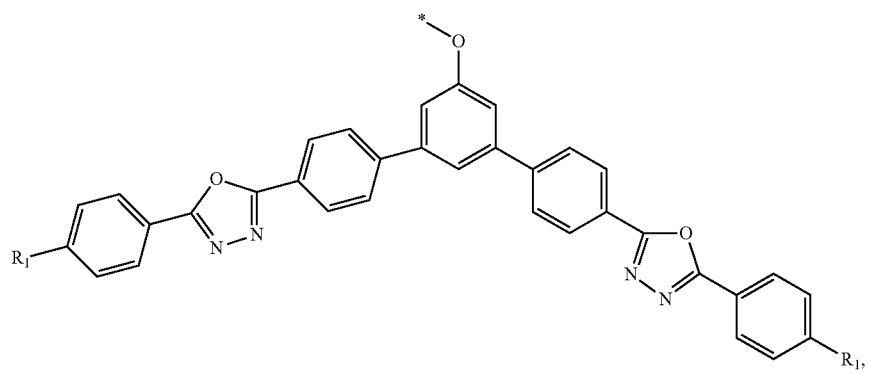

-continued
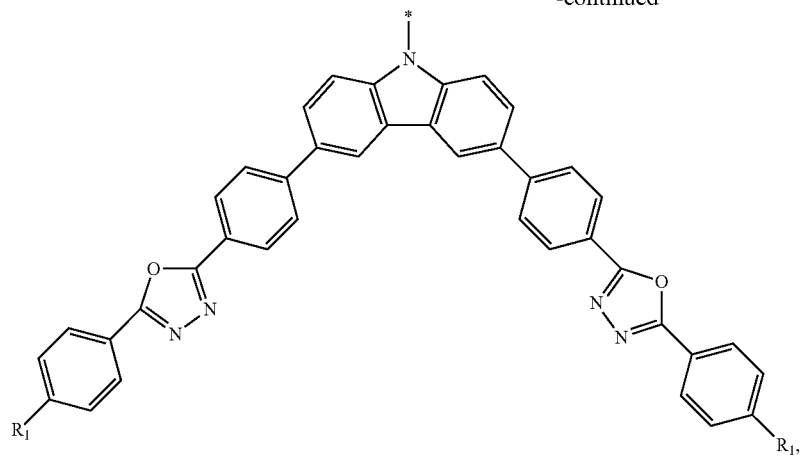
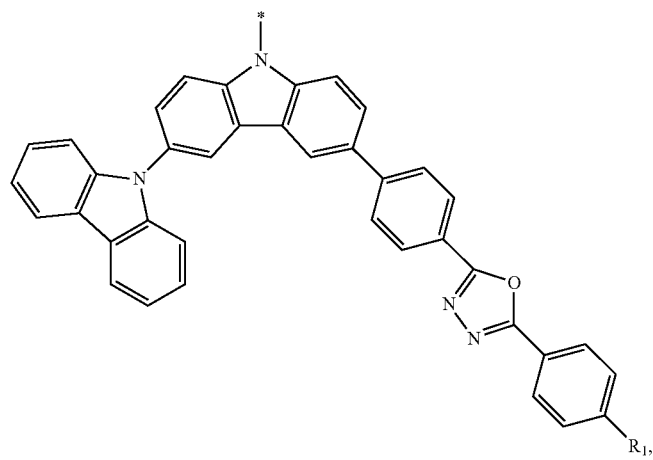
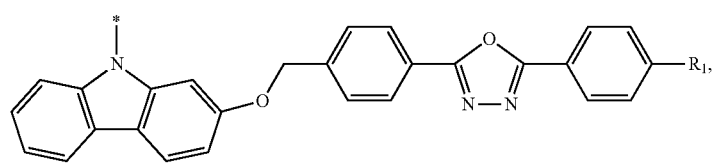
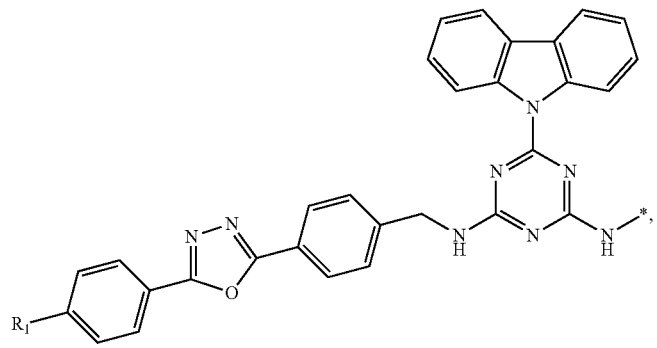

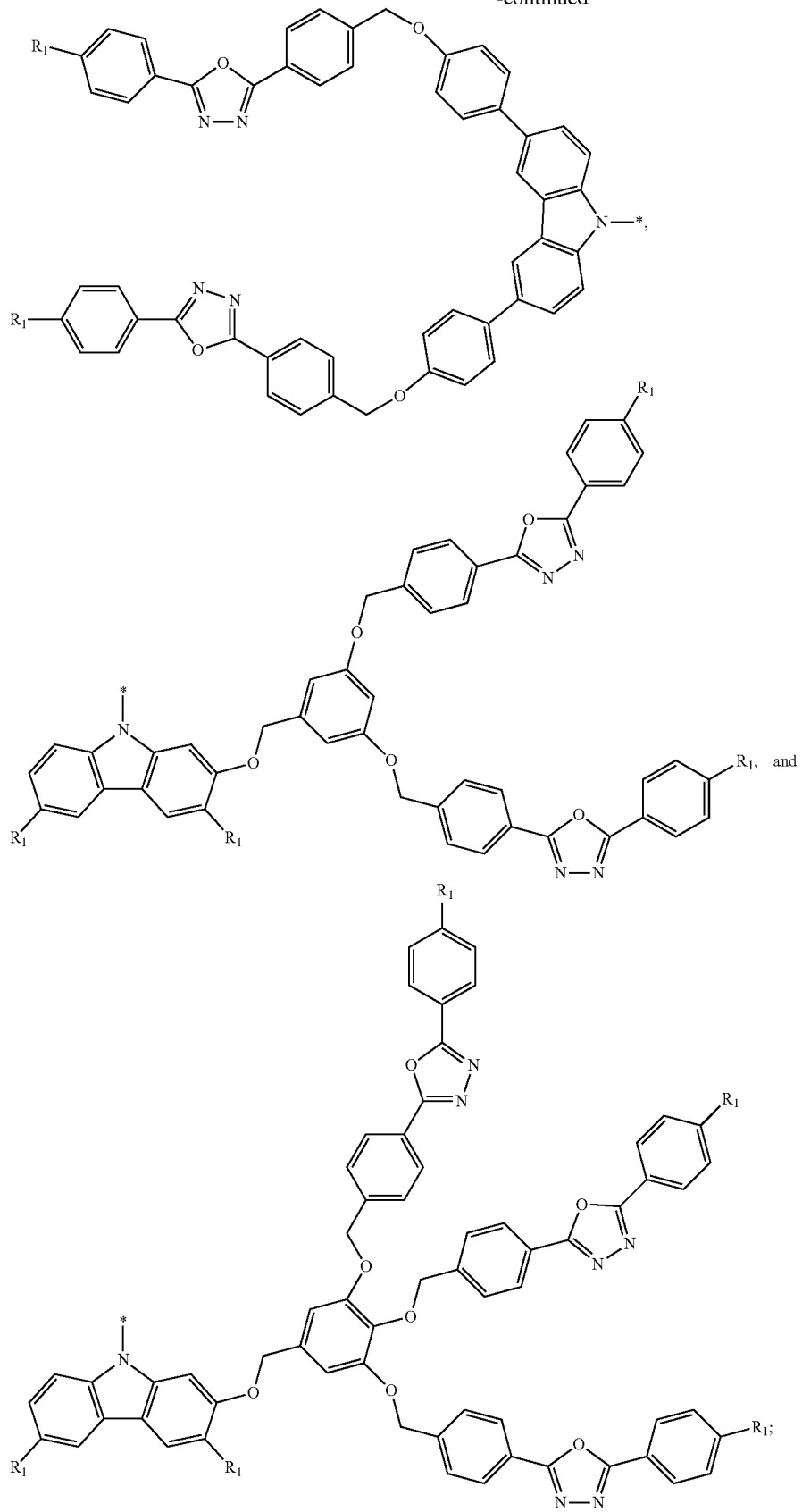
wherein $R_1$ is H or $C_{1-6}$ alkyl.

11. The light-emitting composition of claim 1, wherein the host is an electron transport material.

12. The light-emitting composition of claim 11, wherein the electron transport material is an optionally substituted compound selected from the following: aluminum tris(8-hydroxyquinolate) (Alq3), 2-(4-biphenylyl)-5-(4-tert-butylphenyl)-1,3,4-oxadiazole (PBD), 1,3-bis(N,N-t-butyl-phenyl)-1,3,4-oxadiazole (OXD-7), 3-phenyl-4-(1'-naphthyl)-5-phenyl-1,2,4-triazole (TAZ), 2,9-dimethyl-4,7-diphenyl-phenanthroline (bathocuproine or BCP), and 1,3,5-tris[2-N-phenylbenzimidazol-z-yl]benzene (TPBI).

13. The light-emitting composition of claim 1, wherein the host is a hole transport material.

14. The light-emitting composition of claim 13, wherein the hole transport material is an optionally substituted compound selected from the following: carbazole, 4,4'-bis[N-(naphthyl)-N-phenyl-amino]biphenyl (α-NPD), N,N'-bis(3-methylphenyl)N,N'-diphenyl-[1,1'-biphenyl]-4,4'-diamine (TPD), 4,4'-bis[N,N'-(3-tolyl)amino]-3,3'-dimethylbiphenyl (M14), 4,4',4'-tris(3-methylphenylphenylamino)triphenylamine (MTDATA), 4,4'-bis[N,N'-(3-tolyl)amino]-3,3'-dimethylbiphenyl (HMTPD), N,N'N"-1,3,5-tricarbazoloylbenzene (tCP), 4,4'-N,N'-dicarbazole-biphenyl (CBP), poly(9-vinylcarbazole) (PVK), 3,4,5-Triphenyl-1,2,3-triazole, 3,5-Bis(4-tert-butyl-phenyl)-4-phenyl[1,2,4]triazole, 2,9-Dimethyl-4,7-diphenyl-1,10-phenanthroline, 1,1-Bis(4-bis (4-methylphenyl)aminophenyl)cyclohexane, N,N'-bis(4-butylphenyl)-N,N'-bis(phenyl)benzidine, 4,4',4"-Tris(N-(naphthylen-2-yl)-N-phenylamino)triphenylamine, and copper phthalocyanine.

15. The light-emitting composition of claim 1, wherein $L^1$ and $L^2$ are each independently selected from $C_{1-30}$ alkyl, $C_{1-30}$ alkoxy, and

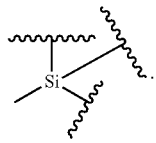 [SMILES: *[Si](*)(*)C]

16. The light-emitting composition of claim 1, wherein $L^1$ and $L^2$ each independently comprise a monovalent, a divalent, a trivalent, a tetravalent, or a pentavalent moiety.

17. The light-emitting composition of claim 16, wherein the divalent moiety is selected from the group consisting of:

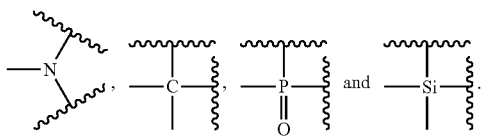

18. The light-emitting composition of claim 16, wherein the trivalent moiety is selected from the group consisting of:

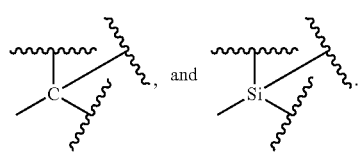

19. The light-emitting composition of claim 16, wherein the tetravalent moiety is:

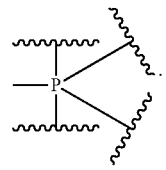 [SMILES: *P(*)(*)(*)C]

20. The light-emitting composition of claim 16, wherein the pentavalent moiety is selected from the group consisting of:

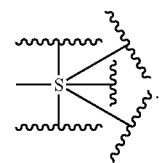 [SMILES: *S(*)(*)(*)(*)C]

21. The light-emitting composition of claim 1, wherein:

the core is 1,3,5,7,9,11,13,15-octakis(dimethylsilyloxy) pentacyclo-[9.5.1.13,9.15,15.17,13]-octasiloxane;

A is

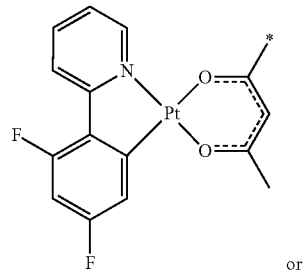

or

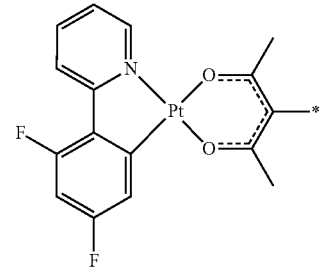

;

B is

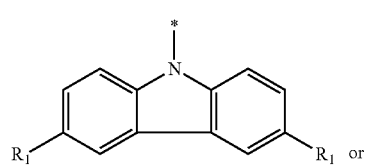

or

-continued

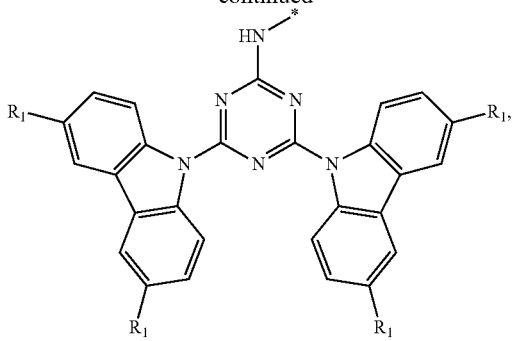

wherein * indicates the point of attachment to $L^2$ or the core;
L¹ is selected from $C_{1-6}$ alkyl;
L² is selected from $C_{1-6}$ alkyl and

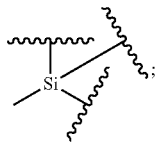

m is 1;
n is 1;
p is 1;
q is 1 or 3;
x is 1, 2, 3 or 4; and
y is 4, 5, 6 or 7.

22. A light-emitting device comprising:
an anode layer comprising a high work function metal;
a cathode layer comprising a low work function metal; and
a light-emitting layer comprising the light-emitting composition of claim 1, wherein the light-emitting layer is positioned between, and electrically connected to, the anode layer and the cathode layer.

23. The light-emitting device of claim 22, wherein the light-emitting layer is configured to emit white light.

24. The light-emitting device of claim 22, wherein the light-emitting layer further comprises a second compound.

25. The light-emitting device of claim 24, wherein the second compound is an electron transport material.

26. The light-emitting device of claim 25, wherein the electron transport material is OXD-7.

27. The light-emitting device of claim 24, wherein the second compound is a hole transport material.

28. The light-emitting device of claim 22, wherein the light-emitting layer emits light having a CIE x-coordinate in the range of about 0.28 to about 0.50 and a CIE y-coordinate in the range of about 0.28 to about 0.50.

29. The light-emitting device of claim 22, wherein the light-emitting layer emits light have a CRI value in the range of about 60 to about 100.

30. The light-emitting device of claim 22, wherein the light-emitting layer emits light have a CRI value in the range of about 80 to about 100.

31. The light-emitting device of claim 22, wherein the light-emitting layer emits light have a CRI value greater than 70.

32. The light-emitting device of claim 22, wherein the high work function metal is selected from the group consisting of Au, Pt, indium-tin-oxide (ITO), and alloys thereof.

33. The light-emitting device of claim 22, wherein the low work function metal is selected from the group consisting of Al, Ag, Mg, Ca, Cu, Mg/Ag, LiF/Al, CsF, CsF/Al, and alloys thereof.

34. The light-emitting device of claim 22, wherein the anode layer has a thickness in the range of about 1 nm to about 1000 nm.

35. The light-emitting device of claim 22, wherein the cathode layer has a thickness in the range of about 1 nm to about 1000 nm.

36. The light-emitting device of claim 22, wherein the light-emitting layer has a thickness in the range of about 30 nm to about 250 nm.

37. The light-emitting device of claim 22, further comprising an electron injection layer.

38. The light-emitting device of claim 37, wherein the electron injection layer comprises an optionally substituted compound selected from: aluminum quinolate ($Alq_3$), 2-(4-biphenylyl)-5-(4-tert-butylphenyl)-1,3,4-oxadiazole (PBD), phenanthroline, quinoxaline, and 1,3,5-tris[N-phenylbenzimidazol-z-yl] benzene (TPBI).

39. The light emitting device of claim 22, further comprising an electron transport layer.

40. The light-emitting device of claim 39, wherein the electron transport layer comprises an optionally substituted compound selected from: aluminum tris(8-hydroxyquinolate) (Alq3), 2-(4-biphenylyl)-5-(4-tert-butylphenyl)-1,3,4-oxadiazole (PBD), 1,3-bis(N,N-t-butyl-phenyl)-1,3,4-oxadiazole (OXD-7), 3-phenyl-4-(1'-naphthyl)-5-phenyl-1,2,4-triazole (TAZ), 2,9-dimethyl-4,7-diphenyl-phenanthroline (bathocuproine or BCP), and 1,3,5-tris[2-N-phenylbenzimidazol-z-yl]benzene (TPBI).

41. The light-emitting device of claim 22, further comprising a hole-blocking layer.

42. The light-emitting device of claim 41, wherein the hole-blocking layer comprises an optionally substituted compound selected from: bathocuproine (BCP), 3,4,5-triphenyl-1,2,4-triazole, 3,5-bis(4-tert-butyl-phenyl)-4-phenyl-[1,2,4]triazole, 2,9-dimethyl-4,7-diphenyl-1,10-phenanthroline, and 1,1-bis(4-bis(4-methylphenyl)aminophenyl)cyclohexane.

43. The light-emitting device of claim 22, further comprising an exciton blocking layer.

44. The light-emitting device of claim 43, wherein the exciton blocking layer comprises an optionally substituted compound selected from: aluminum quinolate ($Alq_3$), 4,4'-bis[N-(naphthyl)-N-phenyl-amino]biphenyl (α-NPD), 4,4'-N,N'-dicarbazole-biphenyl (CBP), and bathocuproine (BCP).

45. The light emitting device of claim 22, further comprising an hole transport layer.

46. The light-emitting device of claim 45, wherein the hole transport layer comprises an optionally substituted compound selected from: 4,4'-bis[N-(naphthyl)-N-phenyl-amino]biphenyl (α-NPD), N,N'-bis(3-methylphenyl)N,N'-diphenyl-[1,1'-biphenyl]-4,4'-diamine (TPD), 4,4'-bis[N,N'-(3-tolyl)amino]-3,3'-dimethylbiphenyl (M14), 4,4',4'-tris(3-methylphenylphenylamino)triphenylamine (MTDATA), 4,4'-bis[N,N'-(3-tolyl)amino]-3,3'-dimethylbiphenyl (HMTPD), N,N'N''-1,3,5-tricarbazoloylbenzene (tCP), 4,4'-N,N'-dicarbazole-biphenyl (CBP), poly(9-vinylcarbazole) (PVK), 3,4,5-Triphenyl-1,2,3-triazole, 3,5-Bis(4-tert-butylphenyl)-4-phenyl[1,2,4]triazole, 2,9-Dimethyl-4,7-diphenyl-1,10-phenanthroline, 1,1-Bis(4-bis(4-methylphenyl)aminophenyl)cyclohexane, carbazole, polythiophene, benzidine, N,N'-bis(4-butylphenyl)-N,N'-bis(phenyl)benzidine, triphenylamine, phenylenediamine, 4,4',4''-Tris(N-

(naphthylen-2-yl)-N-phenylamino)triphenylamine, oxadiazole, polyacetylene and phthalocyanine metal complex.

47. The light-emitting device of claim 22, further comprising a hole injection layer.

48. The light-emitting device of claim 47, wherein the hole injection layer comprises an optionally substituted compound selected from polythiophene polytheylenedioxythiophene (PEDOT)/polystyrene sulphonic acid (PSS), benzidine, N,N,N',N'-tetraphenylbenzidine, poly(N,N'-bis(4-butylphenyl)-N,N'-bis(phenyl)benzidine), triphenylamine, phenylenediamine, N'-bis(4-methylphenyl)-N,N'-bis(phenyl)-1,4-phenylenediamine, 4,4',4"-tris(N-(naphthylen-2-yl)-N-phenylamino)triphenylamine, oxadiazole, 3-bis(5-(4-diphenylamino)phenyl-1,3,4-oxadiazol-2-yl)benzene, polyacetylene, ly(1,2-bis-benzylthio-acetylene), and phthalocyanine metal complex.

49. A process of making the light-emitting device of claim 22 comprising forming the light-emitting layer by a wet process.

50. The process of claim 49, wherein the wet process is selected from the group consisting of spraying, spin coating, drop casting, inkjet printing, and screen printing.

* * * * *